(12) United States Patent
Kiyota et al.

(10) Patent No.: US 11,939,746 B2
(45) Date of Patent: Mar. 26, 2024

(54) SURROUNDINGS MONITORING SYSTEM FOR WORK MACHINE

(71) Applicant: SUMITOMO HEAVY INDUSTRIES, LTD., Tokyo (JP)

(72) Inventors: Yoshihisa Kiyota, Kanagawa (JP); Shunsuke Otsuki, Kanagawa (JP); Susumu Aizawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/536,845

(22) Filed: Aug. 9, 2019

(65) Prior Publication Data
US 2019/0360177 A1  Nov. 28, 2019

Related U.S. Application Data

(63) Continuation of application No. PCT/JP2018/005591, filed on Feb. 16, 2018.

(30) Foreign Application Priority Data

Feb. 17, 2017 (JP) .................................. 2017-027860
Mar. 27, 2017 (JP) .................................. 2017-061958
(Continued)

(51) Int. Cl.
*G08B 21/00* (2006.01)
*B60R 1/00* (2022.01)
(Continued)

(52) U.S. Cl.
CPC ............... *E02F 9/261* (2013.01); *B60R 1/00* (2013.01); *E02F 9/24* (2013.01); *H04N 5/272* (2013.01);
(Continued)

(58) Field of Classification Search
CPC .... E02F 9/261; E02F 9/24; B60R 1/00; B60R 2300/105; B60R 2300/303;
(Continued)

(56) References Cited

U.S. PATENT DOCUMENTS 5,198,800 A * 3/1993 Tozawa ................. E02F 9/2033
340/685
5,939,986 A * 8/1999 Schiffbauer ........... B66C 15/045
340/541
(Continued)

FOREIGN PATENT DOCUMENTS

EP          2759999      7/2014
JP       2003-171094     6/2003
(Continued)

OTHER PUBLICATIONS

Khrebtov et al., A Wireless Location System for Sensing the Relative Position Between Mining Vehicles (Year: 2007).*
(Continued)

*Primary Examiner* — Quang Pham
(74) *Attorney, Agent, or Firm* — IPUSA, PLLC

(57) ABSTRACT

A surroundings monitoring system for a work machine includes an image capturing unit configured to capture an image of surroundings of the work machine and a display device configured to display the image of the surroundings of the work machine captured by the image capturing unit and a mark representing the position of a monitoring target. The display device is configured to display the mark in two or more different display forms.

8 Claims, 61 Drawing Sheets

(30) Foreign Application Priority Data

Mar. 30, 2017 (JP) .............................. 2017-069313
Mar. 31, 2017 (JP) .............................. 2017-073017

(51) Int. Cl.
*E02F 9/24* (2006.01)
*E02F 9/26* (2006.01)
*H04N 5/272* (2006.01)
*H04N 7/18* (2006.01)

(52) U.S. Cl.
CPC ........ *H04N 7/181* (2013.01); *B60R 2300/105* (2013.01); *B60R 2300/303* (2013.01); *B60R 2300/307* (2013.01); *B60R 2300/8033* (2013.01); *B60R 2300/8093* (2013.01)

(58) Field of Classification Search
CPC ...... B60R 2300/307; B60R 2300/8033; B60R 2300/8093; H04N 5/272; H04N 7/181
See application file for complete search history.

(56) References Cited

U.S. PATENT DOCUMENTS

| | | | | |
|---|---|---|---|---|
| 6,327,522 | B1* | 12/2001 | Kojima | B60K 35/00 701/1 |
| 7,161,616 | B1* | 1/2007 | Okamoto | B60R 1/00 348/E7.086 |
| 8,248,263 | B2* | 8/2012 | Shervey | B66F 17/003 340/686.1 |
| 8,717,196 | B2* | 5/2014 | Wang | B60R 1/00 340/936 |
| 9,598,106 | B2* | 3/2017 | Sobue | B62D 15/0275 |
| 9,781,494 | B1* | 10/2017 | Barakat | H04Q 9/00 |
| 10,414,635 | B2* | 9/2019 | Hayashi | B66C 13/40 |
| 11,244,173 | B2* | 2/2022 | Lida | B60R 11/04 |
| 11,554,939 | B2* | 1/2023 | Bergmayr | B66C 13/40 |
| 2004/0050612 | A1 | 3/2004 | Katae et al. | |
| 2006/0274147 | A1* | 12/2006 | Chinomi | B60R 1/00 348/E7.086 |
| 2007/0010925 | A1* | 1/2007 | Yokoyama | E02F 9/261 37/413 |
| 2007/0076526 | A1* | 4/2007 | Aikyo | G01S 15/86 367/128 |
| 2009/0079590 | A1* | 3/2009 | Hiraoka | C09K 8/426 340/984 |
| 2009/0112389 | A1* | 4/2009 | Yamamoto | B60R 1/00 701/31.4 |
| 2009/0142133 | A1* | 6/2009 | Glee | E01C 19/48 404/90 |
| 2010/0299000 | A1* | 11/2010 | Nakamura | G08G 1/167 701/1 |
| 2011/0063444 | A1* | 3/2011 | Okamoto | G06V 20/58 348/148 |
| 2012/0162243 | A1* | 6/2012 | Matsuo | H04N 5/272 345/592 |
| 2012/0232763 | A1* | 9/2012 | Mizuochi | E02F 9/264 701/50 |
| 2012/0300075 | A1* | 11/2012 | Yamamoto | H04N 7/185 348/148 |
| 2013/0021174 | A1* | 1/2013 | Silzer, Sr. | G05D 1/0278 701/34.4 |
| 2013/0088593 | A1* | 4/2013 | Ishimoto | E02F 9/226 348/143 |
| 2013/0141581 | A1* | 6/2013 | Mitsuta | H04N 7/002 348/148 |
| 2013/0222573 | A1* | 8/2013 | Onuma | E02F 9/24 348/82 |
| 2013/0345857 | A1* | 12/2013 | Lee | B66C 13/48 700/229 |
| 2014/0085476 | A1* | 3/2014 | Toyofuku | G06V 20/58 348/148 |
| 2014/0111648 | A1* | 4/2014 | Ishimoto | B60R 1/00 348/148 |
| 2014/0226015 | A1* | 8/2014 | Takatsudo | H04N 7/18 348/148 |
| 2014/0258928 | A1* | 9/2014 | Brush | B60Q 1/0076 715/810 |
| 2014/0354813 | A1* | 12/2014 | Ishimoto | E02F 9/24 348/148 |
| 2015/0009285 | A1* | 1/2015 | Morishima | H04N 23/62 348/36 |
| 2015/0022664 | A1* | 1/2015 | Pflug | G06F 3/04883 348/148 |
| 2015/0109446 | A1* | 4/2015 | Takano | B60R 25/10 348/148 |
| 2015/0138338 | A1* | 5/2015 | Asada | H04N 23/90 348/118 |
| 2015/0175071 | A1* | 6/2015 | Ishimoto | H04N 7/18 348/148 |
| 2015/0183370 | A1* | 7/2015 | Nakanishi | E02F 9/261 348/148 |
| 2015/0217690 | A1* | 8/2015 | Mitsuta | G06T 3/4038 348/148 |
| 2015/0222858 | A1* | 8/2015 | Tanuki | H04N 7/181 348/148 |
| 2015/0326829 | A1* | 11/2015 | Kurihara | H04N 7/181 348/148 |
| 2015/0332114 | A1* | 11/2015 | Springer | G06F 18/24 348/148 |
| 2015/0343976 | A1* | 12/2015 | Lim | G01S 15/931 340/435 |
| 2016/0057354 | A1 | 2/2016 | Shigemura | |
| 2016/0082840 | A1* | 3/2016 | Yoshida | B60Q 9/008 701/36 |
| 2016/0086033 | A1* | 3/2016 | Molin | G06V 40/10 345/419 |
| 2016/0147073 | A1* | 5/2016 | Onda | B60R 1/00 345/7 |
| 2016/0152184 | A1* | 6/2016 | Ogawa | G09G 5/10 345/589 |
| 2016/0170487 | A1* | 6/2016 | Saisho | B60K 35/00 345/156 |
| 2016/0191886 | A1* | 6/2016 | Tanabe | G07C 5/06 386/240 |
| 2016/0200252 | A1* | 7/2016 | Oota | E02F 9/2033 348/148 |
| 2016/0236616 | A1 | 8/2016 | Kurihara et al. | |
| 2016/0301864 | A1* | 10/2016 | Petrany | B60R 1/00 |
| 2016/0332572 | A1* | 11/2016 | Gibeau | B60L 53/126 |
| 2016/0348504 | A1* | 12/2016 | Hanski | E21C 29/22 |
| 2016/0355131 | A1* | 12/2016 | Murasumi | G06V 20/58 |
| 2016/0379497 | A1* | 12/2016 | Hatakeyama | G08G 1/16 340/435 |
| 2017/0011539 | A1* | 1/2017 | Oshima | B60R 11/04 |
| 2017/0018070 | A1* | 1/2017 | Onuma | G08G 1/166 |
| 2017/0021765 | A1* | 1/2017 | Mori | B60R 1/00 |
| 2017/0028917 | A1* | 2/2017 | Tauchi | H04N 23/63 |
| 2017/0030054 | A1* | 2/2017 | Okumura | E02F 9/261 |
| 2017/0034454 | A1* | 2/2017 | Sawada | B60R 1/12 |
| 2017/0036602 | A1* | 2/2017 | Kröll | E02F 3/181 |
| 2017/0069090 | A1* | 3/2017 | Okumura | G06F 18/00 |
| 2017/0084176 | A1* | 3/2017 | Nakamura | B60K 35/00 |
| 2017/0089042 | A1* | 3/2017 | Machida | H04N 7/181 |
| 2017/0101056 | A1* | 4/2017 | Park | G08G 1/04 |
| 2017/0140229 | A1* | 5/2017 | Ogata | B60R 1/00 |
| 2017/0191243 | A1* | 7/2017 | Sharp | E02F 5/06 |
| 2017/0201681 | A1* | 7/2017 | Picalausa | H04N 5/265 |
| 2017/0282794 | A1* | 10/2017 | Kowatari | B60Q 9/008 |
| 2017/0330463 | A1* | 11/2017 | Li | G08G 1/015 |
| 2018/0012085 | A1* | 1/2018 | Blayvas | G06F 18/2414 |
| 2018/0024354 | A1* | 1/2018 | Shibata | B60R 1/00 345/7 |
| 2018/0027179 | A1* | 1/2018 | Matsuzaki | H04N 23/675 348/38 |
| 2018/0044893 | A1* | 2/2018 | Machida | G01S 13/04 |
| 2018/0099661 | A1* | 4/2018 | Bae | B62D 15/0285 |
| 2018/0143756 | A1* | 5/2018 | Mildrew | G06T 19/003 |
| 2018/0187397 | A1* | 7/2018 | Fujita | H04N 9/3155 |
| 2018/0198955 | A1* | 7/2018 | Watanabe | G08G 1/16 |
| 2018/0222390 | A1* | 8/2018 | Imaizumi | E02F 9/261 |

(56) References Cited

U.S. PATENT DOCUMENTS

| | | | | |
|---|---|---|---|---|
| 2018/0229656 | A1* | 8/2018 | Yokota | G08G 1/168 |
| 2018/0239136 | A1* | 8/2018 | Ishikawa | G06F 3/013 |
| 2018/0245311 | A1* | 8/2018 | Shike | E02F 9/20 |
| 2018/0282131 | A1* | 10/2018 | Hayashi | B66C 13/44 |
| 2018/0312110 | A1* | 11/2018 | Takae | G08G 1/166 |
| 2018/0370432 | A1* | 12/2018 | Imaizumi | B60R 1/00 |
| 2019/0003152 | A1* | 1/2019 | Nakamura | E02F 9/20 |
| 2019/0122387 | A1* | 4/2019 | Eom | G06T 5/50 |
| 2019/0145768 | A1* | 5/2019 | Sasamoto | G01C 3/085 |
| | | | | 382/103 |
| 2019/0249397 | A1* | 8/2019 | Mizuno | E02F 9/26 |
| 2019/0333252 | A1* | 10/2019 | Maeda | G06T 11/00 |
| 2020/0036602 | A1* | 1/2020 | Leibovici | G06F 3/0605 |
| 2020/0086889 | A1* | 3/2020 | Kaneko | G08G 1/166 |
| 2020/0148203 | A1* | 5/2020 | Taniguchi | G06T 1/00 |
| 2020/0226849 | A1* | 7/2020 | Mizuochi | E02F 9/24 |
| 2020/0291614 | A1* | 9/2020 | Kiyota | G08B 21/02 |
| 2020/0325656 | A1* | 10/2020 | Nakano | E02F 9/261 |
| 2021/0158674 | A1* | 5/2021 | Cherney | G06Q 50/08 |

FOREIGN PATENT DOCUMENTS

| | | |
|---|---|---|
| JP | 2010-121986 | 6/2010 |
| JP | 2010-241548 | 10/2010 |
| JP | 2012-221437 | 11/2012 |
| JP | 2013-042402 | 2/2013 |
| JP | 2014-181508 | 9/2014 |
| JP | 2014-183497 | 9/2014 |
| JP | 2014-191668 | 10/2014 |
| JP | 2014-192770 | 10/2014 |

OTHER PUBLICATIONS

Lee et al., Development of Unmanned Excavator Vehicle System for Performing Dangerous Construction Work (Year: 2019).*
Rasul et al., Predicted Safety Algorithms for Autonomous Excavators Using a 3D LiDAR Sensor. (Year: 2020).*
Orlov et al., Machine Vision System for Autonomous Agricultural Vehicle (Year: 2020).*
R. Terry Dunlay, obstacle avoidance perception processing for the autonomous land vehicle (Year: 1988).*
Ross et al., Online novelty-based visual obstacle detection for field robotics (Year: 2015).*
Zhao et al., Omni-Directional Obstacle Detection for Vehicles (Year: 2020).*
Zhao et al., AES Autonomous Excavator System for Real-World & Hazardous Environments (Year: 2011).*
Jo et al., Proximity Warning and Excavator Control System for Prevention of Collision Accidents (Year: 2017).*
Binaee et al., Assessment of an augmented reality apparatus for the study of visually guided walking and obstacle crossing (Year: 2018).*
Polap et al., Obstacle Detection as a Safety Alert in Augmented Reality Models by the Use of Deep Learning Techniques (Year: 2017).*
Zhan et al., Augmented Reality and Virtual Reality Displays Perspectives and Challenges (Year: 2020).*
Lee et al., Bird's eye view localization of surrounding vehicles Longitudinal and lateral distance estimation with partial appearance (Year: 2019).*
Wang et al., Automatic Parking Based on a Bird's Eye View Vision System (Year: 2013).*
International Search Report for PCT/JP2018/005591 dated May 22, 2018.

* cited by examiner

| CONDITION PERTAINING TO MONITORING TARGET | MARKER ATTRIBUTES | | |
|---|---|---|---|
| PRESENCE OR ABSENCE OF MOVEMENT | TYPE | COLOR | BLINKING |
| MOVING | BOX FRAME | RED | NO |
| STATIONARY | BOX FRAME | RED | YES |

FIG.21

| CONDITION PERTAINING TO MONITORING TARGET | MARKER ATTRIBUTES | | |
|---|---|---|---|
| PRESENCE OR ABSENCE OF MOVEMENT | TYPE | COLOR | BLINKING |
| MOVING | TRAJECTORY LINE | RED | NO |
| STATIONARY | TRAJECTORY LINE | RED | YES |

FIG.22

| CONDITION PERTAINING TO MONITORING TARGET | MARKER ATTRIBUTES | | |
|---|---|---|---|
| PRESENCE OR ABSENCE OF MOVEMENT | TYPE | COLOR | BLINKING |
| MOVING | TRAJECTORY LINE | RED | NO |
| STATIONARY | BOX FRAME | RED | YES |

FIG.23

| CONDITIONS PERTAINING TO MONITORING TARGET | | MARKER ATTRIBUTES | | |
|---|---|---|---|---|
| PRESENCE OR ABSENCE OF MOVEMENT | DISTANCE FROM SHOVEL | TYPE | COLOR | BLINKING |
| MOVING | CLOSE | TRAJECTORY LINE | RED | NO |
| MOVING | DISTANT | TRAJECTORY LINE | BLUE | NO |
| STATIONARY | CLOSE | BOX FRAME | RED | YES |
| STATIONARY | DISTANT | BOX FRAME | BLUE | YES |

FIG.27

| CONDITIONS PERTAINING TO MONITORING TARGET | | MARKER ATTRIBUTES | | |
|---|---|---|---|---|
| PRESENCE OR ABSENCE OF MOVEMENT | CHANGE OVER TIME IN DISTANCE FROM SHOVEL | TYPE | COLOR | BLINKING |
| MOVING | APPROACHING | TRAJECTORY LINE | RED | NO |
| MOVING | NO CHANGE/MOVING AWAY | TRAJECTORY LINE | BLUE | NO |
| STATIONARY | APPROACHING | BOX FRAME | RED | YES |
| STATIONARY | NO CHANGE/MOVING AWAY | BOX FRAME | BLUE | YES |

FIG.28

| CONDITIONS PERTAINING TO MONITORING TARGET | | | MARKER ATTRIBUTES | | |
|---|---|---|---|---|---|
| PRESENCE OR ABSENCE OF MOVEMENT | DISTANCE FROM SHOVEL | CHANGE OVER TIME IN DISTANCE FROM SHOVEL | TYPE | COLOR | BLINKING |
| MOVING | CLOSE | APPROACHING | TRAJECTORY LINE | RED | YES |
| MOVING | CLOSE | NO CHANGE/ MOVING AWAY | TRAJECTORY LINE | BLUE | YES |
| MOVING | DISTANT | APPROACHING | TRAJECTORY LINE | RED | NO |
| MOVING | DISTANT | NO CHANGE/ MOVING AWAY | TRAJECTORY LINE | BLUE | NO |
| STATIONARY | CLOSE | APPROACHING | BOX FRAME | RED | YES |
| STATIONARY | CLOSE | NO CHANGE/ MOVING AWAY | BOX FRAME | BLUE | YES |
| STATIONARY | DISTANT | APPROACHING | BOX FRAME | RED | NO |
| STATIONARY | DISTANT | NO CHANGE/ MOVING AWAY | BOX FRAME | BLUE | NO |

SURROUNDINGS MONITORING SYSTEM FOR WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/005591, filed on Feb. 16, 2018 and designating the U.S., which claims priority to Japanese patent application Nos. 2017-027860, filed on Feb. 17, 2017; 2017-061958, filed on Mar. 27, 2017; 2017-069313, filed on Mar. 30, 2017; and 2017-073017, filed on Mar. 31, 2017. The entire contents of the foregoing applications are incorporated herein by reference.

BACKGROUND

Technical Field

The present invention relates to surroundings monitoring systems for a work machine.

Description of Related Art

A monitoring system that detects a predetermined monitoring target (such as a person) around a work machine and, in response to detecting the monitoring target, displays a mark representing the position of the monitoring target (such as a frame surrounding the monitoring target) over a screen of a display device that displays an image showing the surrounding situation of the work machine (such as an image captured with a camera or a viewpoint change image generated based on the captured image) is known.

SUMMARY

According to an aspect, a surroundings monitoring system for a work machine includes an image capturing unit configured to capture an image of surroundings of the work machine and a display device configured to display the image of the surroundings of the work machine captured by the image capturing unit and a mark representing the position of a monitoring target. The display device is configured to display the mark in two or more different display forms.

BRIEF DESCRIPTION OF THE DRAWINGS

FIG. 20 is a diagram illustrating a first example of a process of displaying a marker (mark) representing the position of the monitoring target (mark displaying process) by a mark displaying part;

FIG. 21 is a diagram illustrating a second example of the process of displaying the marker (mark) representing the position of the monitoring target (mark displaying process) by the mark displaying part;

FIG. 22 is a diagram illustrating a third example of the process of displaying the marker (mark) representing the position of the monitoring target (mark displaying process) by the mark displaying part;

FIG. 23 is a diagram illustrating a fourth example of the process of displaying the marker (mark) representing the position of the monitoring target (mark displaying process) by the mark displaying part;

FIG. 27 is a diagram illustrating a fifth example of the process of displaying the marker (mark) representing the position of the monitoring target (mark displaying process) by the mark displaying part;

FIG. 28 is a diagram illustrating a sixth example of the process of displaying the marker (mark) representing the position of the monitoring target (mark displaying process) by the mark displaying part;

DETAILED DESCRIPTION

The data, etc., of specification information necessary for displaying a mark representing the position of the monitoring target on the screen (such as the position information of configuration points that identify the shape of the mark), however, may be transmitted to the display device from outside a control device or the like having a monitoring target detecting function, for example. In this case, the communication band may be insufficient for some reason such as an extremely large amount of mark-related data to be transmitted due to a large number of monitoring targets in the image. Therefore, it is desired that the display device can reliably display a mark representing the position of the monitoring target even when the communication band is insufficient during transmission of the specification information of the mark from the outside.

According to an embodiment, it is possible to provide a surroundings monitoring system for a work machine that can ensure that a mark indicating the position of a monitoring target is displayed on a display device that displays an image showing the surrounding situation of the work machine.

An embodiment of the invention is described below with reference to the accompanying drawings.

[Overview of Work Machine]

First, a work machine in which a surroundings monitoring system 100 (see FIG. 2) according to this embodiment is installed is described with reference to FIG. 1.

Figure 1:
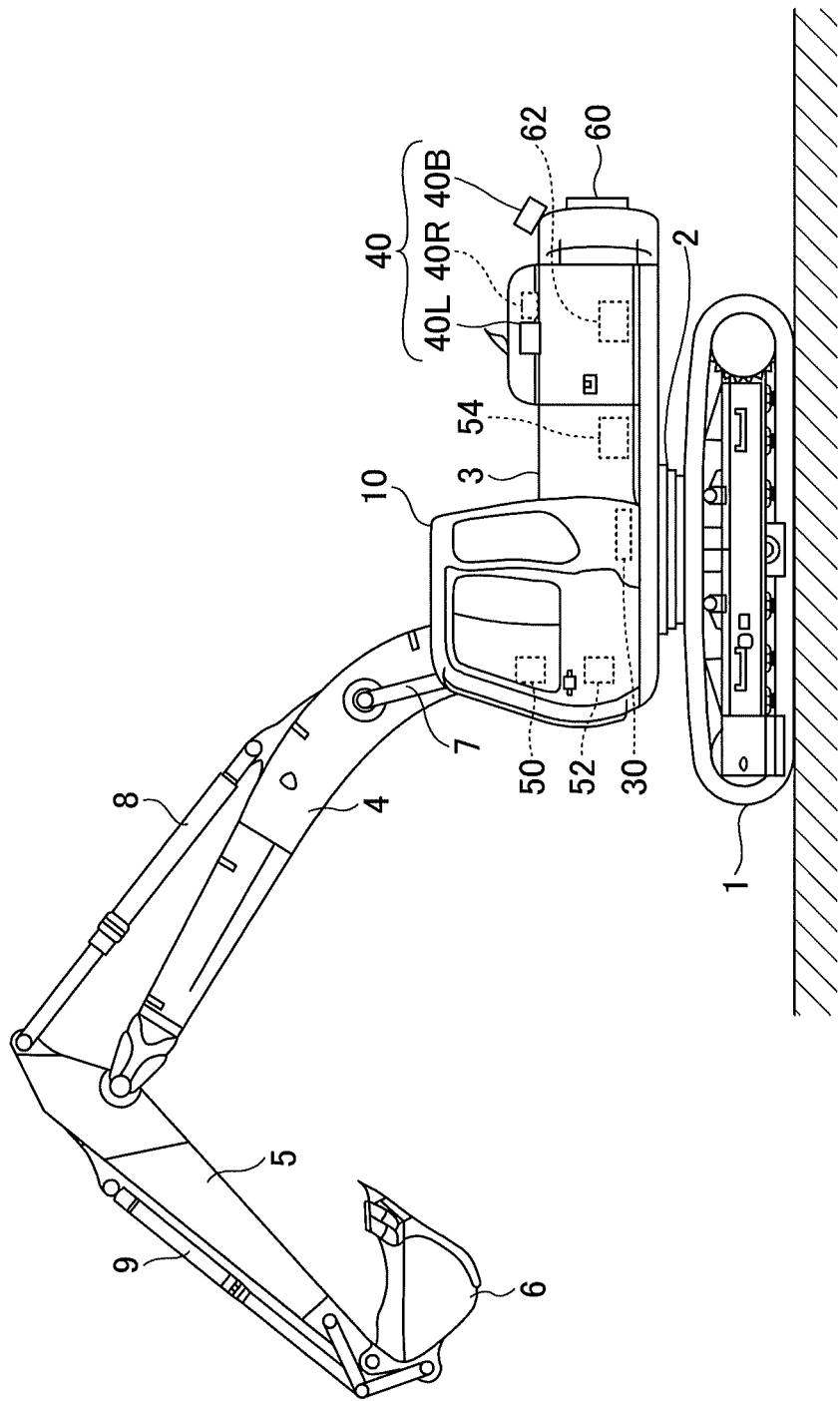
FIG. 1 is a diagram illustrating an example of a work machine in which a surroundings monitoring system is installed.

FIG. 1 is a diagram illustrating an example of a work machine in which the surroundings monitoring system 100 according to this embodiment is installed, and is specifically a side view of a shovel.

The surroundings monitoring system 100 according to this embodiment may also be installed in work machines other than shovels, such as wheel loaders and asphalt finishers.

The shovel according to this embodiment includes a lower traveling body 1; an upper turning body 3 mounted on the lower traveling body 1 through a turning mechanism 2; a boom 4, an arm 5, and a bucket 6 serving as a work apparatus; and a cabin 10 in which an operator sits.

The lower traveling body 1 includes, for example, a pair of right and left crawlers, and is self-propelled with each of the crawlers hydraulically driven by a traveling hydraulic motor (not depicted).

The upper turning body 3 is driven by a turning hydraulic motor or an electric motor (each not depicted) or the like to turn relative to the lower traveling body 1.

The boom 4 is pivotably attached to the front center of the upper turning body 3 to be movable upward and downward. The arm 5 is pivotably attached to the end of the boom 4 to be pivotable upward and downward. The bucket 6 is pivotably attached to the end of the arm 5 to be pivotable upward and downward. The boom 4, the arm 5, and the bucket 6 are hydraulically driven by a boom cylinder 7, an arm cylinder 8, and a bucket cylinder 9, respectively.

The cabin 10 is an operator room in which the operator sits, and is mounted on the front left of the upper turning body 3.

Furthermore, the shovel according to this embodiment includes a controller 30, an image capturing unit 40, and a display device 50 as constituent elements related to the surroundings monitoring system 100.

The controller 30 is a control device that controls the shovel in its entirety or in relation to the below-described specific functions. For example, the controller 30 is installed in the cabin 10.

The image capturing unit 40 is attached to the top of the upper turning body 3 to capture images of the surroundings of the shovel. The image capturing unit 40 includes a back camera 40B, a left side camera 40L, and a right side camera 40R.

The back camera 40B is attached to the top of the back end of the upper turning body 3 to capture an image of an area behind the upper turning body 3.

The left side camera 40L is attached to the top of the left end of the upper turning body 3 to capture an image of an area to the left of the upper turning body 3.

The right side camera 40R is attached to the top of the right end of the upper turning body 3 to capture an image of an area to the right of the upper turning body 3.

The display device 50 is provided around an operator seat in the cabin 10, specifically at such a position as to be easily visible by the operator or a serviceperson who performs the maintenance of the shovel (hereinafter referred to "operator or the like") seated in the operator seat, and displays various kinds of image information of which the operator is notified under the control of the controller 30. Examples of the display device 50 include a liquid crystal display.

An audio output device 52 is provided around the operator seat in the cabin 10, and outputs various kinds of audio information of which the operator is notified under the control of the controller 30. Examples of the audio output device 52 include a loudspeaker and a buzzer.

A gate lock valve 54 is provided most upstream in a pilot line that supplies a pilot pressure from a pilot pump to an operating apparatus (not depicted) for operating the operating elements (such as the lower traveling body 1, the upper turning body 3, the boom 4, the arm 5, and the bucket 6) of the shovel, and switches the opening and closing of the pilot line. For example, the gate lock valve 54 normally switches the opening and closing of the pilot line in accordance with the output signal (ON signal or OFF signal) of a gate lock switch that operates in conjunction with the operational state of a gate lock lever provided in an area corresponding to an entrance to the operator seat in the cabin 10. Specifically, the gate lock valve 54 opens the pilot line when the output signal of the gate lock switch is the ON signal corresponding to the gate lock lever being pulled up (namely, the operator being seated in the operator seat). The gate lock valve 54 closes the pilot line when the output signal of the gate lock switch is the OFF signal corresponding to the gate lock lever being pulled down (namely, the operator having left the operator seat). Furthermore, for example, the gate lock valve 54 is configured to be able to receive a command signal input from the controller 30, and switches the opening and closing of the pilot line in accordance with the command signal (ON signal or OFF signal) from the controller 30.

As a configuration for enabling the gate lock valve 54 to receive both the output signal of the gate lock switch and a command signal from the controller 30, for example, an OR gate to which both the output signal of the gate lock switch and a command signal from the controller 30 are input (a logic gate that outputs an ON signal if at least one of the inputs is an ON signal) may be adopted.

An external display device 60 (an example of a notifying part) displays various kinds of information to impart to the surroundings of the shovel (e.g., workers working around the shovel, a supervisor such as a site supervisor at a work site where the shovel works, etc.) under the control of the controller 30. The external display device 60 may be mounted at any position on the upper turning body 3 to the extent that the various kinds of information are visible from around the shovel, and is mounted on, for example, the back-end side face of the upper turning body 3. The external display device 60 may be either a device that can display only text information, such as an electronic message board or a magnetic reversal message board, or a device that can also display image information, such as a liquid crystal display.

An external audio output device 62 (an example of the notifying part) outputs various kinds of audio information to impart to the surroundings of the shovel under the control of the controller 30. The external audio output device 62 may be mounted at any position on the upper turning body 3 to the extent that the audio information can reach a predetermined area around the shovel. Examples of the external audio output device 52 include a loudspeaker and a buzzer.

[Overview of Surroundings Monitoring System]

Figure 2:
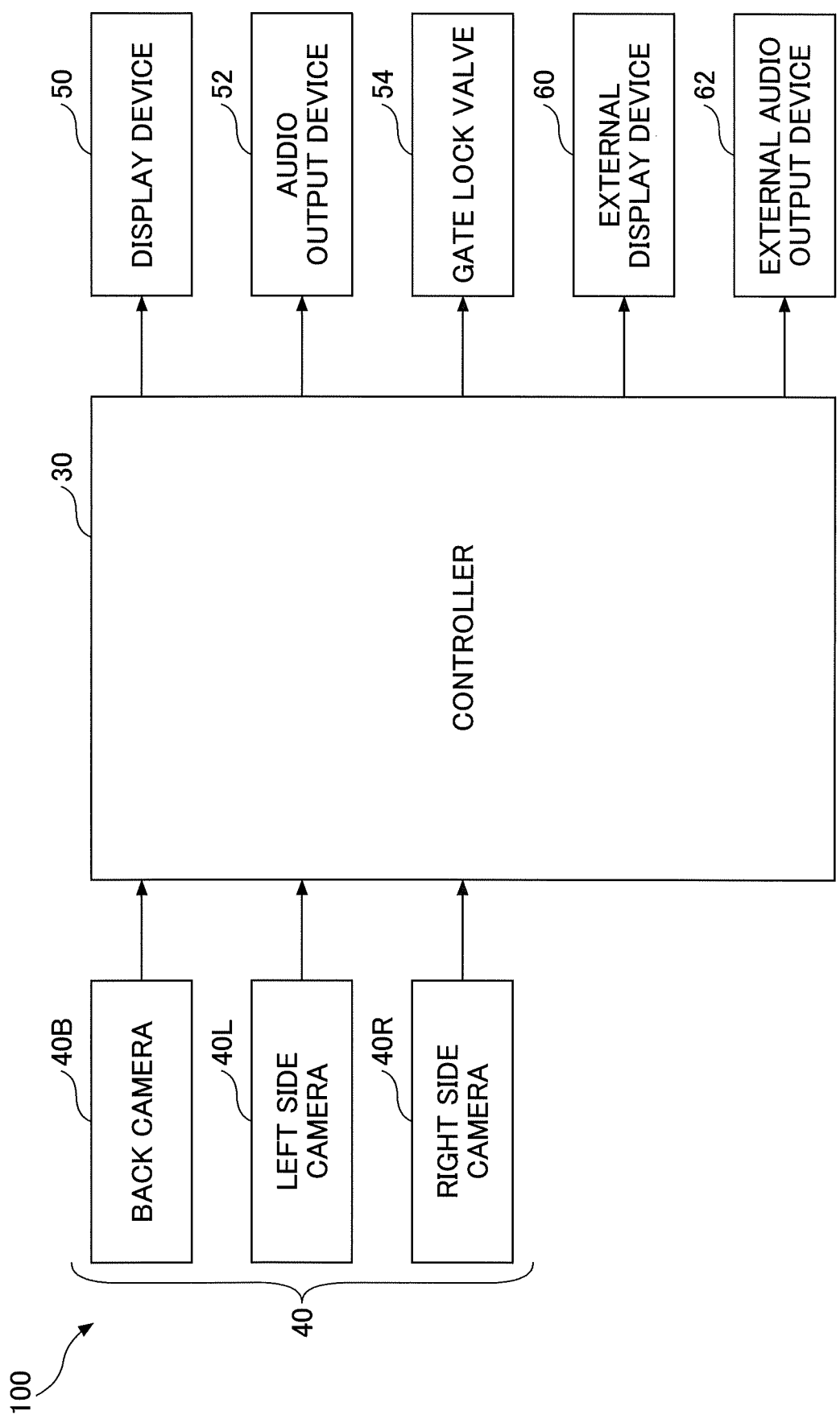
FIG. 2 is a schematic diagram illustrating an example configuration of the surroundings monitoring system.

Next, an overview of the surroundings monitoring system 100 is given with reference to FIG. 2.

FIG. 2 is a schematic diagram illustrating an example configuration of a surroundings monitoring system according to this embodiment.

The surroundings monitoring system 100 monitors the entry of a predetermined object that is a monitoring target (which may be hereinafter simply referred to as "monitoring target") into a predetermined area around the shovel. In response to detecting the monitoring target, the surroundings monitoring system 100 makes a notification to the operator with an alarm or the like, and in some cases, restrict the motion of the shovel. The monitoring target may be a person or any object other than a person, such as an obstacle or a vehicle.

The surroundings monitoring system 100 includes the controller 30, the image capturing unit 40, the display device 50, the audio output device 52, the gate lock valve 54, the external display device 60, and the external audio output device 62.

The controller 30 executes various control processes in the surroundings monitoring system 100. The controller 30, whose functions may be implemented by any hardware, any software, or their combination, is composed mainly of, for example, a microcomputer that includes a CPU (Central Processing Unit), a RAM (Random Access Memory), a ROM (Read Only Memory), a secondary storage, and an I/O (Input-Output interface). The controller 30 implements various functions by executing various programs stored in the ROM or the secondary storage on the CPU.

As described above, the image capturing unit 40 includes the back camera 40B, the left side camera 40L, and the right side camera 40R. The back camera 40B, the left side camera 40L, and the right side camera 40R are attached to the top of the upper turning body 3 such that their optical axes point obliquely downward, and have respective vertical imaging ranges (angles of view) covering the ground near the shovel to an area far from the shovel. During the operation of the shovel, the back camera 40B, the left side camera 40L, and the right side camera 40R output captured images and transmit them to the controller 30 at regular intervals (for example, every $\frac{1}{30}$ seconds).

As described below, the image capturing unit 40 also operates as a sensor that outputs detection information for detecting a monitoring target. Other sensors, however, may be installed in the shovel on condition that the sensors can detect an object around the shovel and output information on a distance to the object. In this case, sensors that output detection information for detecting a monitoring target may include, for example, besides the image capturing unit 40, a LIDAR (Light Detection And Ranging), a millimeter wave radar, a stereo camera, etc., which are described below.

The display device 50 can display, under the control of the controller 30, an image captured by the image capturing unit 40 (which may be hereinafter also referred to as through-the-lens image) and a surrounding image (e.g., a composite image such as a viewpoint change image) that the controller 30 generates (synthesizes) based on images captured by the image capturing unit 40.

The audio output device 52 can output an alarm sound under the control of the controller 30.

The gate lock valve 54 can close the pilot line (not depicted) even with the above-described gate lock lever (not depicted) being pulled up, under the control of the controller 30. This makes it possible to restrict (stop) the motion of the shovel.

The external display device 60 can, under the control of the controller 30, warn against the entry of a monitoring target into a warning area around the shovel by displaying predetermined text information or image information to the surroundings of the shovel.

The external audio output device 62 can, under the control of the controller 30, warn against the entry of a monitoring target into a warning area around the shovel by outputting predetermined audio information to the surroundings of the shovel.

Characteristic functions based on the above-described configuration of the surroundings monitoring system 100 (hereinafter referred to as "characteristic functions" for convenience) are described below. The surroundings monitoring system 100 according to this embodiment can include one or some or all configurations pertaining to a first characteristic function through a fourth characteristic function that are described below. That is, obviously, the first characteristic function through the fourth characteristic function that are described below can be executed independent of one another, and a configuration related to a characteristic function may be suitably combined with a configuration related to another characteristic function or shared.

For example, a monitoring target detecting part 301A, a monitoring target detecting part 301B, an object detecting part 301C, and a detecting part 301D that are described below may have an entirely or partially common functional configuration. Furthermore, monitoring image displaying parts 302A and 302B may have an entirely or partially common function. Furthermore, a mark image displaying part 303A and a mark displaying part 303B may have an entirely or partially common function.

Furthermore, the monitoring image displaying part 302A and the mark image displaying part 303A, the monitoring image displaying part 302B and the mark displaying part 303B, a display controlling part 302C, and a display controlling part 302D may have an entirely or partially common function. Furthermore, an audio controlling part 303C and an alarm outputting part 303D may have an entirely or partially common function. Furthermore, at least one of the audio controlling part 303C and the alarm outputting part 303D may be included in (namely, combined with) the surroundings monitoring system 100 related to the first characteristic function or the second characteristic function. Furthermore, at least one of a restriction controlling part 304D and a determining part 305D may be included in the surroundings monitoring system 100 related to one of the first characteristic function, the second characteristic function, and the third characteristic function.

[First Characteristic Function of Surroundings Monitoring System]

First, the first characteristic function pertaining to the surroundings monitoring system 100 according to this embodiment, specifically, an example of the function of displaying a mark (also referred to as marker) over a monitoring target in a through-the-lens image or a surrounding image displayed on the display device 50 (a mark displaying function) (which may be hereinafter also referred to as "first mark displaying function"), is described.

[Configuration of Surroundings Monitoring System]

Figure 3:
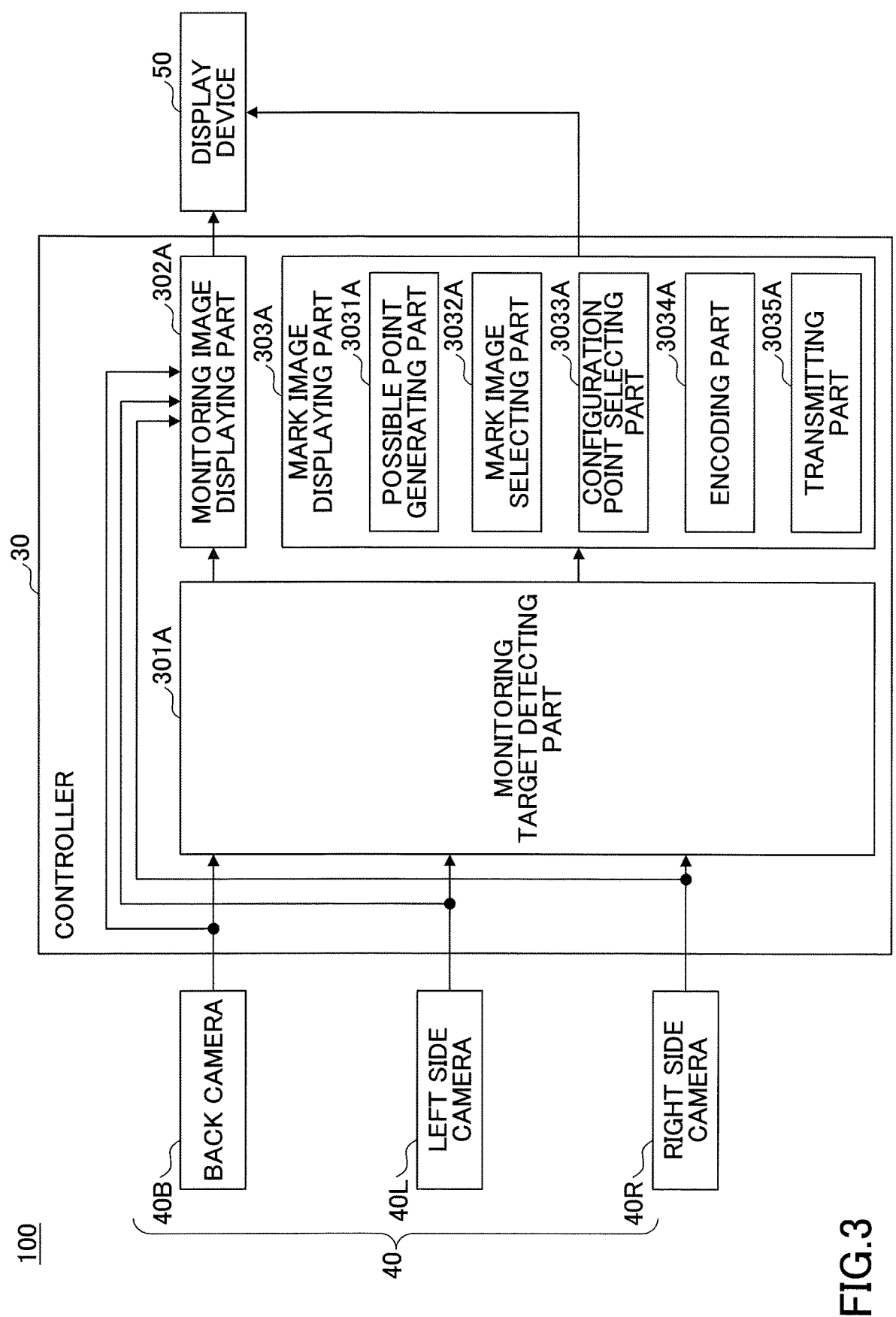
FIG. 3 is a diagram illustrating an example configuration of the surroundings monitoring system related to a first characteristic function (first mark displaying function)

FIG. 3 is a block diagram illustrating an example configuration of the surroundings monitoring system 100 according to this embodiment related to the first characteristic function (first mark displaying function).

The illustration of FIG. 3 focuses on a configuration related to the first characteristic function, and other configurations illustrated in FIGS. 1 and 2 are omitted.

As described above, the surroundings monitoring system 100 monitors the entry of a predetermined object (a vehicle and a person according to this embodiment) into a predetermined area around the shovel, and in response to detecting the predetermined object, makes a notification to the operator or the like. The surroundings monitoring system 100 includes the controller 30, the image capturing unit 40, and the display device 50.

As described above, the controller 30 (an example of a control device) executes various control processes in the surroundings monitoring system 100. The controller 30 includes, for example, the monitoring target detecting part 301A, the monitoring image displaying part 302A, and the mark image displaying part 303A as functional parts implemented by executing various programs stored in the ROM or the nonvolatile secondary storage on the CPU.

As described above, the image capturing unit 40 includes the back camera 40B, the left side camera 40L, and the right side camera 40R. The back camera 40B, the left side camera 40L, and the right side camera 40R are attached to the top of the upper turning body 3 such that their optical axes point obliquely downward, and have respective relatively wide vertical imaging ranges (angles of view) covering the ground near the shovel to an area far from the shovel. During the operation of the shovel, the back camera 40B, the left side camera 40L, and the right side camera 40R output captured images and transmit them to the controller 30 at predetermined intervals (for example, every 1/30 seconds).

The display device 50 displays a monitoring image showing the surrounding situation of the shovel captured by the image capturing unit 40, under the control of the controller 30 (specifically, the monitoring image displaying part 302A). The monitoring image includes an image captured by the image capturing unit 40 (a through-the-lens image), a surrounding image (such as a viewpoint change image) that the controller 30 (specifically, the monitoring image displaying part 302A) generates based on images captured by the image capturing unit 40, etc. The details are described below. (See FIGS. 4 and 5.)

The monitoring target detecting part 301A detects a predetermined monitoring target around the shovel. As described above, examples of monitoring targets include a person, a work vehicle (truck), other obstacles, etc. The following description of the first characteristic function focuses on the case where the monitoring target is a person. Specifically, the monitoring target detecting part 301A detects a monitoring target (namely, a person) within a predetermined area (hereinafter referred to as "monitoring area") around the shovel, e.g., within a predetermined distance D1 (such as 5 meters) from the shovel, based on a captured image captured by the image capturing unit 40. For example, by applying known various image processing techniques and machine learning-based identifiers as desired, the monitoring target detecting part 301A can recognize a person in the captured image of the image capturing unit 40 and identify the actual position of the recognized person (a distance D from the shovel to the recognized person, etc.).

Furthermore, the monitoring target detecting part 301A transmits, to the mark image displaying part 303A, information (representative point information) on a point (representative point) representing the position of a detected person within the captured image, generated in the process of detecting a person by image processing based on the captured image of the image capturing unit 40. The representative point may be, for example, any point such as a point corresponding to the foot position or head position of the detected person in the captured image. The following description is given based on the assumption that the representative point is a point corresponding to the foot position of the detected person in the captured image.

The monitoring target detecting part 301A may detect a monitoring target based on the detection result (distance image or the like) of another sensor such as a LIDAR, a millimeter wave radar, a stereo camera or the like, instead of or in addition to the captured image of the image capturing unit 40.

The monitoring image displaying part 302A displays a monitoring image showing the surrounding situation of the shovel captured by the image capturing unit 40 on the display device 50 in accordance with the operator's various operations or the like. For example, the monitoring image displaying part 302A directly displays the captured image (through-the-lens image) of the image capturing unit 40, namely, the back camera 40B, the left side camera 40L, and the right side camera 40R, as a monitoring image on the display device 50 in accordance with the operator's predetermined operation. In this case, the monitoring image displaying part 302A may either display the image captured by one of the back camera 40B, the left side camera 40L, and the right side camera 40R on the display device 50 or simultaneously display the images captured by two or more (two or three) of the cameras on the display device 50, depending on the contents of the operator's operation or the contents of settings. Furthermore, for example, the monitoring image displaying part 302A generates a surrounding image (e.g., a viewpoint change image) based on the captured image of the image capturing unit 40 and displays it on the display device 50 in accordance with the operator's predetermined operation. Specifically, the monitoring image displaying part 302A generates, as a surrounding image, a viewpoint change image (an image viewed from a virtual viewpoint) by performing a known viewpoint changing process based on the captured images of the back camera 40B, the left side camera 40L, and the right side camera 40R, and displays it on the display device 50. Furthermore, when displaying a surrounding image on the display device 50, the monitoring image displaying part 302A displays a shovel image schematically representing the shovel together on the display device 50 in order to clearly indicate the relative positional relationship of the imaging range of the image capturing unit 40 shown in the surrounding image to the shovel. That is, the monitoring image displaying part 302A generates a monitoring image including a shovel image and a surrounding image placed along the periphery of the shovel image in accordance with the relative positional relationship between the shovel and the imaging range of the image capturing unit 40, and displays it on the display device 50. The monitoring image displayed on the display device 50 is described below with reference to FIGS. 4 and 5.

Figure 4:
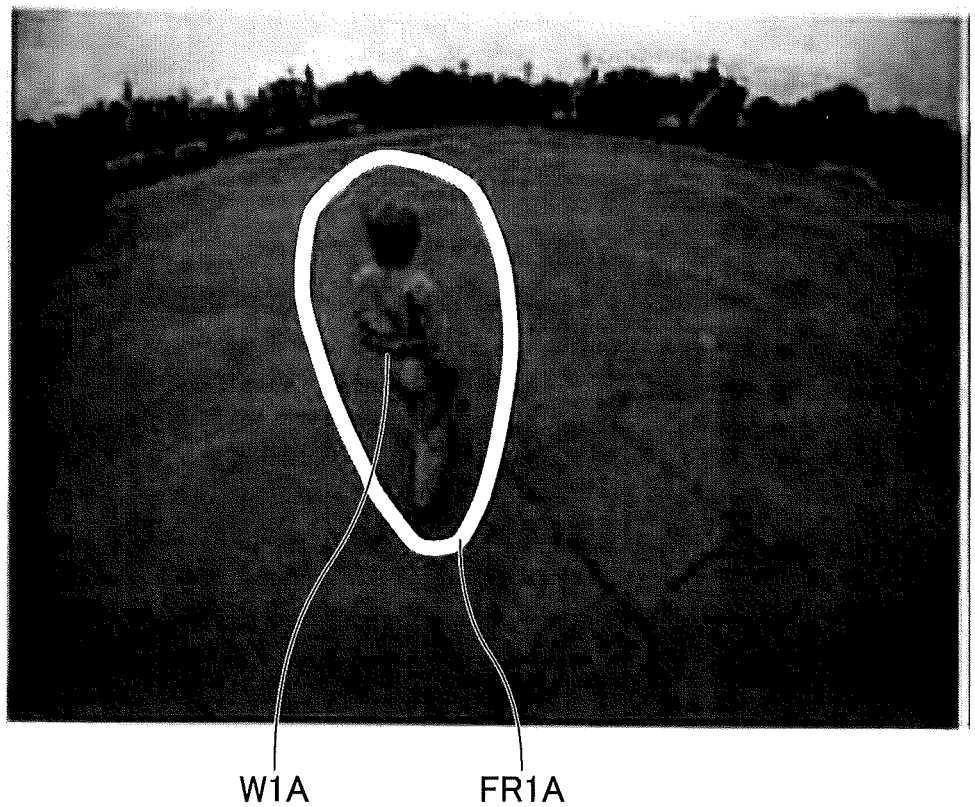
FIG. 4 illustrates an example of a monitoring image displayed on a display device.
Figure 5:
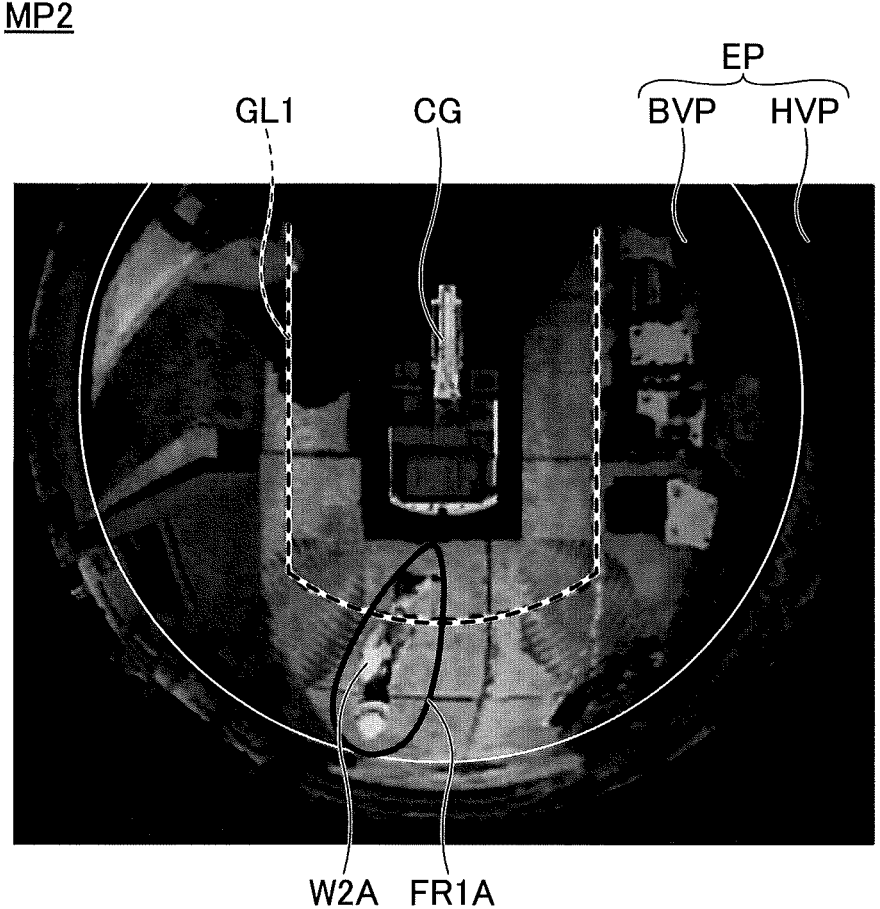
FIG. 5 illustrates another example of the monitoring image displayed on the display device.

FIG. 4 illustrates an example of the monitoring image (a monitoring image MP1) displayed on the display device 50, and is specifically a diagram illustrating a through-the-lens image displayed on the display device 50 as the monitoring image MP1. FIG. 5 illustrates another example of the monitoring image (a monitoring image MP2) displayed on the display device 50, and is specifically a diagram illustrating the monitoring image MP2 including a surrounding image EP (a viewpoint change image) and a shovel image CG, displayed on the display device 50.

As illustrated in FIG. 4, an image captured by a camera among the back camera 40B, the left side camera 40L, and the right side camera 40R is displayed on a laterally elongated rectangular screen (for example, a screen of an aspect ratio of 4:3) on the display device 50.

Furthermore, according to this example, a person (a worker W1A) is included in the through-the-lens image displayed on the display device 50. Furthermore, a mark image FR1A representing the position of the worker W1A (the position detected by the monitoring target detecting part 301A according to this embodiment), that is, a frame surrounding the worker W1A as the mark image FR1A, is superimposed and displayed over the worker W1A in the through-the-lens image. This makes it easier for the operator to notice a monitoring target (namely, a person) appearing on the display device 50 and to visually recognize the situation, etc., of the monitoring target (namely, a person) in the monitoring image, specifically, a through-the-lens image or surrounding image (viewpoint change image), displayed on the display device 50. The mark image is described in detail below.

Furthermore, as illustrated in FIG. 5, the monitoring image MP2 including the shovel image CG and the surrounding image EP placed along the periphery of the shovel image CG as described above is displayed on a laterally elongated rectangular screen (for example, a screen of an aspect ratio of 4:3) on the display device 50. This enables the operator to appropriately understand the positional relationship between a monitoring target (namely, a person) shown in the surrounding image EP and the shovel.

According to this example, the surrounding image EP is a viewpoint change image that is a combination of an overhead view image BVP viewing a surrounding area adjacent to the shovel from directly above and a horizontal image HVP viewing the surroundings of the surrounding area horizontally from the shovel and placed along the periphery of the overhead view image BVP. The surrounding image EP, which is a viewpoint change image, can be obtained by projecting the respective captured images of the back camera 40B, the left side camera 40L, and the right side camera 40R onto a spatial model and re-projecting the projected images projected onto the spatial model onto a different two-dimensional plane. The spatial model is an object onto which a captured image is projected in a virtual space, and is composed of one or more plane surfaces or curved surfaces that include a plane surface or a curved surface different from a plane surface in which the captured image is positioned. In the following, the description continues based on the assumption that a surrounding image according to this embodiment is a viewpoint change image that is a combination of an overhead view image viewing a surrounding area adjacent to the shovel from directly above and a horizontal image viewing the surroundings of the surrounding area horizontally from the shovel.

Furthermore, a guideline GL1 is superimposed and displayed on the monitoring image MP2 (the surrounding image EP). The guideline GL1 represents positions where the distance D from the shovel is a predetermined distance D2 (<D1). As a result, when a monitoring target (namely, a person) is shown in the surrounding image within the monitoring image, the operator can understand how distant the position is from the shovel.

Furthermore, according to this example, the same as in FIG. 4, a person (a worker W2A) is included in the surrounding image EP within the monitoring image MP2 displayed on the display device 50. Furthermore, the mark image FR1A representing the position of the worker W2A (the position detected by the monitoring target detecting part 301A according to this embodiment), that is, a frame surrounding the worker W2A, is superimposed and displayed over the worker W2A in the surrounding image. As described above, the mark image is described in detail below.

Referring back to FIG. 3, the mark image displaying part 303A, in response to detection of a monitoring target by the monitoring target detecting part 301A, superimposes and displays the above-described mark image representing the position of the monitoring target (namely, a person) included in the monitoring image over the monitoring image displayed on the display device 50. The mark image may be in any form to the extent that the mark image can highlight the position of a person included in the monitoring image, and may be formed of, for example, a figure, a color, a pattern, any combination thereof, or the like. The following description is given based on the assumption that the mark image is a figure (hereinafter referred to as "mark figure") according to this embodiment. The mark image displaying part 303A includes a possible point generating part 3031A, a mark image selecting part 3032A, a configuration point selecting part 3033A, an encoding part 3034A, and a transmitting part 3035A as further segmented functional parts.

The possible point generating part 3031A generates multiple possible points (hereinafter referred to as "possible point group") that serve as the possible vertices of a mark figure representing the detected position of a monitoring target (namely, a person) detected by the monitoring target detecting part 301A included in the monitoring image displayed on the display device 50. For example, the possible point generating part 3031A, based on the representative point information of a detected person in the captured image of one of the back camera 40B, the left side camera 40L, and the right side camera 40R obtained from the monitoring target detecting part 301A, recognizes an area in which the person exists in the captured image, and generates a predetermined number of possible points in accordance with a predetermined rule. The following description is given based on the assumption that the number of possible points generated as a possible point group is M (an integer greater than or equal to three). Furthermore, when the monitoring image displayed on the display device 50 is a surrounding image such as a viewpoint change image, the possible point generating part 3031A converts the position data (coordinates) of the possible point group in captured images into the position data (coordinates) of the possible point group in the surrounding image based on the same conversion method as in the case of generating a surrounding image from captured images. This makes it possible to generate the possible point group of the vertices of a mark figure representing the detected position of a detected person included in a surrounding image.

Figure 6:
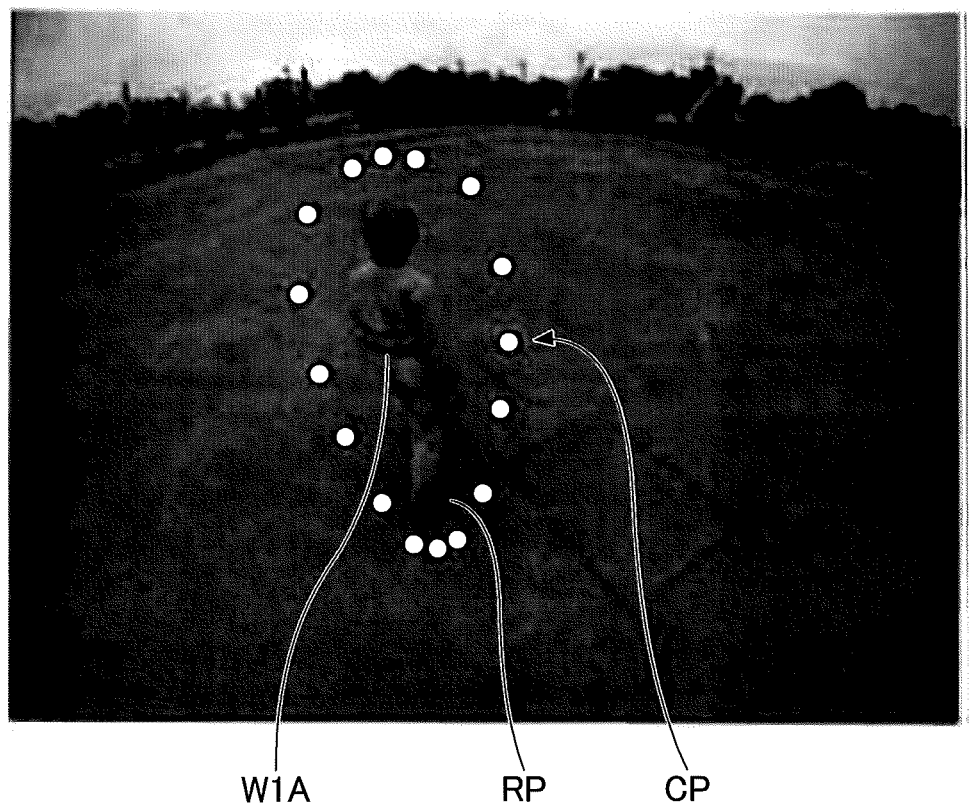
FIG. 6 illustrates an example of a possible point group generated by a possible point generating part.

For example, FIG. 6 illustrates an example of the possible point group corresponding to a person detected by the monitoring target detecting part 301A included in the captured image of the image capturing unit 40. As illustrated in FIG. 6, the worker W1A having her/his back turned is shown near the center of the captured image of the image capturing unit 40, namely, one of the back camera 40B, the left side camera 40L, and the right side camera 40R, and a representative point RP generated by the monitoring target detecting part 301A is shown near the feet of the worker W1A. According to this example, a possible point group CP is generated as a group of 16 (M=16) possible points (white circles) in total in such a manner as to surround the worker W1A included in the captured image.

Referring back to FIG. 3, the mark image selecting part 3032A (an example of a selecting part) selects a mark image (a mark figure) to be actually superimposed and displayed over the monitoring image of the display device 50 from among predetermined types of mark images (mark figures). According to this embodiment, multiple types of possible mark figures include two or more types of figures, namely, a line segment, a triangle, a quadrangle, . . . an M-gon, having two or more possible points selected from the possible point group as configuration points. The configuration points mean the end points of a line segment, the vertices of a polygon, or the like. That is, the mark image selecting part 3032A selects one from two or more types of figures having two or more possible points selected from the possible point group (hereinafter referred to as "selected points") as configuration points. Specifically, the mark image selecting part 3032A determines the number of possible points selected as the configuration points of a figure from the possible point group (hereinafter referred to as "selection number"). In the following, the mark image selecting part 3032A selects a mark figure to be superimposed and displayed over the monitoring image from among three types of mark figures: an M-gon (the selection number is M), a quadrangle (the selection number is four), and a line segment (the selection number is two). That is, the following description is given based on the assumption that the mark image selecting part 3032A determines one of M, four, and two as the configuration points of a mark figure. In this case, the number of possible points M included in the possible point group is five or more. The details are described below.

The configuration point selecting part 3033A selects as many configuration points of a mark figure as the selection number determined by the mark image selecting part 3032A from the possible point group generated by the possible point generating part 3031A. In response to selection of an M-gon by the mark image selecting part 3032A, the configuration point selecting part 3033A obviously selects all (M) possible points included in the possible point group as the configuration points of a mark figure. In response to selection of a quadrangle or a line segment by the mark image selecting part 3032A, the configuration point selecting part 3033A selects four or two configuration points from the possible point group (namely, M possible points) in accordance with a predetermined rule.

Figure 7A:
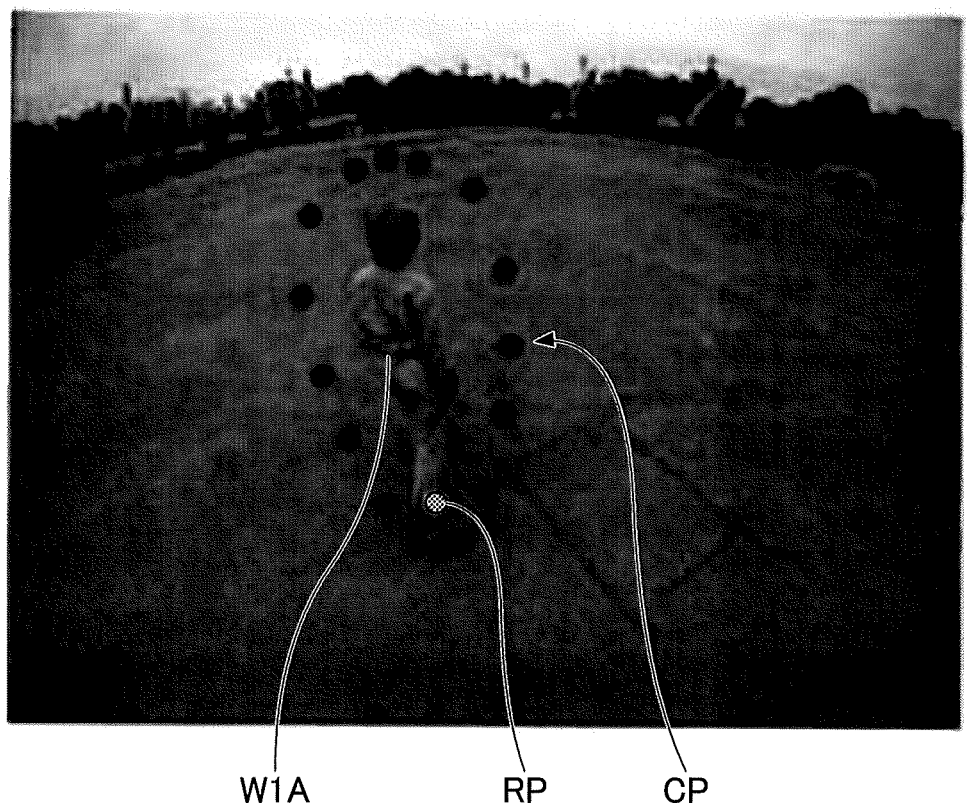
FIGS. 7A and 7B illustrate an example of possible points selected as the vertices of a mark image (mark figure) by a configuration point selecting part.
Figure 7B:
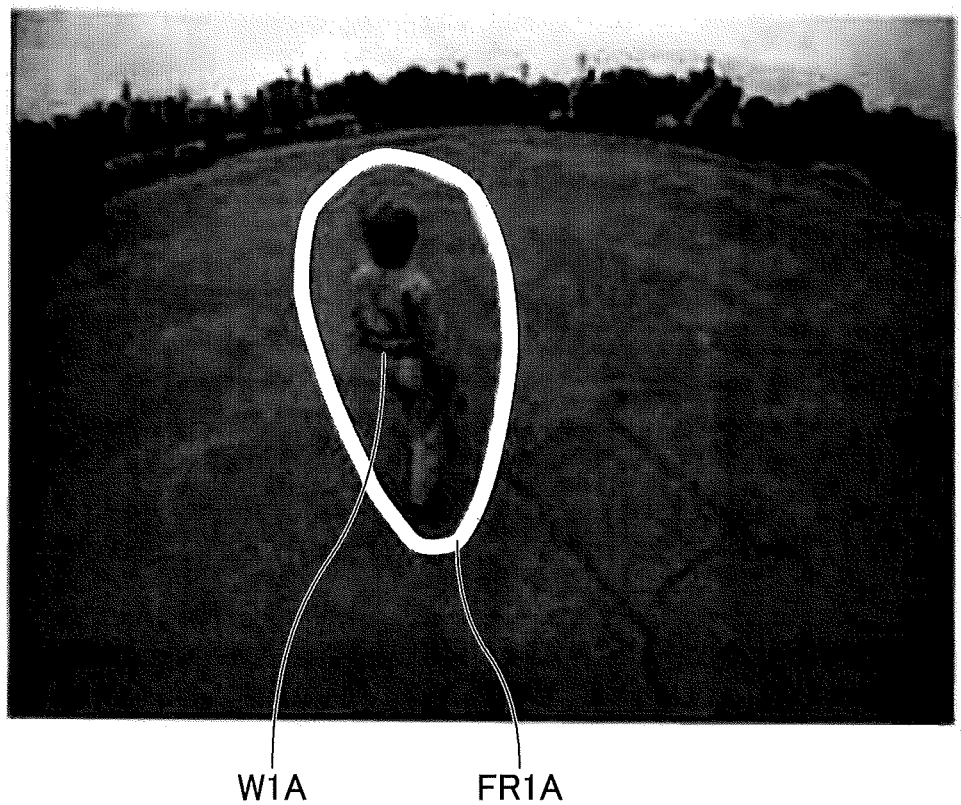
Figure 8A:
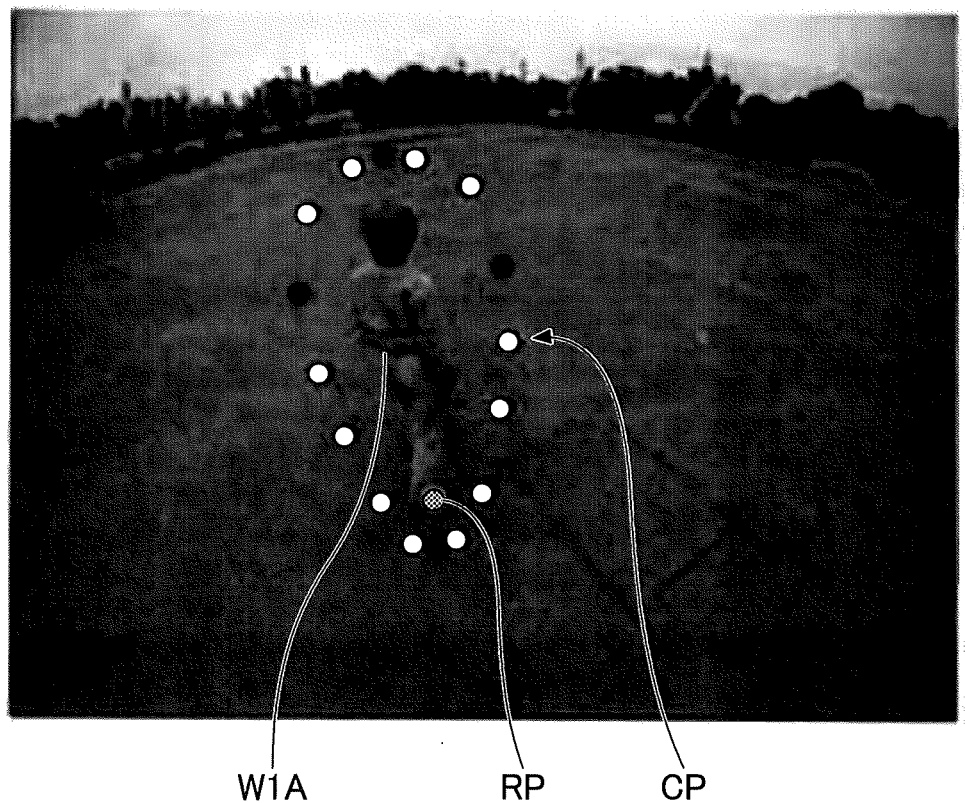
FIGS. 8A and 8B illustrate another example of the possible points selected as the vertices of the mark image (mark figure) by the configuration point selecting part.
Figure 8B:
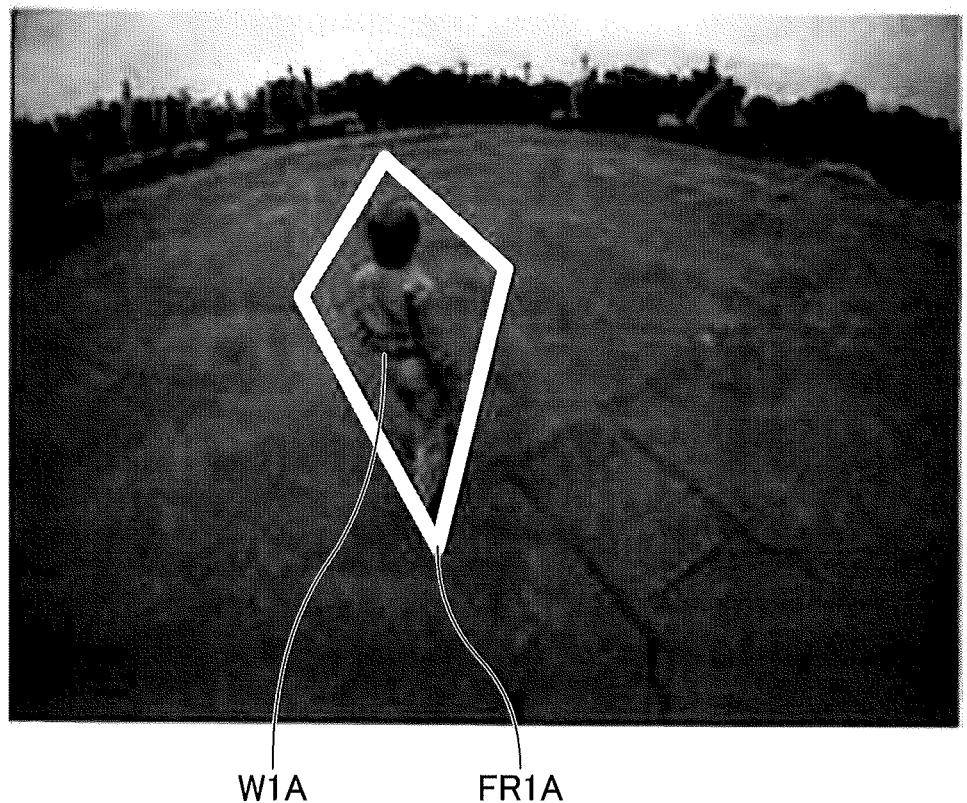
Figure 9A:
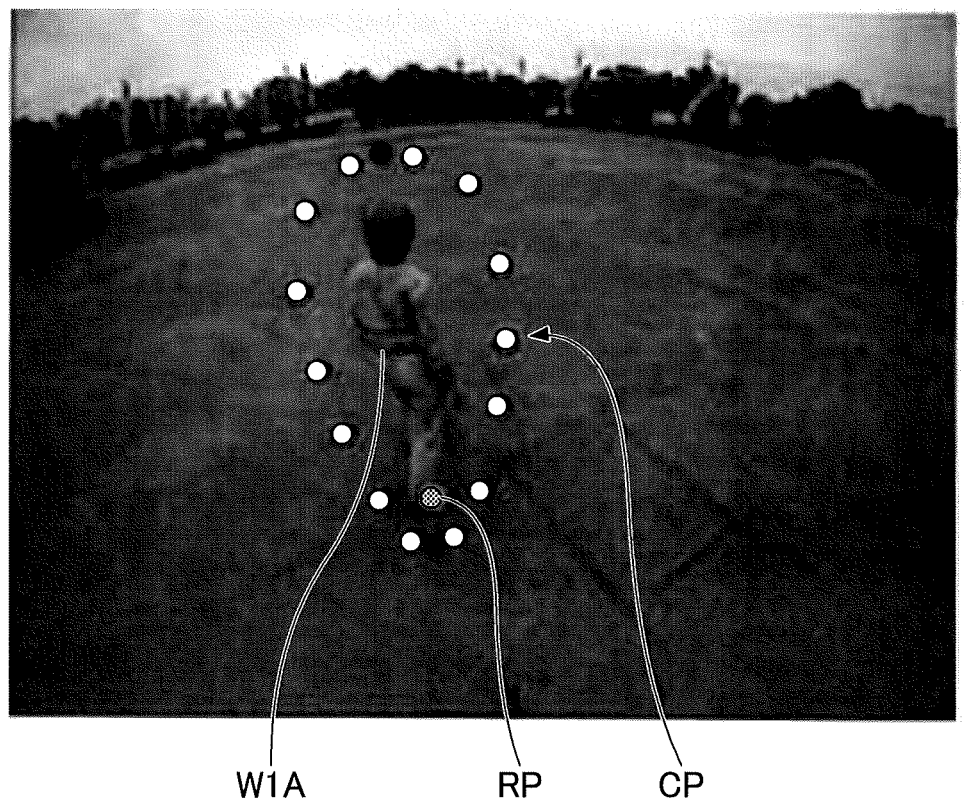
FIGS. 9A and 9B illustrate yet another example of the possible points selected as the vertices of the mark image (mark figure) by the configuration point selecting part.
Figure 9B:
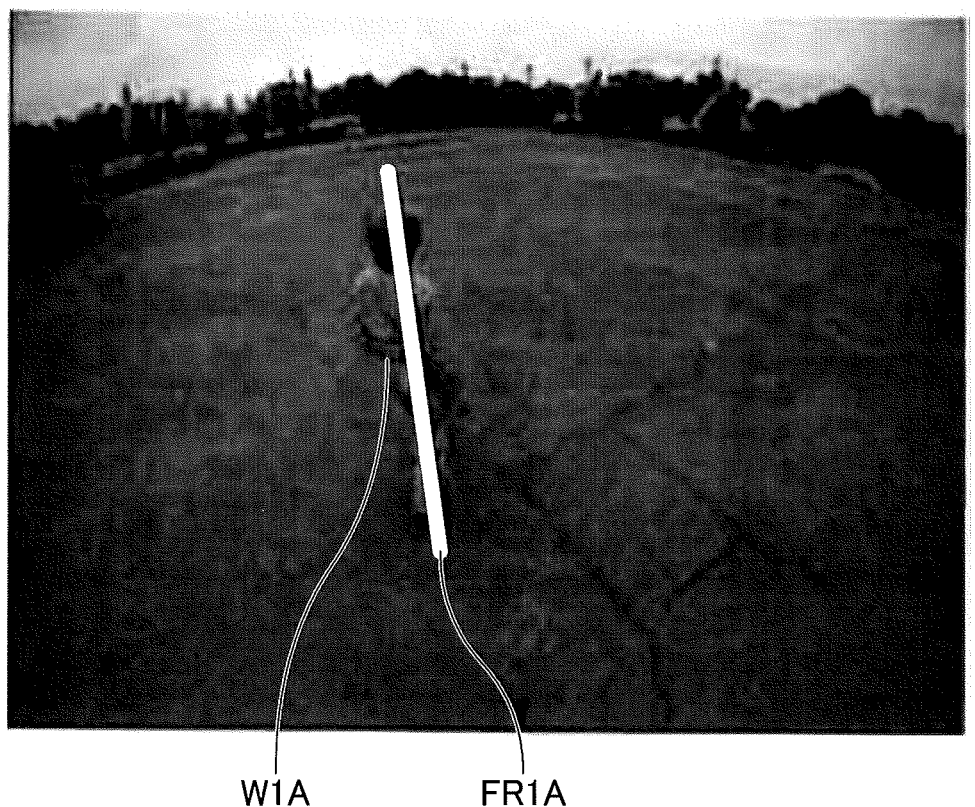

For example, FIG. 7A (FIGS. 7A and 7B), FIG. 8 (FIGS. 8A and 8B), and FIG. 9 (FIGS. 9A and 9B) illustrate an example (in the case where the selection number is M), another example (in the case where the selection number is four), and yet another example (in the case where the selection number is two) of the configuration points of a mark image selected from the possible point group by the configuration point selecting part 3033A. Specifically, FIGS. 7A, 8A and 9A illustrate embodiments of the configuration points of a mark image selected from the possible point group in accordance with the type of a mark figure selected, namely, the selection number determined, by the mark image selecting part 3032A in the case where the possible points illustrated in FIG. 6 are generated. Furthermore, FIGS. 7B, 8B and 9B illustrate mark figures displayed on the display device 50 when the configuration points illustrated in FIGS. 7A, 8A and 9A are selected, respectively.

In FIGS. 7A, 8A and 9A, a configuration point selected by the configuration point selecting part 3033A is indicated by a black circle, and a possible point not selected in the possible point group is indicated by a while circle.

When the type of a mark figure selected by the mark image selecting part 3032A is an M-gon, namely, the determined selection number is M, all the M (=16) possible points of the possible point group placed in such a manner as to surround the worker W1A detected by the monitoring target detecting part 301A in the captured image are obviously selected as the configuration points of a mark figure as illustrated in FIG. 7A. Then, as illustrated in FIG. 7B, an M-gon, namely, a hexadecagon, serving as the mark image FR1A surrounding the worker W1A detected by the monitoring target detecting part 301A is superimposed and displayed over the captured image on the display device 50.

Furthermore, when the type of a mark image selected by the mark image selecting part 3032A is a quadrangle, namely, the determined number of vertices is four, two possible points existing in directions in which the vertical axis of the body of the worker W1A detected by the monitoring target detecting part 301A extends both downward from the feet and upward from the head and two possible points existing in directions in which an axis connecting the shoulders of the worker W1A extends outward from the shoulders are selected as the configuration points of a mark figure in the captured image as illustrated in FIG. 8A. Then, as illustrated in FIG. 8B, a quadrangle serving as the mark image FR1A surrounding the worker W1A detected by the monitoring target detecting part 301A is superimposed and displayed over the captured image on the display device 50.

Thus, when composed of three or more configuration points, the mark figure can be displayed in such a manner as to surround a monitoring target. Therefore, while causing it to serve as the mark of a monitoring target in a monitoring image displayed on the display device 50, it is possible to cause the operator or the like to understand the state of the monitoring target in the monitoring image.

Furthermore, when the type of a mark image selected by the mark image selecting part 3032A is a line segment, namely, the determined number of vertices is two, two possible points existing in directions in which the vertical axis of the body of the worker W1A detected by the monitoring target detecting part 301A extends both downward from the feet and upward from the head are selected as the configuration points of a mark figure in the captured image as illustrated in FIG. 9A. Then, as illustrated in FIG. 9B, a line segment serving as the mark image FR1A substantially indicating the vertical axis of the worker W1A detected by the monitoring target detecting part 301A is superimposed and displayed over the captured image on the display device 50.

Referring back to FIG. 3, the encoding part 3034A encodes the position information, specifically, the position information (coordinate information) in a monitoring image displayed on the display device 50, of the configuration points of a mark figure selected from the possible point group by the configuration point selecting part 3033A in accordance with a predetermined rule, and generates data to be transmitted to the display device 50 (hereinafter referred to as transmission data).

The transmitting part 3035A transmits the transmission data generated by the encoding part 3034A to the display device 50. As a result, the display device 50 can superimpose and display a mark image of the type selected from among multiple types of mark figures by the mark image selecting part 3032A over the monitoring image, based on the position information (coordinate information) of the vertices of the mark figure included in the transmission data.

[Details of Operation of Surroundings Monitoring System]

Next, a characteristic process by the surroundings monitoring system 100 according to this embodiment, namely, a process of displaying a mark image on the display device 50 by the mark image displaying part 303A (a mark image displaying process), is described in detail with reference to FIGS. 10 through 14.

Figure 10:
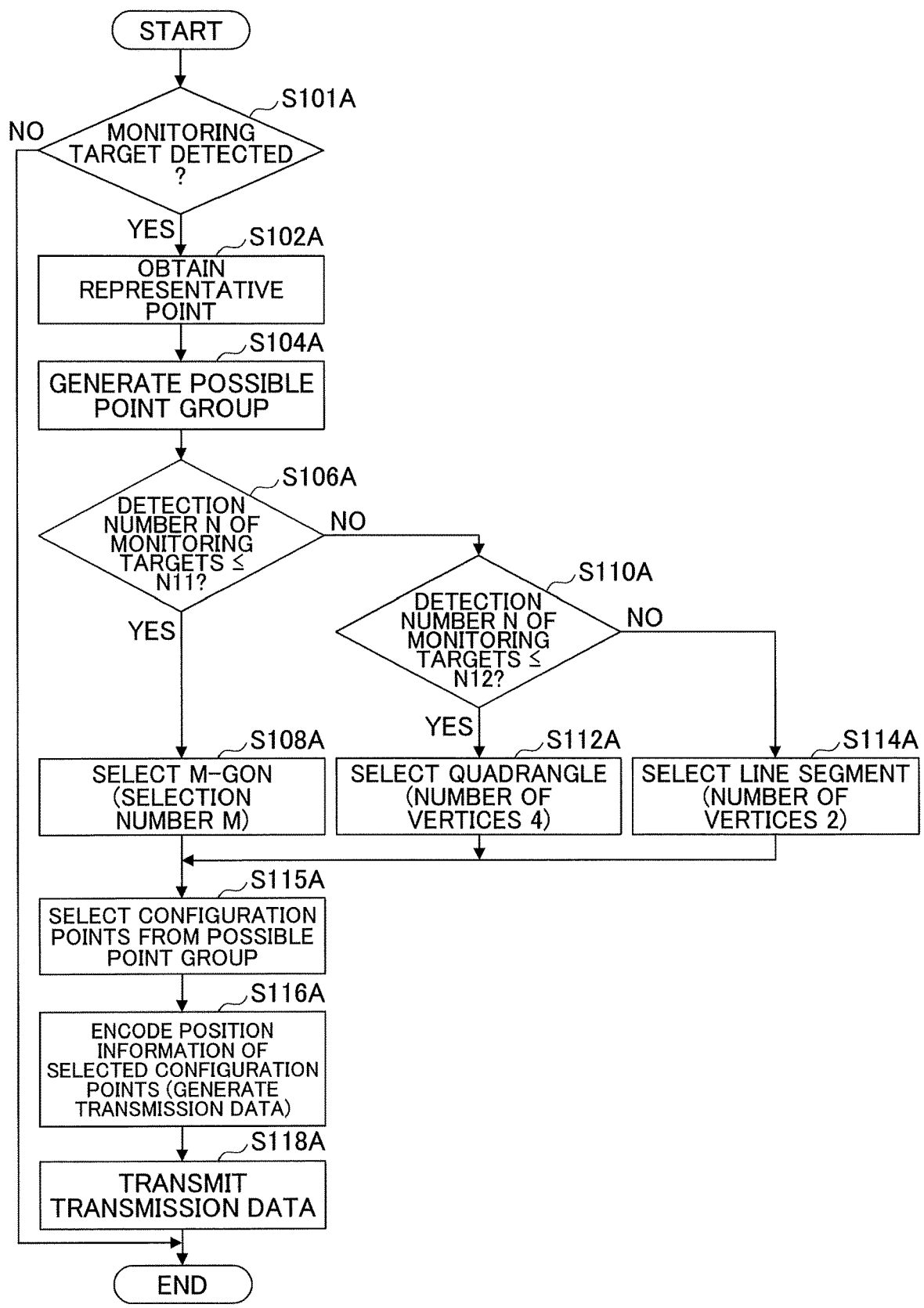
FIG. 10 is a flowchart schematically illustrating a first example of a mark image displaying process by a controller.

First, FIG. 10 is a flowchart schematically illustrating a first example of the mark image displaying process by the controller 30 (the mark image displaying part 303A). The process according to this flowchart is, for example, repeatedly executed at predetermined time intervals (e.g., at intervals at which the monitoring target detecting part 301A performs monitoring target detection) when a monitoring image is displayed on the display device 50 during the operation of the shovel.

At step S101A, the possible point generating part 3031A determines whether a monitoring target is detected by the monitoring target detecting part 301A. The possible point generating part 3031A proceeds to step S102A in response to detection of a monitoring target by the monitoring target detecting part 301A, and ends the process of this time in response to no detection.

At step S102A, the possible point generating part 3031A obtains the representative point of the detected monitoring target (namely, a person) in a captured image from the monitoring target detecting part 301A.

At step S104A, the possible point generating part 3031A generates a possible point group serving as the possible vertices of a mark figure in the monitoring image (captured image or surrounding image) displayed on the display device 50 based on the obtained representative point.

At step S106A, the mark image selecting part 3032A determines whether the number N of monitoring targets actually detected by the monitoring target detecting part 301A (hereinafter referred to as "detection number") is less than or equal to a predetermined number N11. The predetermined number N11 is set as the upper limit of the detection number N that can ensure transmission of transmission data including the position information of M vertices (namely, all possible points generated by the possible point generating part 3031A) within a predetermined transmission period with respect to each monitoring target (namely, a person) detected by the monitoring target detecting part 301A. The mark image selecting part 3032A proceeds to step S108A if the detection number N is less than or equal to the predetermined number N11, and proceeds to step S110A if the detection number N is not less than or equal to the predetermined number N11.

At step S108A, the mark image selecting part 3032A selects an M-gon as the type of a mark figure. That is, the mark image selecting part 3032A determines M (an integer greater than or equal to five) as the number of configuration points of a mark figure to be selected from the possible point group generated by the possible point generating part 3031A (the selection number).

At step S110A, the mark image selecting part 3032A determines whether the detection number N is less than or equal to a predetermined number N12 that is greater than the predetermined number N11. The predetermined number N12 is set as the upper limit of the detection number N that can ensure transmission of transmission data including the position information of four vertices within a predetermined transmission period with respect to each monitoring target (namely, a person) detected by the monitoring target detecting part 301A. The mark image selecting part 3032A proceeds to step S112A if the detection number N is less than or equal to the predetermined number N12, and proceeds to step S114A if the detection number N is not less than or equal to the predetermined number N12.

At step S112A, the mark image selecting part 3032A selects a quadrangle as the type of a mark figure. That is, the mark image selecting part 3032A determines four as the number of configuration points of a mark image to be selected from the possible point group generated by the possible point generating part 3031A (the selection number).

At step S114A, the mark image selecting part 3032A selects a line segment as the type of a mark figure. That is, the mark image selecting part 3032A determines two as the number of configuration points of a mark image to be selected from the possible point group generated by the possible point generating part 3031A (the selection number).

At step S115A, the configuration point selecting part 3033A selects as many configuration points of a mark figure as the selection number determined by the mark image selecting part 3032A during the process of any of steps S108A, S112A and S114A from the possible point group generated by the possible point generating part 3031A.

At step S116A, the encoding part 3034A encodes the position information of the configuration points selected by the configuration point selecting part 3033A, and generates transmission data.

At step S118A, the transmitting part 3035A transmits the transmission data generated by the encoding part 3034A to the display device 50, and ends the process of this time.

Thus, according to this example, the mark image displaying part 303A displays a mark representing the position of a monitoring target in a monitoring image displayed on the display device 50 in two or more different display forms. Specifically, the mark image selecting part 3032A changes the type of a mark image representing the position of a monitoring target in a monitoring image displayed on the display device 50 according to the detection number N of the monitoring targets detected by the monitoring target detecting part 301A. More specifically, as the detection number N increases, the mark image selecting part 3032A decreases the number of configuration points of a mark figure, that is, reduces the amount of data of the position information of configuration points serving as specification information for display a mark image on the display device 50 (hereinafter simply referred to as "mark image specification information"). As a result, the detection number N of the monitoring targets detected by the monitoring target detecting part 301A relatively increases to increase the amount of data of the position information of configuration points serving as the mark image specification information to be transmitted from the controller 30 to the display device 50. Thus, even in a situation where the communication band may be insufficient, it is possible to adjust the amount of data of the mark image specification information in accordance with the detection number N. Specifically, it is possible to reduce the amount of data of the position information of configuration points included in transmission data by reducing the number of configuration points. Therefore, it is possible to ensure transmission of transmission data including the mark image specification information representing the position of a monitoring target in a monitoring image displayed on the display device 50 from the controller 30 to the display device 50 within a predetermined transmission period. Furthermore, as the detection number N increases, the number of mark images increases in proportion to the number of monitoring targets included in a monitoring image, so that the monitoring image may become less easily visible because of excessive information. Such a situation, however, can be prevented because as the detection number N increases, the configuration points of a mark figure are reduced to simplify a mark image.

The mark image specification information may include, in addition to the position information of the configuration points of a figure, information indicating the type of a mark image, such as size, pattern, and color, information indicating the presence or absence of a change in or the blinking of size, pattern, or color, etc. For example, in a situation where the communication band is not insufficient (that is, when the detection number N according to this example is relatively small), the controller 30 (the transmitting part 3035A) may transmit, to the display device 50, a relatively large amount of transmission data including specification information for displaying a mark image that includes a relatively large number of attributes (e.g., shape, color, pattern, the presence or absence of blinking, etc.). This increases the amount of information of a mark image, so that it is possible to more highlight a monitoring target. On the other hand, in a situation where the communication band is insufficient (that is, when the detection number N according to this example is relatively large), the controller 30 (the transmitting part 3035A) may transmit, to the display device 50, a relatively small amount of transmission data including specification information for displaying a mark image that includes a relatively small number of attributes (e.g., shape only). This makes it possible to ensure transmission of data including the mark image specification information within a predetermined transmission period even in a situation where the communication band may be insufficient as described above. The same applies to the following cases of FIGS. 11 and 12.

Figure 11:
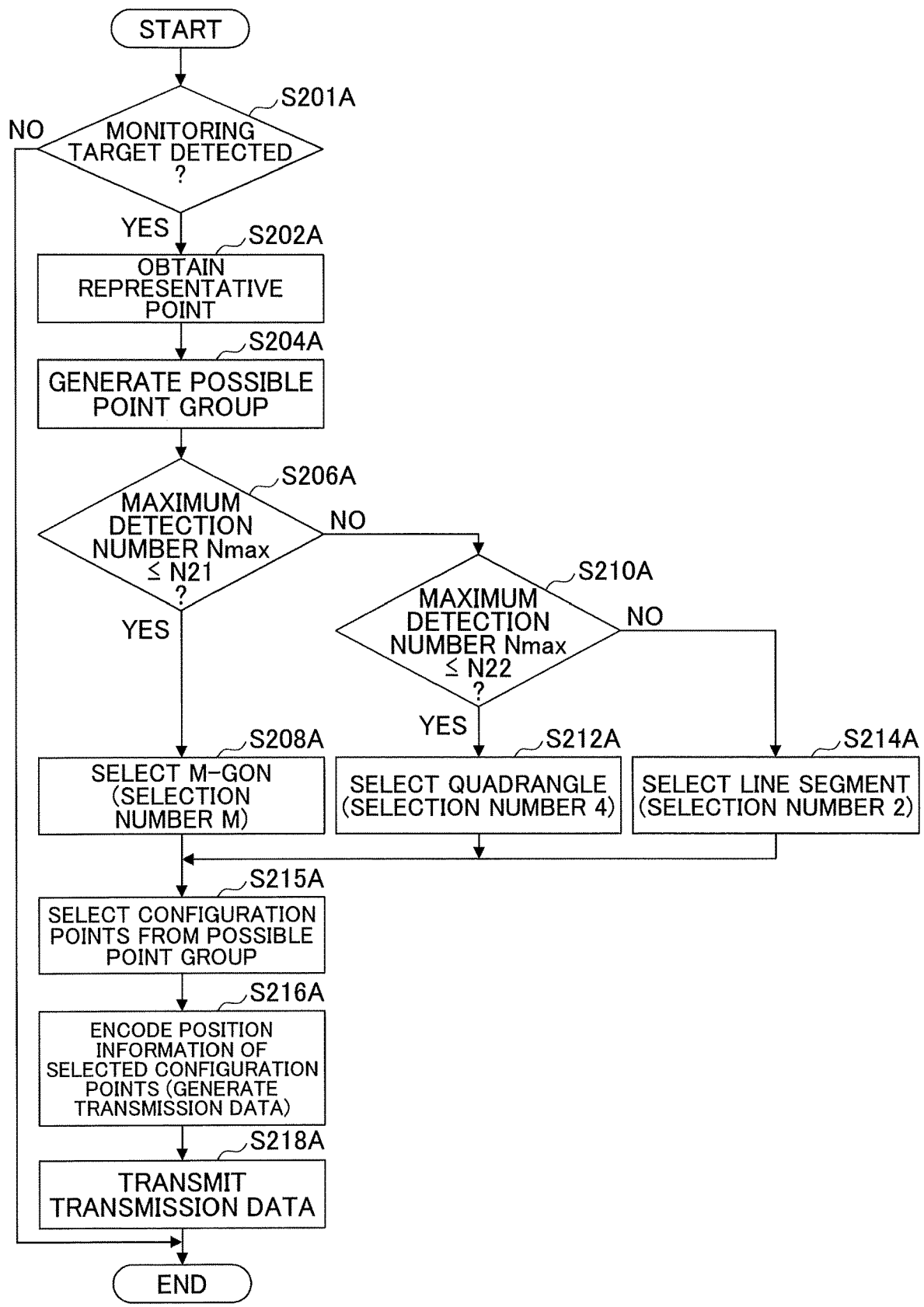
FIG. 11 is a flowchart schematically illustrating a second example of the mark image displaying process by the controller.

Next, FIG. 11 is a flowchart schematically illustrating a second example of the mark image displaying process by the controller 30 (the mark image displaying part 303A). The same as in the above-described first example (FIG. 10), the process according to this flowchart is, for example, repeatedly executed at predetermined time intervals (e.g., at intervals at which the monitoring target detecting part 301A performs monitoring target detection) when a monitoring image is displayed on the display device 50 during the operation of the shovel.

The following description is given based on the assumption that according to the process of this flowchart, a maximum detection number Nmax is preset as the upper limit of the detection number N of the monitoring targets detected by the monitoring target detecting part 301A, namely, the upper limit of the detection number N of monitoring targets detectable within a predetermined processing period. Furthermore, the maximum value of the maximum detection number Nmax may be predetermined based on the processing period, the processing performance of the controller 30, etc., and the maximum detection number Nmax may be set at or below the maximum value in accordance with the operator's predetermined operation.

Steps S201A through S204A and S215A through S218A of this flowchart are the same as in the above-described first example. Therefore, a description is given focusing on differences.

At step S206A, the mark image selecting part 3032A determines whether the maximum detection number Nmax is less than or equal to a predetermined number N21. The predetermined number N21 is set as the upper limit of the maximum detection number Nmax that can ensure, even when monitoring targets (namely, persons) corresponding to the maximum detection number Nmax are detected by the monitoring target detecting part 301A, transmission of transmission data including the position information of M vertices (namely, all of the possible points generated by the possible point generating part 3031A) within a predetermined transmission period with respect to each detected monitoring target. The mark image selecting part 3032A proceeds to step S208A if the maximum detection number Nmax is less than or equal to the predetermined number N21, and proceeds to step S210A if the maximum detection number Nmax is not less than or equal to the predetermined number N21.

At step S208A, the mark image selecting part 3032A selects an M-gon as the type of a mark figure. That is, the mark image selecting part 3032A determines M (an integer greater than or equal to five) as the number of configuration points of a mark figure to be selected from the possible point group generated by the possible point generating part 3031A (the selection number).

At step S210A, the mark image selecting part 3032A determines whether the maximum detection number Nmax is less than or equal to a predetermined number N22 that is greater than the predetermined number N21. The predetermined number N22 is set as the upper limit of the maximum detection number Nmax that can ensure, even when monitoring targets (namely, persons) corresponding to the maximum detection number Nmax are detected by the monitoring target detecting part 301A, transmission of transmission data including the position information of four vertices within a predetermined transmission period with respect to each detected monitoring target. The mark image selecting part 3032A proceeds to step S212A if the maximum detection number Nmax is less than or equal to the predetermined number N22, and proceeds to step S214A if the maximum detection number Nmax is not less than or equal to the predetermined number N22.

At step S212A, the mark image selecting part 3032A selects a quadrangle as the type of a mark figure. That is, the mark image selecting part 3032A determines four as the number of configuration points of a mark image to be selected from the possible point group generated by the possible point generating part 3031A (the selection number).

At step S214A, the mark image selecting part 3032A selects a line segment as the type of a mark figure. That is, the mark image selecting part 3032A determines two as the number of configuration points of a mark image to be selected from the possible point group generated by the possible point generating part 3031A (the selection number).

Thus, according to this example, the same as in FIG. 10 described above, the mark image displaying part 303A displays a mark representing the position of a monitoring target in a monitoring image displayed on the display device 50 in two or more different display forms. Specifically, the mark image selecting part 3032A changes the type of a mark image representing the position of a monitoring target in a monitoring image displayed on the display device 50 according to the maximum detection number Nmax preset as the upper limit of the detection number N of the monitoring targets detected by the monitoring target detecting part 301A. Specifically, as the maximum detection number Nmax increases, the mark image selecting part 3032A decreases the number of configuration points of a mark figure, that is, reduces the amount of data of the position information of configuration points serving as the mark image specification information. As a result, in a situation where the maximum detection number Nmax is set at a relatively large value, even when monitoring targets corresponding to the maximum detection number Nmax are detected by the monitoring target detecting part 301A to increase the amount of transmission data including the mark image specification information to be transmitted from the controller 30 to the display device 50, so that the communication band may be insufficient, it is possible to adjust the amount of data of a mark image in accordance with the maximum detection number Nmax. Therefore, the same as in the case of the above-described first example, it is possible to ensure transmission of transmission data including the mark image specification information representing the position of a monitoring target in a monitoring image displayed on the display device 50 from the controller 30 to the display device 50 within a predetermined transmission period. Furthermore, the same as in the case of the above-described first example, while the number of mark images increases in proportion to the number of monitoring targets included in a monitoring image as the maximum detection number Nmax increases, so that the monitoring image may become less easily visible because of excessive information, such a situation can be prevented because as the maximum detection number Nmax increases, the configuration points of a mark figure are reduced to simplify a mark image.

Figure 12:
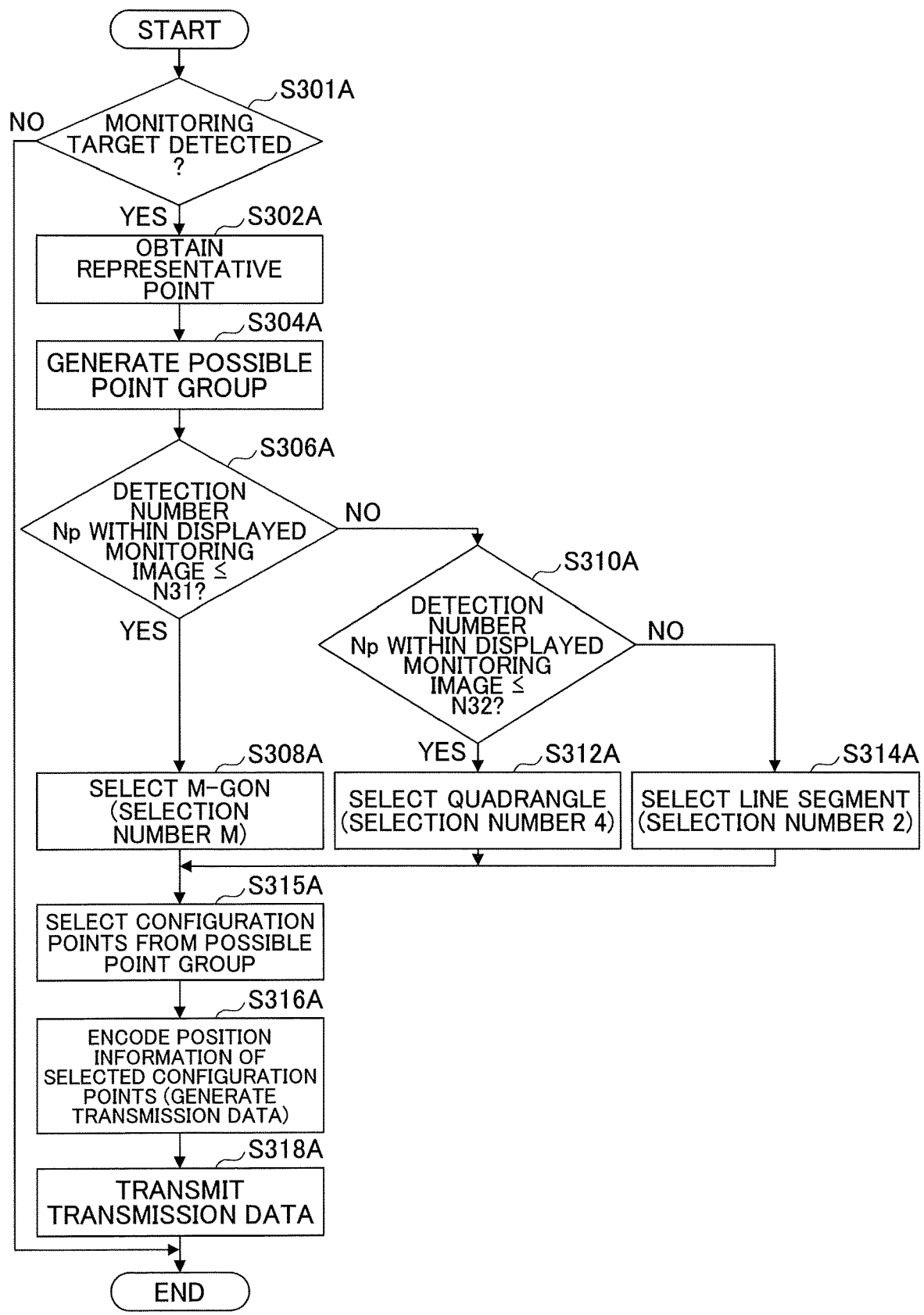
FIG. 12 is a flowchart schematically illustrating a third example of the mark image displaying process by the controller.

Next, FIG. 12 is a flowchart schematically illustrating a third example of the mark image displaying process by the controller 30 (the mark image displaying part 303A). The same as in the above-described first example (FIG. 10), the process according to this flowchart is, for example, repeatedly executed at predetermined time intervals (e.g., at intervals at which the monitoring target detecting part 301A performs monitoring target detection) when a monitoring image is displayed on the display device 50 during the operation of the shovel.

Steps S301A through 5304A and S315A through S318A of this flowchart are the same as in the above-described first example. Therefore, a description is given focusing on differences.

At step S306A, the mark image selecting part 3032A determines whether the number Np of monitoring targets actually detected by the monitoring target detecting part 301A within the imaging range of the image capturing unit 40 corresponding to a monitoring image (a through-the-lens image or a surrounding image) actually displayed on the display device 50 (hereinafter referred to as intra-monitoring-image detection number) is less than or equal to a predetermined number N31. Like the predetermined number N11 of the above-described first example (FIG. 10), the predetermined number N31 is set as the upper limit of the intra-monitoring-image detection number Np that can ensure transmission of transmission data including the position information of M vertices (namely, all possible points generated by the possible point generating part 3031A) within a predetermined transmission period with respect to each monitoring target (namely, a person) detected by the monitoring target detecting part 301A within the imaging range of the image capturing unit 40 corresponding to a monitoring image actually displayed on the display device 50.

At step S308A, the mark image selecting part 3032A selects an M-gon as the type of a mark figure. That is, the mark image selecting part 3032A determines M (an integer greater than or equal to five) as the number of configuration points of a mark figure to be selected from the possible point group generated by the possible point generating part 3031A (the selection number).

At step S310A, the mark image selecting part 3032A determines whether the intra-monitoring-image detection number Np is less than or equal to a predetermined number N32 that is greater than the predetermined number N31. Like the predetermined number N12 of the above-described first example (FIG. 10), the predetermined number N32 is set as the upper limit of the intra-monitoring-image detection number Np that can ensure transmission of transmission data including the position information of four vertices within a predetermined transmission period with respect to each monitoring target (namely, a person) detected by the monitoring target detecting part 301A within the imaging range of the image capturing unit 40 corresponding to a monitoring image actually displayed on the display device 50. The mark image selecting part 3032A proceeds to step S312A if the intra-monitoring-image detection number Np is less than or equal to the predetermined number N32, and proceeds to step S314A if the intra-monitoring-image detection number Np is not less than or equal to the predetermined number N32.

At step S312A, the mark image selecting part 3032A selects a quadrangle as the type of a mark figure. That is, the mark image selecting part 3032A determines four as the number of configuration points of a mark image to be selected from the possible point group generated by the possible point generating part 3031A (the selection number).

At step S314A, the mark image selecting part 3032A selects a line segment as the type of a mark figure. That is, the mark image selecting part 3032A determines two as the number of configuration points of a mark image to be selected from the possible point group generated by the possible point generating part 3031A (the selection number).

Thus, according to this example, the same as in the above-described case of FIG. 10, the mark image displaying part 303A displays a mark representing the position of a monitoring target in a monitoring image displayed on the display device 50 in two or more different display forms. Specifically, the mark image selecting part 3032A changes the type of a mark image representing the position of a monitoring target in a monitoring image displayed on the display device 50 according to the detection number of the monitoring targets detected by the monitoring target detecting part 301A within the imaging range of the image capturing unit 40 corresponding to a monitoring image (a through-the-lens image or a surrounding image) displayed on the display device 50 (the intra-monitoring-image detection number Np). That is, the mark image selecting part 3032A changes, according to the number of monitoring targets included in a monitoring image displayed on the display device 50, the type of a mark image representing the position of a monitoring target in the monitoring image. More specifically, as the intra-monitoring-image detection number Np increases, the mark image selecting part 3032A decreases the number of configuration points of a mark figure to reduce the amount of data of the position information of configuration points serving as the mark image specification information included in transmission data. That is, as the number of monitoring targets included in a monitoring image displayed on the display device 50 increases, the mark image selecting part 3032A decreases the number of configuration points of a mark figure to reduce the amount of data of transmission data. As a result, even in a situation where the intra-monitoring-image detection number Np, namely, the number of monitoring targets included in a monitoring image displayed on the display device 50 relatively increases to increase the amount of data of the position information of configuration points serving as the mark image specification information to be transmitted from the controller 30 to the display device 50, so that the communication band may be insufficient, it is possible to adjust the amount of data of the mark image specification information in accordance with the intra-monitoring-image detection number Np. Furthermore, while the number of mark images increases in proportion to the number of monitoring targets included in a monitoring image as the intra-monitoring-image detection number Np increases, so that the monitoring image may become less easily visible because of excessive information, such a situation can be prevented because as the intra-monitoring-image detection number Np increases, the configuration points of a mark figure are reduced to simplify a mark image. Furthermore, for example, when an image captured by a single camera is displayed on the display device 50 as a monitoring image, the intra-monitoring-image detection number Np may be less than the detection number N of all monitoring targets detected by the monitoring target detecting part 301A based on the captured images of multiple cameras, namely, the back camera 40B, the left side camera 40L, and the right side camera 40R. Therefore, in such a situation, it is possible to make a monitoring target easily visible to the operator by adopting a mark image whose amount of data of specification information is relatively large, namely, a mark image that can highlight a monitoring target more easily. That is, according to this example, the mark image selecting part 3032A can adjust the amount of data of the specification information of a mark image in view of the size of a surrounding area of the shovel corresponding to a monitoring image displayed on the display device 50.

Figure 13:
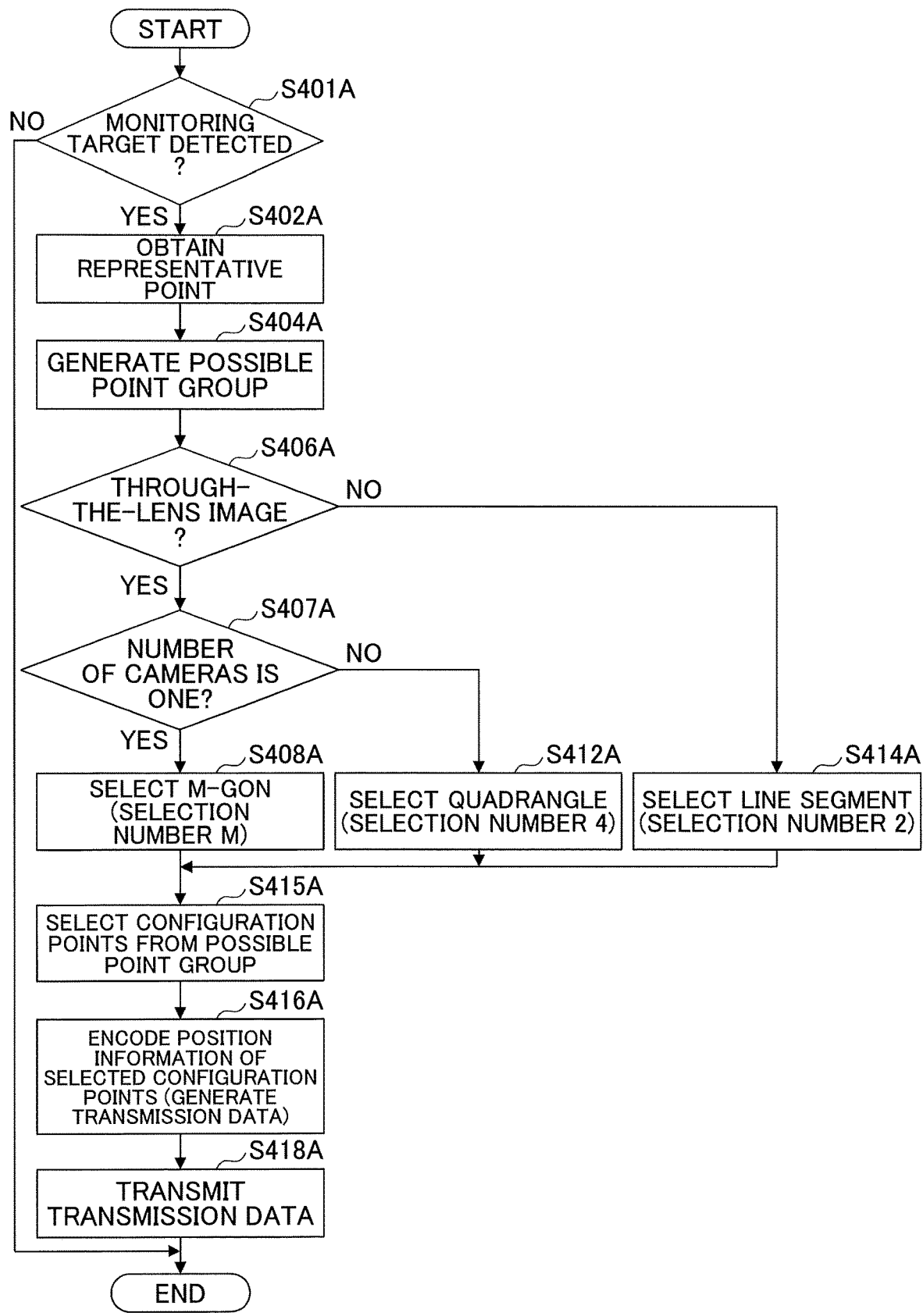
FIG. 13 is a flowchart schematically illustrating a fourth example of the mark image displaying process by the controller.

Next, FIG. 13 is a flowchart schematically illustrating a fourth example of the mark image displaying process by the controller 30 (the mark image displaying part 303A). The same as in the above-described first example (FIG. 10), the process according to this flowchart is, for example, repeatedly executed at predetermined time intervals (e.g., at intervals at which the monitoring target detecting part 301A performs monitoring target detection) when a monitoring image is displayed on the display device 50 during the operation of the shovel.

This example is described based on the assumption that the through-the-lens images of up to two cameras among the back camera 40B, the left side camera 40L, and the right side camera 40R are simultaneously displayed on the display device 50.

Steps S401A through S404A and S415A through S418A of this flowchart are the same as in the above-described first example. Therefore, a description is given focusing on differences.

At step S406A, the mark image selecting part 3032A determines whether a monitoring image displayed on the display device 50 is a through-the-lens image. The mark image selecting part 3032A proceeds to step S407A if the monitoring image displayed on the display device 50 is a through-the-lens image, and proceeds to step S414A if it is not a through-the-lens image (namely, if it is a surrounding image).

At step S407A, the mark image selecting part 3032A determines whether an image captured by only one camera among the back camera 40B, the left side camera 40L, and the right side camera 40R is displayed on the display device 50 as a through-the-lens image. The mark image selecting part 3032A proceeds to step S408A if an image captured by only one camera is displayed on the display device 50 as a through-the-lens image, and otherwise (namely, in the case of images captured by two cameras), proceeds to step S412A.

At step S408A, the mark image selecting part 3032A selects an M-gon as the type of a mark figure. That is, the mark image selecting part 3032A determines M (an integer greater than or equal to five) as the number of configuration points of a mark figure to be selected from the possible point group generated by the possible point generating part 3031A (the selection number).

At step S412A, the mark image selecting part 3032A selects a quadrangle as the type of a mark figure. That is, the mark image selecting part 3032A determines four as the number of configuration points of a mark image to be selected from the possible point group generated by the possible point generating part 3031A (the selection number).

At step S414A, the mark image selecting part 3032A selects a line segment as the type of a mark figure. That is, the mark image selecting part 3032A determines two as the number of configuration points of a mark image to be selected from the possible point group generated by the possible point generating part 3031A (the selection number).

Thus, according to this example, the same as in the above-described case of FIG. 10, etc., the mark image displaying part 303A displays a mark representing the position of a monitoring target in a monitoring image displayed on the display device 50 in two or more different display forms. Specifically, the mark image selecting part 3032A changes the type of a mark image representing the position of a monitoring target in a monitoring image displayed on the display device 50 according to the type of a monitoring image displayed on the display device 50 (that is, whether it is a through-the-lens image or a surrounding image). That is, the mark image selecting part 3032A changes the type of a mark image representing the position of a monitoring target in a monitoring image displayed on the display device 50 according to the number of cameras corresponding to the monitoring image. More specifically, in the case where a surrounding image is displayed on the display device 50, the mark image selecting part 3032A decreases the number of configuration points of a mark figure to reduce the amount of data of the position information of configuration points serving as the mark image specification information included in transmission data compared with the case of a through-the-lens image. That is, as the number of cameras corresponding to a monitoring image displayed on the display device 50 increases, the mark image selecting part 3032A decreases the number of configuration points of a mark figure to reduce the amount of data of transmission data. As the number of cameras corresponding to a monitoring image increases to increase an area around the shovel to be displayed as a monitoring image, the number of detectable monitoring targets tends to increase, so that the amount of data of the position information of configuration points serving as the mark image specification information to be transmitted from the controller 30 to the display device 50 increases. Even in such a situation where the communication band may be insufficient, it is possible to adjust the amount of data of the mark image specification information in accordance with the number of cameras corresponding to a monitoring image. On the other hand, when the number of cameras corresponding to a monitoring image is small, it is possible to display a mark image with so large a number of configuration points as to easily highlight a monitoring target, thus making it easy to urge the operator or the like to be aware of the monitoring target. Furthermore, while the number of mark images increases in proportion to the number of monitoring targets included in a monitoring image as the number of cameras corresponding to the monitoring image increases, so that the monitoring image may become less easily visible because of excessive information, such a situation can be prevented because as the number of cameras corresponding to a monitoring image increases, the configuration points of a mark figure are reduced to simplify a mark image.

Figure 14:
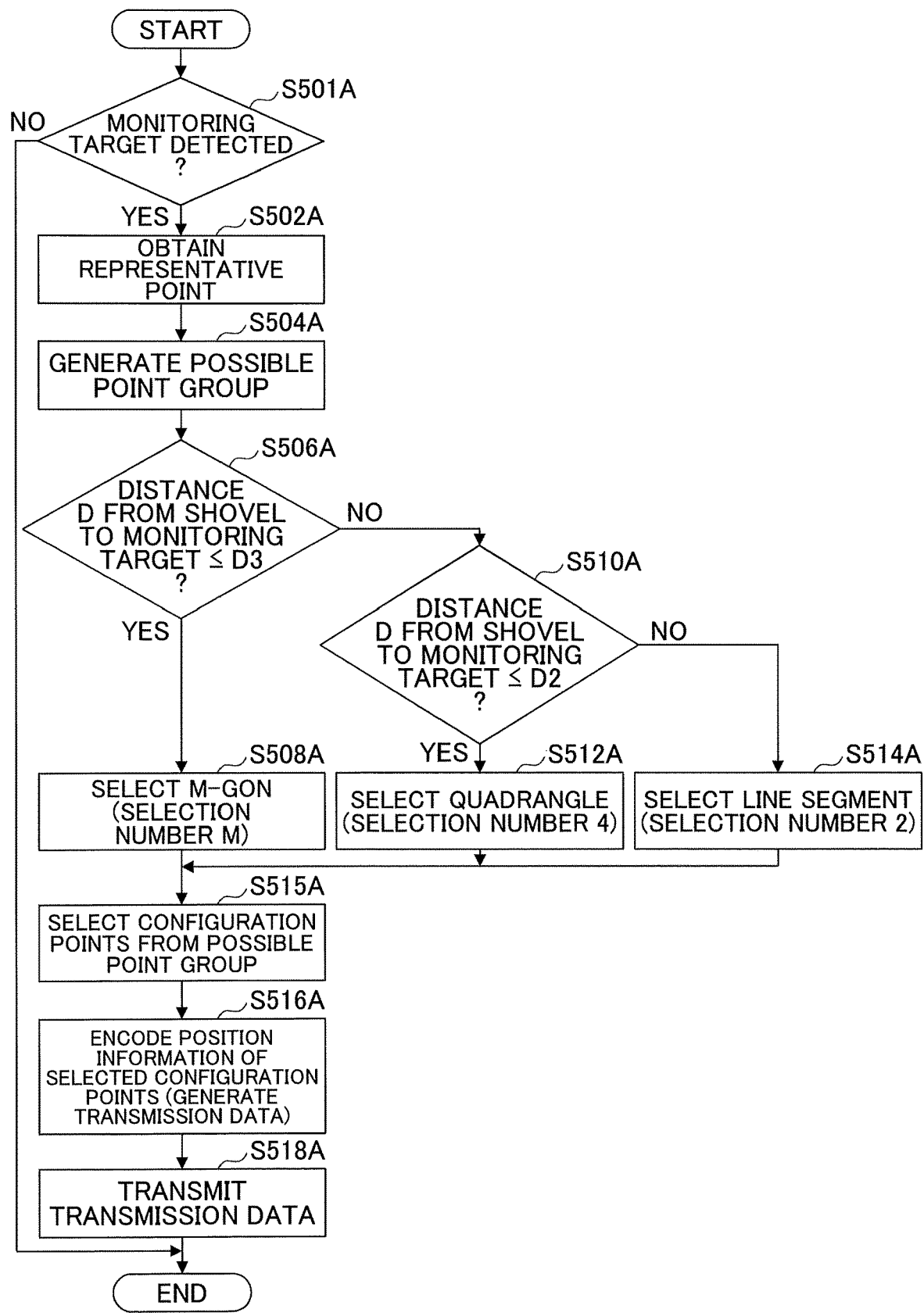
FIG. 14 is a flowchart schematically illustrating a fifth example of the mark image displaying process by the controller.

Next, FIG. 14 is a flowchart schematically illustrating a fifth example of the mark image displaying process by the controller 30 (the mark image displaying part 303A). The same as in the above-described first example (FIG. 10), the process according to this flowchart is, for example, repeatedly executed at predetermined time intervals (e.g., at intervals at which the monitoring target detecting part 301A performs monitoring target detection) when a monitoring image is displayed on the display device 50 during the operation of the shovel.

Steps S501A through S504A and S515A through S518A of this flowchart are the same as in the above-described first example. Therefore, a description is given focusing on differences.

In the following, the process of steps S506A through S514A is executed with respect to each monitoring target detected by the monitoring target detecting part 301A.

At step S506A, the mark image selecting part 3032A determines whether the distance D from the shovel to a monitoring target detected by the monitoring target detecting part 301A is less than or equal to a predetermined distance D3 (<D2<D1). The mark image selecting part 3032A proceeds to step S508A if the distance D from the shovel to a monitoring target detected by the monitoring target detecting part 301A is less than or equal to the predetermined distance D3, and otherwise, proceeds to step S510A.

At step S508A, the mark image selecting part 3032A selects an M-gon as the type of a mark figure. That is, the mark image selecting part 3032A determines M (an integer greater than or equal to five) as the number of configuration points of a mark figure to be selected from the possible point group generated by the possible point generating part 3031A (the selection number).

At step S510A, the mark image selecting part 3032A determines whether the distance D from the shovel to a monitoring target detected by the monitoring target detecting part 301A is less than or equal to the predetermined distance D2 (<D1). The mark image selecting part 3032A proceeds to step S512A if the distance D from the shovel to a monitoring target detected by the monitoring target detecting part 301A is less than or equal to the predetermined distance D2, and otherwise, proceeds to step S514A.

At step S512A, the mark image selecting part 3032A selects a quadrangle as the type of a mark figure. That is, the mark image selecting part 3032A determines four as the number of configuration points of a mark image to be selected from the possible point group generated by the possible point generating part 3031A (the selection number).

At step S514A, the mark image selecting part 3032A selects a line segment as the type of a mark figure. That is, the mark image selecting part 3032A determines two as the number of configuration points of a mark image to be selected from the possible point group generated by the possible point generating part 3031A (the selection number).

Thus, according to this example, the same as in the above-described case of FIG. 10, etc., the mark image displaying part 303A displays a mark representing the position of a monitoring target in a monitoring image displayed on the display device 50 in two or more different display forms. Specifically, the mark image selecting part 3032A changes the type of a mark image representing the position of a monitoring target in a monitoring image displayed on the display device 50 according to the distance from the shovel in the monitoring image displayed on the display device 50. More specifically, as the distance from the shovel to the monitoring target increases, the mark image selecting part 3032A decreases the number of configuration points of a mark figure to reduce the amount of data of the position information of configuration points serving as the mark image specification information included in transmission data. On the other hand, as the distance from the shovel to the monitoring target decreases, the mark image selecting part 3032A increases the number of configuration points of a mark figure to make the monitoring target easily noticeable. This makes it possible to urge the operator or the like to be aware of a monitoring target of high priority, namely, a monitoring target in an area close to the shovel, in order to ensure safety. Meanwhile, it is possible to prevent the above-described shortage of a communication band by performing notification with a simple mark image with respect to a monitoring target of relatively low priority, namely, a monitoring target relatively distant from the shovel.

A mark figure displayed on a monitoring image displayed on the display device 50, which is automatically determined according to a predetermined condition according to the examples as illustrated in FIGS. 10 through 14, may also be manually settable by the operator or the like. (See FIGS. 15 and 16.)

[Display Settings of Mark Image]

Next, the display settings of a mark image set by the operator or the like is described with reference to FIGS. 15 and 16.

Figure 15:
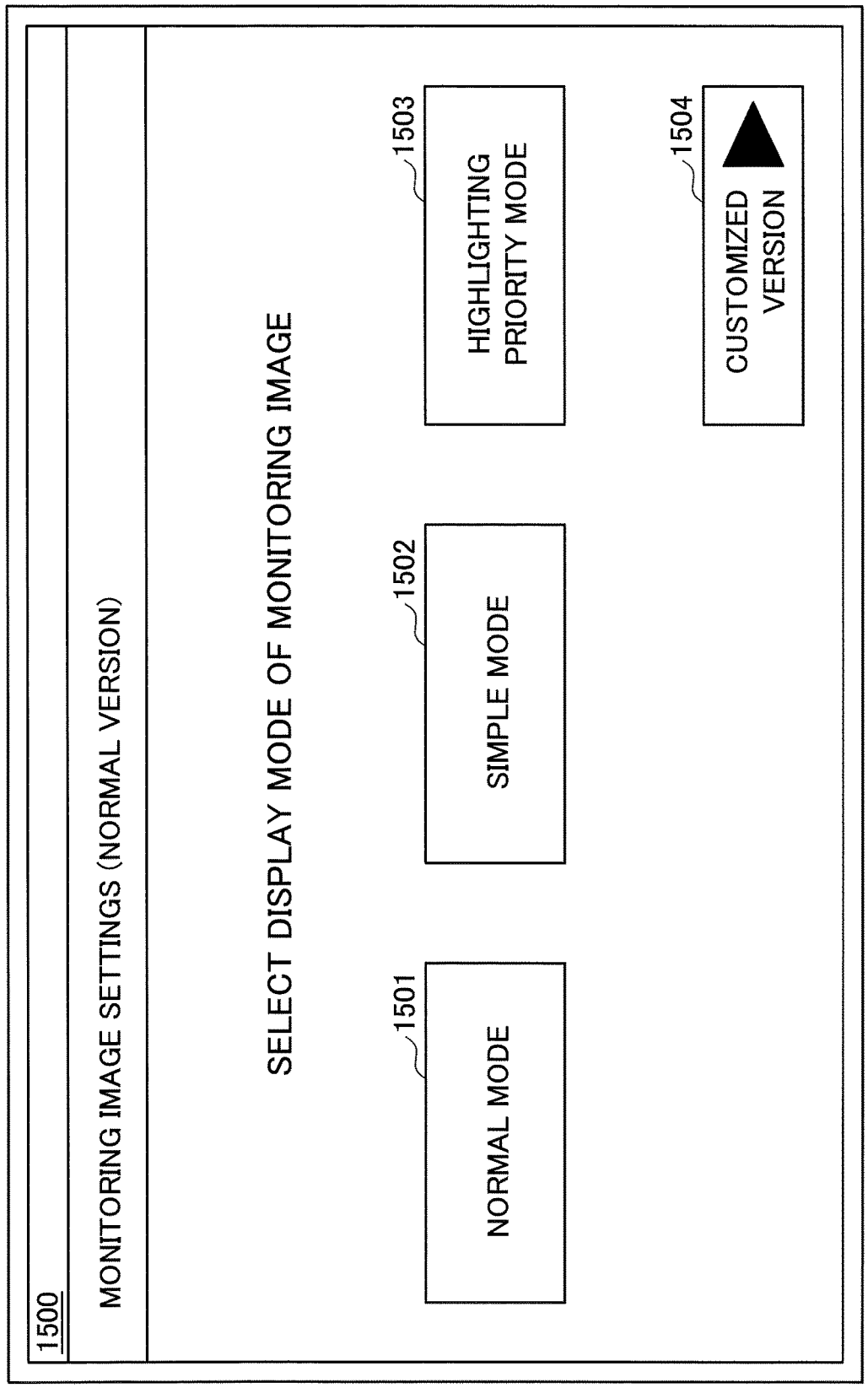
FIG. 15 is a diagram illustrating an example of a mark display settings screen.

FIG. 15 is a diagram illustrating an example of an operating screen for setting the display settings of a mark image by the operator or the like (hereinafter referred to as "mark image settings screen") displayed on the display device 50 (a mark image settings screen 1500).

The mark image settings screen 1500 allows the operator or the like to set the display settings of a mark image by selecting one display mode from among three predetermined display modes (normal mode, simple mode, and highlighting priority mode).

The mark image settings screen 1500 includes hardware operating parts such as a button, a toggle, and a joystick provided in the cabin 10 and button icons 1501 through 1504 operable with a touchscreen or the like installed in the display device 50.

The button icon 1501 is labeled with a text image "NORMAL MODE." The operator or the like can set a normal mode as the display mode of a mark image by performing an operation to select and determine on the button icon 1501.

The normal mode is a display mode according to which a mark image to be displayed on a monitoring image is automatically determined based on at least one of the above-described processes of FIGS. 10 through 14.

The button icon 1502 is labeled with a text image "SIMPLE MODE." The operator or the like can set a simple mode as the display mode of a mark image by performing an operation to select and determine on the button icon 1502.

The simple mode is a display mode according to which a mark image displayed on a monitoring image is fixed to a relatively simple form (such as the above-described quadrangle or line segment). According to the simple mode, even when the number of monitoring targets included in a monitoring image is relatively large, it is possible to prevent a situation where the monitoring image becomes complicated because of mark images to make it difficult to identify monitoring targets.

The button icon 1503 is labeled with a text image "HIGHLIGHTING PRIORITY MODE." The operator or the like can set a highlighting priority mode as the display mode of a mark image by performing an operation to select and determine on the button icon 1503.

The highlighting priority mode is a display mode according to which a mark image displayed on a monitoring image is fixed to a relatively conspicuous form (e.g., a mark figure having a relatively large amount of data, such as the above-described M-gon). According to the highlighting priority mode, the operator is more likely to recognize a monitoring target displayed on the display device 50 even in a situation where, for example, the operator is performing work whose level of operation difficulty is so high that the operator cannot focus on the display device 50.

The button icon 1504 is labeled with text information "CUSTOMIZED VERSION." The operator or the like can switch to an operating screen that allows more detailed settings of a mark image (a mark image settings screen 1600 described below) by performing an operation to select and determine on the button icon 1504.

Thus, according to this example, the operator or the like can select a display mode from the predetermined simple mode and highlighting priority mode. This makes it possible for the surroundings monitoring system 100 to display a mark image to the operator's liking.

Figure 16:
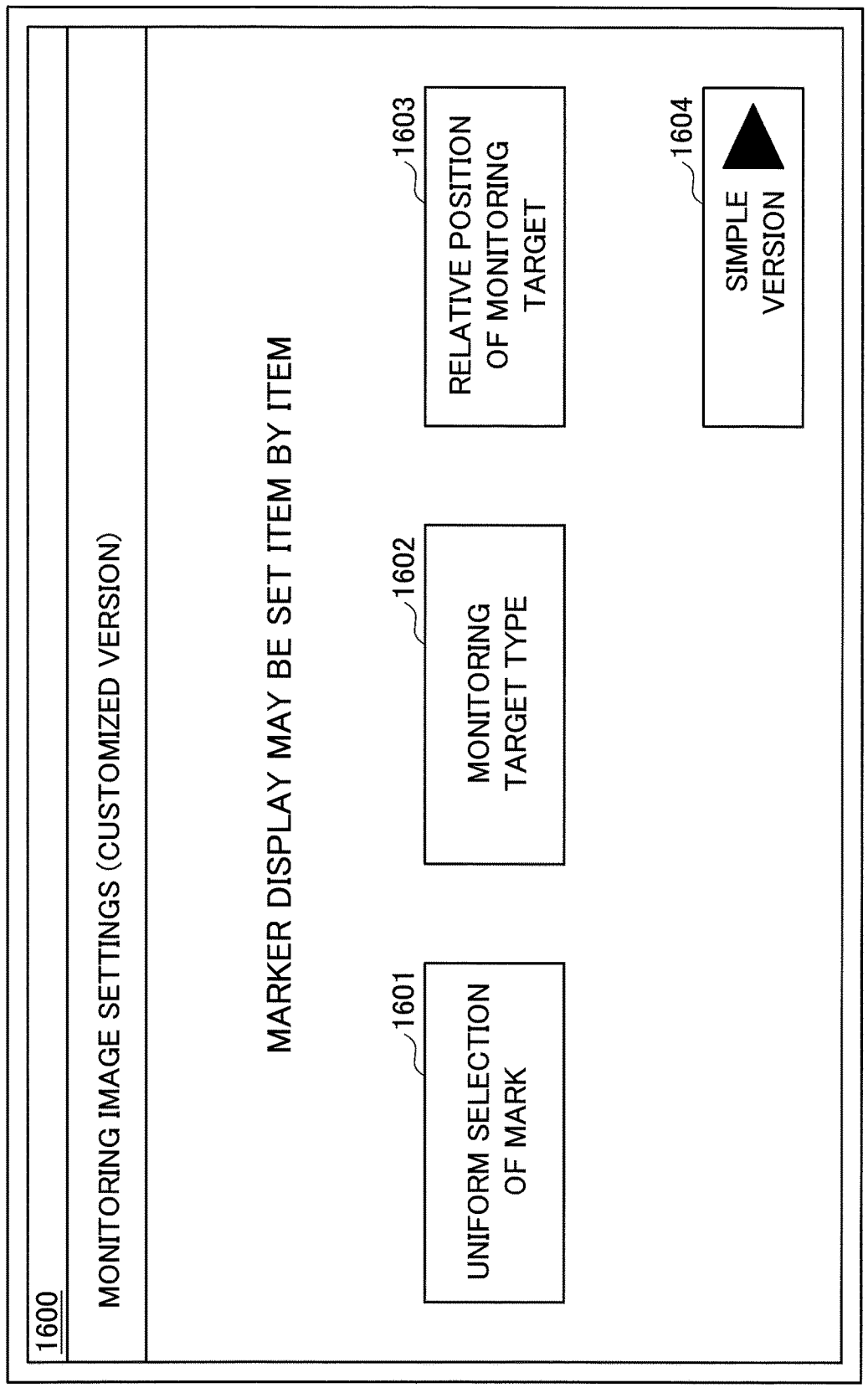
FIG. 16 is a diagram illustrating another example of the mark display settings screen.

Next, FIG. 16 is a diagram illustrating another example of the mark image settings screen displayed on the display device 50 (the mark image settings screen 1600).

The mark image settings screen 1600 allows the operator or the like to set the specifications of a mark image in detail.

The mark image settings screen 1600 includes hardware operating parts such as a button, a toggle, and a joystick provided in the cabin 10 and button icons 1601 through 1604 operable with a touchscreen or the like installed in the display device 50.

The button icon 1601 is labeled with text information "UNIFORM SELECTION OF MARK." The operator or the like can switch to a setting screen for fixing the type of a mark image to be displayed on a monitoring image by performing an operation to select and determine on the button icon 1601. Therefore, the operator or the like can set a mark image to her/his liking among multiple types of mark images (e.g., the above-described M-gon, quadrangle, and line segment) on the setting screen after switching.

The button icon 1602 is labeled with text information "MONITORING TARGET TYPE." The operator or the like can switch to a setting screen for setting the type of a mark image to be displayed on a monitoring image with respect to each monitoring target type by performing an operation to select and determine on the button icon 1602. The setting screen after switching allows the operator or the like to, for example, select a mark image to her/his liking from among multiple mark images with respect to each of predetermined types, such as whether a monitoring target is a person or a vehicle and whether a monitoring target is a moving object or a stationary object.

The button icon 1603 is labeled with text information "RELATIVE POSITION OF MONITORING TARGET." The operator or the like can switch to a setting screen for setting a mark image according to the relative position of a monitoring target by performing an operation to select and determine on the button icon 1603. The setting screen allows the operator or the like to, for example, select a mark image to her/his liking from among multiple mark images with respect to each of multiple areas into which an area monitored by the monitoring target detecting part 301A is divided from the side closer to the shovel. This allows the operator or the like to perform such customization as to make it easy to identify a relatively close monitoring target, using a simple mark image (e.g., a line segment) for a monitoring image relatively distant from the shovel and using a conspicuous mark image (e.g., a quadrangle or an M-gon) for a monitoring target relatively close to the shovel, and conversely, to perform such customization as to make it easy to identify a relatively distant monitoring target as well.

Thus, according to this example, the operator or the like can provide settings to fix the type of a mark image to be displayed on a monitoring image and manually set the type of a mark image according to the type of a monitoring target, the position of a monitoring target relative to the shovel, etc. This enables the surroundings monitoring system 100 to display a mark image more to the operator's liking.

The first characteristic function (the first mark displaying function) of the surroundings monitoring system according to an embodiment of the present invention is described in detail above. The present invention, however, is not limited to this specific embodiment, and variations and modifications may be made without departing from the scope of the present invention.

For example, according to the above-described embodiment, in addition to or instead of determining a situation where the communication band becomes insufficient because of the detection number of the monitoring targets detected by the monitoring target detecting part 301A, the mark image selecting part 3032A may determine a situation where another communication band becomes insufficient, and change the form of display of a mark representing the position of a monitoring target in a monitoring image displayed on the display device 50, namely, the type of a mark image. For example, the mark image selecting part 3032A may determine the static or dynamic bandwidth or availability of a communication line between the controller 30 and the display device 50, and change the type of a mark image representing the detected position of a monitoring target in a monitoring image displayed on the display device 50. Furthermore, when the intervals of monitoring target detection by the monitoring target detecting part 301A dynamically change or are changed by the settings set by the operator or the like, the mark image selecting part 3032A may change the type of a mark image representing the detected position of a monitoring target in a monitoring image displayed on the display device 50 according to the set detection intervals.

Furthermore, according to the above-described embodiment, the type of a mark image selected by the mark image selecting part 3032A may be manually settable by the operator or the like. In this case, it is desirable that the settings can be changed only in a direction to reduce the amount of data of the mark image specification information (e.g., a direction to decrease the number of configuration points of a mark figure).

Furthermore, according to the above-described embodiment and variations, in addition to or instead of changing the type of a mark image, the resolution of the position information of a mark image (e.g., the position information of the individual configuration points of a mark figure) included in transmission data transmitted from the controller 30 to the display device 50 may be adjusted. That is, the encoding part 3034A (an example of a resolution adjusting part) performs encoding by, for example, adjusting the resolution of the position information of a mark image according to the detection number N, the maximum detection number Nmax, the intra-monitoring-image detection number Np, etc., the same as in FIGS. 10 through 12. Specifically, the encoding part 3034A may generate transmission data such that the resolution of the position information of a mark image is reduced (namely, the number of digits is reduced) as the detection number N, the maximum detection number Nmax, or the intra-monitoring-image detection number Np increases. As a result, even when a situation where the communication band becomes insufficient occurs for some reason, it is possible to adjust the amount of data of transmission data the same as in the case of adjusting the amount of data of the mark image specification information.

Furthermore, while a two-dimensional mark figure (such as a quadrangle or an M-gon) is displayed as a mark image according to the above-described embodiment, for example, a virtual solid figure (e.g., a cylinder or a quadrangular prism) may be displayed on a monitoring image in such a manner as to enclose a monitoring target in a three-dimensional space shown in the monitoring image. As a result, for example, when multiple types of monitoring targets are set, by setting the solid figure for the type of a monitoring target believed to require particular attention, the operator or the like can more easily distinguish it from other types of monitoring targets, thus making it possible to improve convenience for the operator or the like.

The following is further disclosed with respect to the first characteristic function (the first mark displaying function) of the surroundings monitoring system according to the above-described embodiment.

(1) A surroundings monitoring system for a work machine, the surroundings monitoring system including:
an image capturing unit configured to capture an image of surroundings of the work machine; and
a display device configured to display the image of the surroundings of the work machine captured by the image capturing unit and a mark representing a position of a monitoring target,
wherein the display device is configured to display the mark in two or more different display forms.

(2) The surroundings monitoring system for the work machine according to (1), further including:
a monitoring target detecting part configured to detect the monitoring target in the surroundings of the work machine,
wherein the display device is configured to change a form of display of the mark in accordance with a number of monitoring targets detected by the monitoring target detecting part.

(3) The surroundings monitoring system for the work machine according to (2), wherein
the display device is configured to change the form of display of the mark in accordance with the number of the monitoring targets actually detected by the monitoring target detecting part.

(4) The surroundings monitoring system for the work machine according to (3), wherein
the image capturing unit includes a plurality of cameras having imaging ranges different from each other, and
the display device is configured to display the image of the surroundings of the work machine captured by one or some or all of the plurality of cameras, and to change the form of display of the mark in accordance with the number of the monitoring targets actually detected by the monitoring target detecting part in a surrounding area of the work machine corresponding to the image actually displayed.

(5) The surroundings monitoring system for the work machine according to (3) or (4), wherein
the display device is configured to change the form of display of the mark such that an amount of data of specification information necessary for displaying the mark is reduced as the number of the monitoring targets actually detected by the monitoring target detecting part increases.

(6) The surroundings monitoring system for the work machine according to (2), wherein
a maximum detection number that is an upper limit of the number of the monitoring targets detected by the monitoring target detecting part is predetermined, and
the display device is configured to change the form of display of the mark in accordance with the maximum detection number.

(7) The surroundings monitoring system for the work machine according to (6), wherein
the display device is configured to change the form of display of the mark such that an amount of data of specification information necessary for displaying the mark is reduced as the maximum detection number increases.

(8) The surroundings monitoring system for the work machine according to (1), wherein
the display device is configured to change a form of display of the mark in accordance with a number of monitoring targets included in the image.

(9) The surroundings monitoring system for the work machine according to (8), wherein
the display device is configured to change the form of display of the mark such that an amount of data of specification information necessary for displaying the mark is reduced as the number of the monitoring targets included in the image increases.

(10) The surroundings monitoring system for the work machine according to any of (1) through (9), further including:
a control device provided separately from the display device, and including a selecting part configured to select a mark image to be displayed as the mark, from among two or more types of mark images; and a transmitting part configured to transmit, to the display device, data of specification information necessary for displaying the mark image selected by the selecting part on the display device,
wherein the display device is configured to display the mark image received from the control device as the mark.

(11) The surroundings monitoring system for the work machine according to (10), further comprising:
a resolution adjusting part configured to adjust a resolution of position information of the mark image on the image, the position information being included in the specification information of the data,
wherein the transmitting part is configured to transmit, to the display device, the data in which the resolution of the position information is adjusted by the resolution adjusting part.

[Second Characteristic Function of Surroundings Monitoring System]

Next, the second characteristic function pertaining to the surroundings monitoring system 100 according to this embodiment, specifically, another example of the mark displaying function (which may also be hereinafter referred to as "second mark displaying function"), is described.

The first mark displaying function and the second mark displaying function may be either executed independent of each other or executed in combination. That is, the first mark displaying function and the second mark displaying function may have their respective configurations either combined or shared.

[Overview of Effects According to Second Characteristic Function]

First, an overview of effects according to the second characteristic function (the second mark displaying function) is given.

A surroundings monitoring system that captures an image of the surroundings of a work machine with a camera and displays a monitoring image showing the surrounding situation of the work machine, such as the captured image or a processed image (e.g., a viewpoint change image) generated based on the captured image, on a display device near an operator seat is known.

Depending on the situation of a work site, the acting condition of a monitoring target, etc., however, a monitoring target (e.g., a person or an obstacle other than a person, such as a vehicle) appearing in a monitoring image displayed on the display device becomes less easily visible, so that the operator may be less likely to be aware of the presence of a monitoring target.

Therefore, according to this embodiment, a surroundings monitoring system for a work machine that enables an operator or the like to be more easily aware of the presence of a monitoring target appearing in a monitoring image displayed on a display device with the second characteristic function is provided.

[Configuration of Surroundings Monitoring System]

Next, a specific configuration of the surroundings monitoring system 100 related to the second characteristic function is described with reference to FIG. 17.

Figure 17:
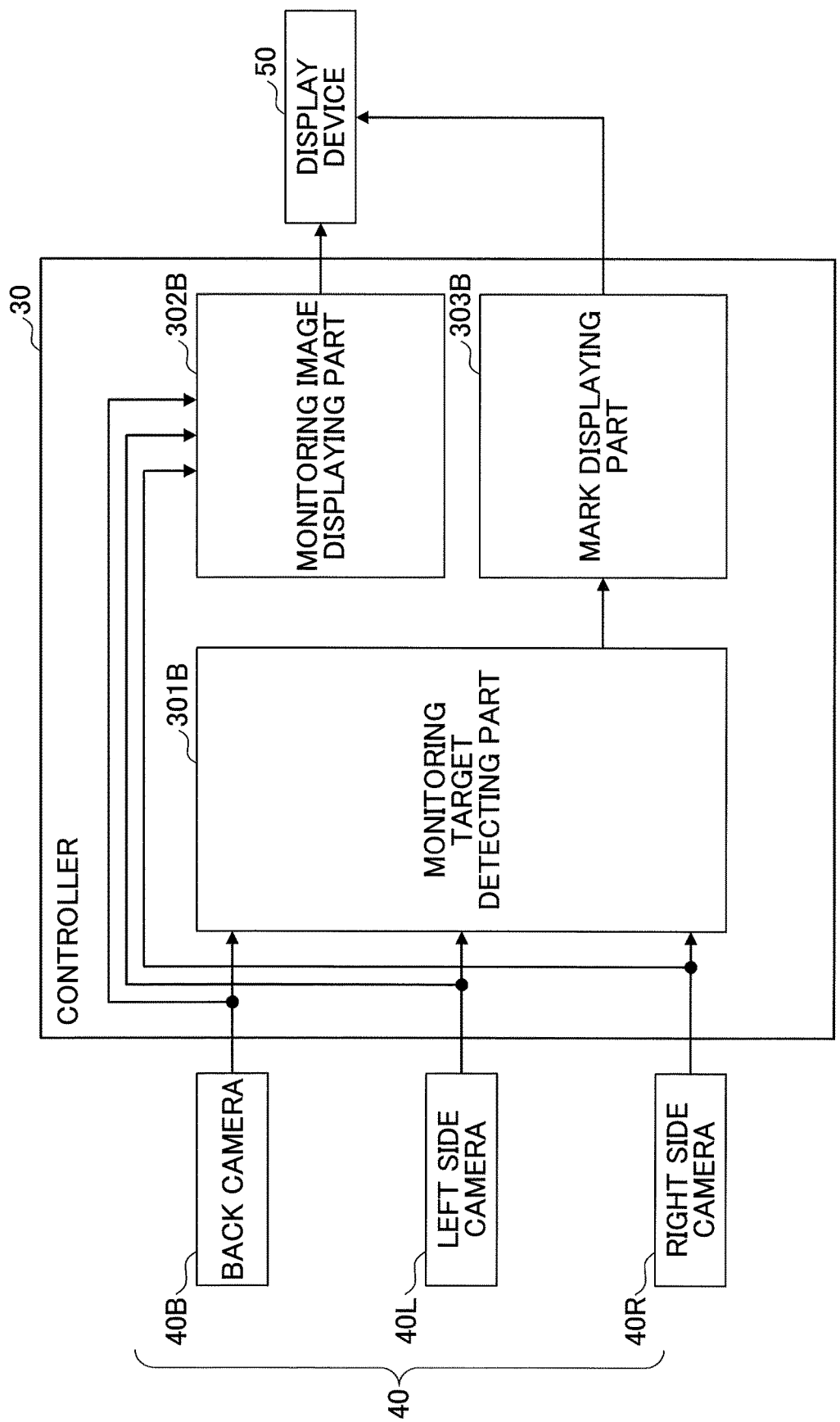
FIG. 17 is a diagram illustrating an example configuration of the surroundings monitoring system related to a second characteristic function (second mark displaying function)

FIG. 17 is a block diagram illustrating an example configuration of the surroundings monitoring system 100 related to the second characteristic function.

The illustration of FIG. 17 focuses on a configuration related to the second characteristic function, and other configurations illustrated in FIGS. 1 and 2 are omitted.

The surroundings monitoring system 100 monitors the entry of a predetermined object (a vehicle and a person according to this embodiment) into a predetermined area around the shovel, and in response to detecting the predetermined object, makes a notification to the operator or the like. The surroundings monitoring system 100 includes the controller 30, the image capturing unit 40, and the display device 50.

As described above, the controller 30 executes various control processes in the surroundings monitoring system 100. The controller 30 includes, for example, the monitoring target detecting part 301B, the monitoring image displaying part 302B, and the mark displaying part 303B as functional parts implemented by executing various programs stored in the ROM on the CPU.

As described above, the image capturing unit 40 includes the back camera 40B, the left side camera 40L, and the right side camera 40R. The back camera 40B, the left side camera 40L, and the right side camera 40R are attached to the top of the upper turning body 3 such that their optical axes point obliquely downward, and have respective relatively wide vertical imaging ranges (angles of view) covering the ground near the shovel to an area far from the shovel. During the operation of the shovel, the back camera 40B, the left side camera 40L, and the right side camera 40R output captured images and transmit them to the controller 30 at predetermined intervals (for example, every 1/30 seconds).

The display device 50 displays a monitoring image showing the surrounding situation of the shovel under the control of the controller 30 (specifically, the monitoring image displaying part 302B). The monitoring image includes an image captured by the image capturing unit 40 (a through-the-lens image), a surrounding image (such as a viewpoint change image) that the controller 30 (specifically, the monitoring image displaying part 302B) generates based on images captured by the image capturing unit 40, etc. The details are described below. (See FIGS. 18 and 19.)

The monitoring target detecting part 301B detects a predetermined monitoring target around the shovel. Examples of monitoring targets include a person, a work vehicle (truck), other obstacles, etc. The following description is given based on the assumption that the monitoring target is a person according to this embodiment. Specifically, the monitoring target detecting part 301B detects a monitoring target (namely, a person) within a predetermined area (hereinafter referred to as "monitoring area") around the shovel, e.g., within the predetermined distance D1 (such as 5 meters) from the shovel, based on a captured image captured by the image capturing unit 40. For example, by applying known various image processing techniques and machine learning-based identifiers as desired, the monitoring target detecting part 301B can recognize a person in the captured image of the image capturing unit 40 and identify the actual position of the recognized person (the distance D from the shovel to the recognized person, a direction viewed from the shovel, etc.).

The monitoring target detecting part 301B may detect a monitoring target based on the detection result (distance image or the like) of another sensor such as a millimeter wave radar, a LIDAR, a stereo camera or the like, instead of or in addition to the captured image of the image capturing unit 40.

The monitoring image displaying part 302B displays an image showing the surrounding situation of the shovel captured by the image capturing unit 40 (hereinafter referred to as monitoring image) on the display device 50 in accordance with the operator's various operations or the like.

For example, the monitoring image displaying part 302B directly displays the captured image (through-the-lens image) of the image capturing unit 40, namely, the back camera 40B, the left side camera 40L, and the right side camera 40R, as a monitoring image on the display device 50 in accordance with the operator's predetermined operation. (See FIGS. 18A and 18B.) In this case, the monitoring image displaying part 302B may either display the image captured by one of the back camera 40B, the left side camera 40L, and the right side camera 40R on the display device 50 or simultaneously display the images captured by two or more (two or three) of the cameras on the display device 50, depending on the contents of the operator's operation or the contents of settings.

Furthermore, for example, the monitoring image displaying part 302B generates a surrounding image (e.g., a viewpoint change image) by performing a predetermined process based on the captured image of the image capturing unit 40 and displays it on the display device 50 in accordance with the operator's predetermined operation. (See FIGS. 19A and 19B.) Specifically, the monitoring image displaying part 302B generates, as a surrounding image, a viewpoint change image (an image viewed from a virtual viewpoint) by performing a known viewpoint changing process based on the captured images of the back camera 40B, the left side camera 40L, and the right side camera 40R, and displays it on the display device 50. In this case, the monitoring image displaying part 302B may either generate a surrounding image from the image captured by one of the back camera 40B, the left side camera 40L, and the right side camera 40R and display it on the display device 50, or may generate a surrounding image from the images captured by two or more (two, mainly three) of the cameras and display it on the display device 50.

The mark displaying part 303B, in response to detection of a monitoring target by the monitoring target detecting part 301B, superimposes and displays a marker that is a mark representing the position (specifically, the position detected by the monitoring target detecting part 301B) of the monitoring target (namely, a person) included in the monitoring image over the monitoring image displayed on the display device 50. The marker may be in any form to the extent that the marker can highlight the position of a person included in the monitoring image, and may be formed of, for example, a figure, a color, a pattern, any combination thereof, or the like. For example, as described below, the mark displaying part 303B changes the form of display of a mark according to whether a monitoring target (namely, a person) detected by the monitoring target detecting part 301B is moving. (See FIGS. 20 through 23, 27 and 28.) Furthermore, for example, as described below, the mark displaying part 303B changes the form of display of a mark in accordance with the potential risk of a collision between the shovel and a monitoring target detected by the monitoring target detecting part 301B. (See FIGS. 23 through 28.)

[Overview of Marker on Monitoring Image]

Next, an overview of a monitoring image displayed on the display device 50 by the monitoring image displaying part 302A and a marker superimposed and displayed over the monitoring image on the display device 50 by the mark displaying part 303B is given with reference to FIGS. 18A and 18B and FIGS. 19A and 19B.

Figure 18A:
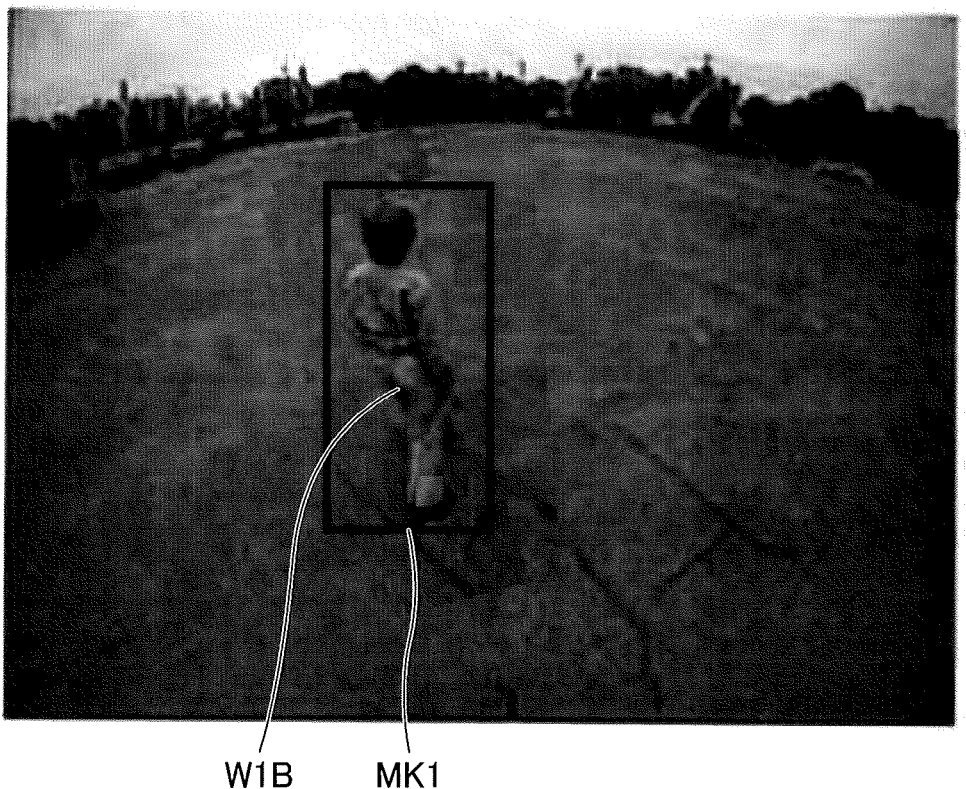
FIGS. 18A and 18B illustrate an example of the monitoring image displayed on the display device.
Figure 18B:
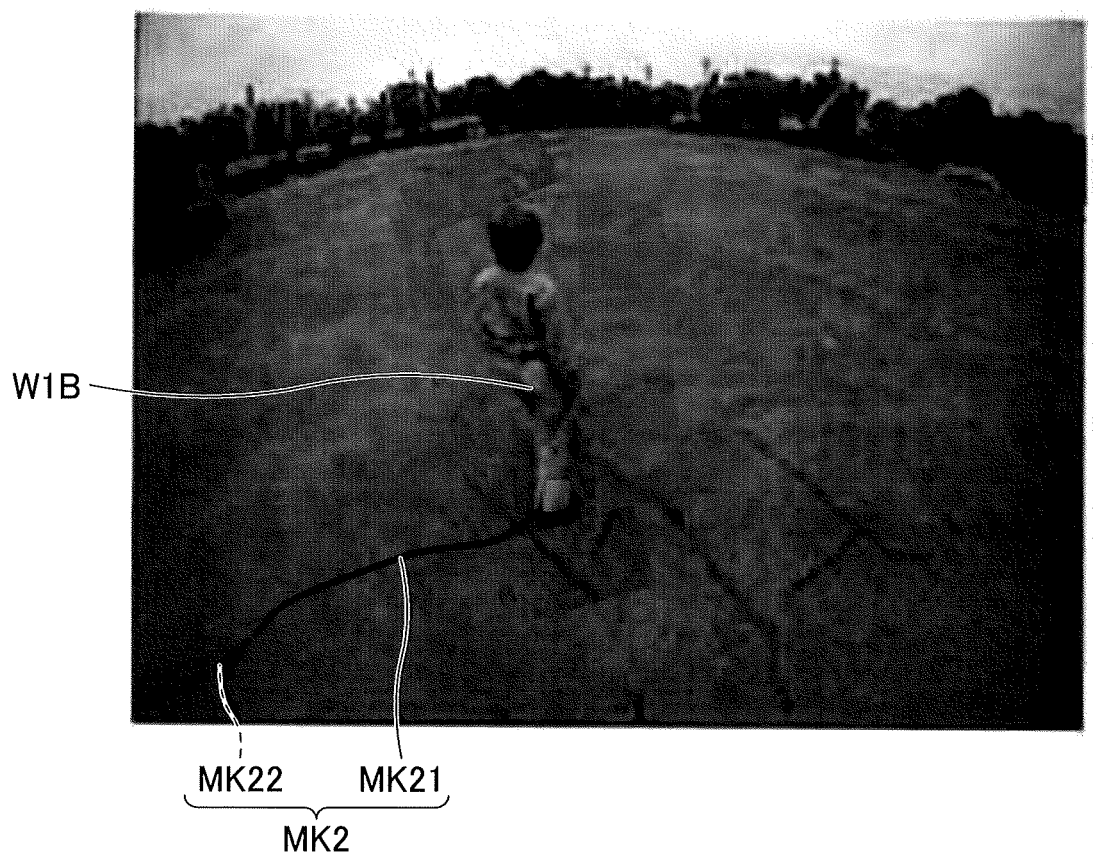
Figure 19A:
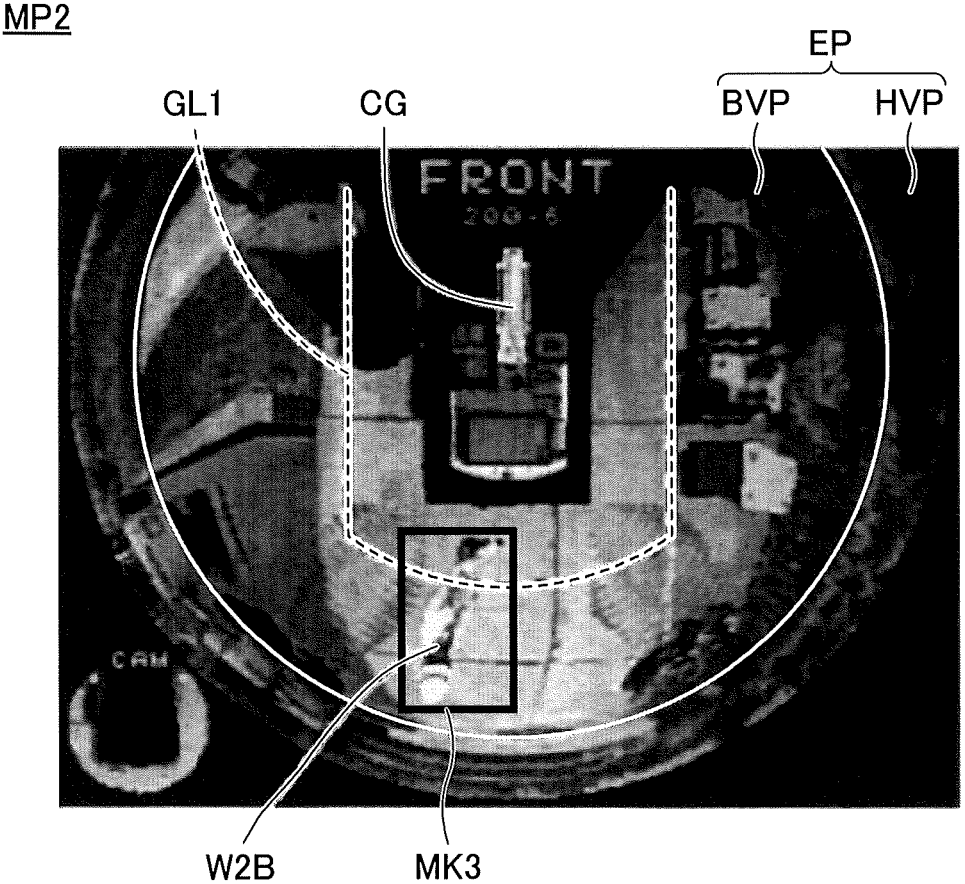
FIGS. 19A and 19B illustrate another example of the monitoring image displayed on the display device.
Figure 19B:
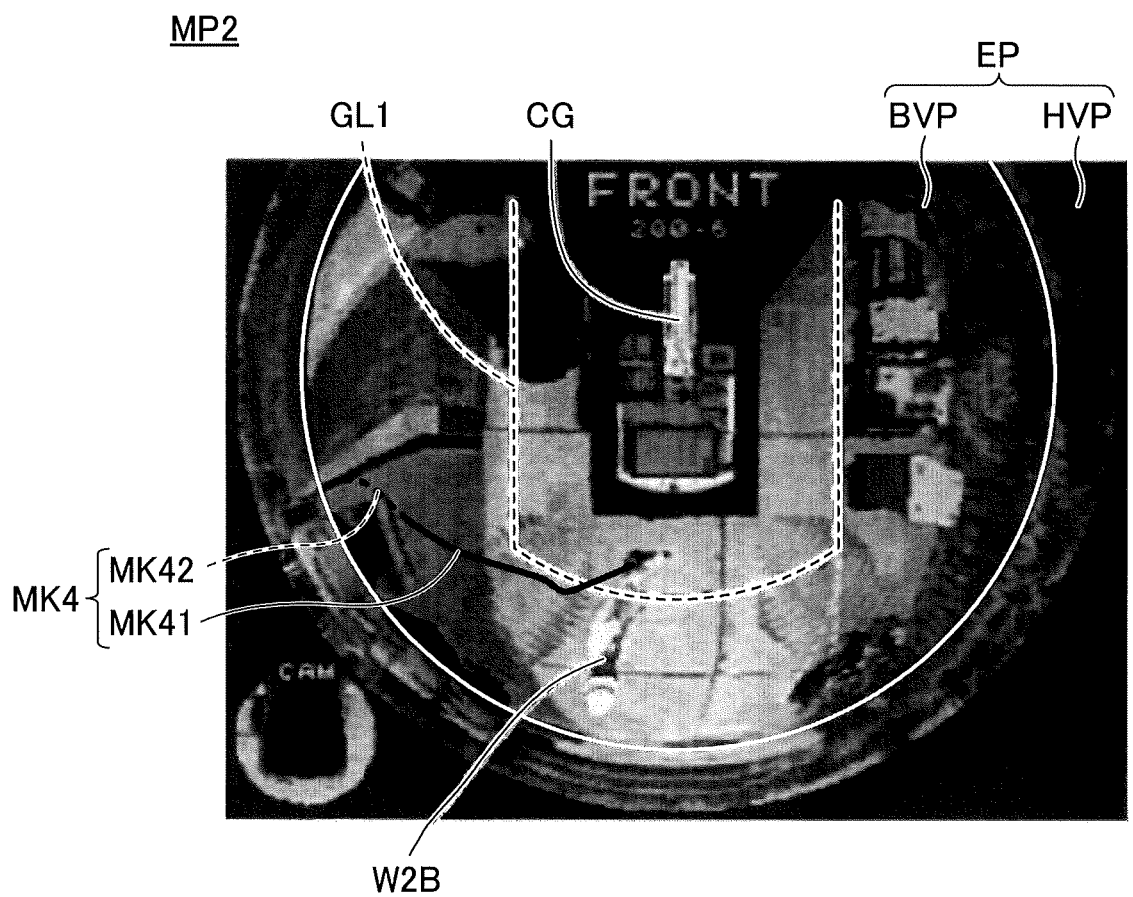

FIGS. 18A and 18B both illustrate an example of the monitoring image (monitoring image MP1) displayed on the display device 50, and specifically illustrate a through-the-lens image displayed on the display device 50 as the monitoring image MP1. FIGS. 19A and 19B both illustrate another example of the monitoring image (monitoring image MP2) displayed on the display device 50, and specifically illustrate the monitoring image MP2 composed mainly of the surrounding image EP (viewpoint change image) displayed on the display device 50.

As illustrated in FIGS. 18A and 18B, an image captured by a camera among the back camera 40B, the left side camera 40L, and the right side camera 40R is displayed on a laterally elongated rectangular screen (for example, a screen of an aspect ratio of 4:3) on the display device 50.

Furthermore, as illustrated in FIGS. 19A and 19B, the monitoring image MP2 including the shovel image CG and the surrounding image EP placed along the periphery of the shovel image CG in accordance with the relative positional relationship between the shovel and the imaging range of the image capturing unit 40 as described above is displayed on the laterally elongated rectangular screen on the display device 50. This enables the operator to appropriately understand the positional relationship between a monitoring target (namely, a person) shown in the surrounding image EP and the shovel.

According to this example, the surrounding image EP is a viewpoint change image that is a combination of the overhead view image BVP viewing a surrounding area adjacent to the shovel from directly above and the horizontal image HVP viewing the surroundings of the surrounding area horizontally from the shovel and placed along the periphery of the overhead view image BVP. The surrounding image EP, which is a viewpoint change image, can be obtained by projecting the respective captured images of the back camera 40B, the left side camera 40L, and the right side camera 40R onto a spatial model and re-projecting the projected images projected onto the spatial model onto a different two-dimensional plane. The spatial model is an object onto which a captured image is projected in a virtual space, and is composed of one or more plane surfaces or curved surfaces that include a plane surface or a curved surface different from a plane surface in which the captured image is positioned. In the following, the description continues based on the assumption that a surrounding image according to this embodiment is a viewpoint change image that is a combination of an overhead view image viewing a surrounding area adjacent to the shovel from directly above and a horizontal image viewing the surroundings of the surrounding area horizontally from the shovel.

Furthermore, the guideline GL1 is superimposed and displayed on the monitoring image MP2 (the surrounding image EP). The guideline GL1 represents positions where the distance D from the shovel is the predetermined distance D2 (<D1). As a result, when a monitoring target (namely, a person) is shown in the surrounding image within the monitoring image, the operator can understand how distant the position is from the shovel.

Furthermore, as illustrated in FIGS. 18A and 18B and FIGS. 19A and 19B, persons (workers W1B and W2B) that are monitoring targets are included in the monitoring images MP1 and MP2 displayed on the display device 50. Furthermore, on the workers W1B and W2B in the monitoring images MP1 and MP2, markers MK1 through MK4 that are marks indicating their detection by the monitoring target detecting part 301B and their detected positions are superimposed and displayed. This makes it easier for the operator to notice the detection of a monitoring target (namely, a person) by the monitoring target detecting part 301B and to visually recognize the situation, etc., of the monitoring target (namely, a person) detected by the monitoring target detecting part 301B in the monitoring image, specifically, a through-the-lens image or surrounding image (viewpoint change image), displayed on the display device 50.

As illustrated in FIGS. 18A and 19A, the markers MK1 and MK3 are box frames so provided as to enclose the workers W1B and W2B in the monitoring images MP1 and MP2. The mark displaying part 303B displays a marker that occupies a large area on the monitoring image and highlights the entirety of a monitoring target included in the monitoring image, such as a box frame, so that the operator can be easily aware of the presence of the monitoring target. Furthermore, as illustrated in FIGS. 18B and 19B, the marker MK2 and MK4 are trajectory lines indicating the movement trajectories of the workers W1A and W1B around the shovel in the monitoring images MP1 and MP2. By displaying a trajectory line as a marker, the mark displaying part 303B makes it possible to be aware of not only the presence of a monitoring target in the monitoring image but also the movement of the monitoring target in the surrounding area of the shovel (namely, the back area, the left side area, and the right side area). Thus, the mark displaying part 303B may display different types of predetermined marks, such as a box frame and a trajectory line. The details are described below.

The mark displaying part 303B generates the coordinate information of a trajectory line on a monitoring image by retaining the position history of a detected monitoring target output from the monitoring target detecting part 301B in an internal memory (such as a buffer) of the controller 30. Furthermore, when the shovel moves or turns, the mark displaying part 303B corrects the display position of a trajectory line to be displayed on the monitoring image of the display device 50 by correcting the coordinate information on the monitoring image based on the moving state or turning state of the shovel. In this case, the mark displaying part 303B may obtain the amount of movement or the amount of turning of the shovel based on a detection signal of a sensor (not depicted) that detects the traveling state or turning state of the shovel.

Furthermore, as illustrated in FIGS. 18B and 19B, the markers MK2 and MK4 include relatively new (with less elapsed time) movement trajectory portions MK21 and MK41 indicated by a solid line and relatively old (with more elapsed time) movement trajectory portions MK22 and MK42 indicated by a dotted line. When displaying a trajectory line as a marker on the monitoring image of the display device 50, the mark displaying part 303B may display a portion of the trajectory line with more elapsed time such that the portion is less easily visible than a portion with less elapsed time, for example, indicated by a dotted line or gradually faded with passage of time. As a result, even when the movement trajectory of a monitoring target becomes relatively long in the surrounding area of the shovel corresponding to the monitoring image of the display device 50, a chronologically relatively old portion of a trajectory line actually displayed on the monitoring image becomes less easily visible. Therefore, it is possible to prevent the display of the trajectory line on the monitoring image from being complicated.

Furthermore, as illustrated in FIG. 19B, the marker MK4 that is the trajectory line of the worker W2B in the monitoring image MP2, namely, the surrounding image EP, is continuously rendered from an image portion corresponding to the imaging area of the left side camera 40L to the position of the worker W2B included in an image portion corresponding to the imaging area of the back camera 40B. Thus, when displaying a trajectory line as a marker on a monitoring image including the imaging areas of multiple cameras (the back camera 40B, the left side camera 40L, and the right side camera 40R) (namely, a monitoring image including the through-the-lens images of multiple cameras or a monitoring image including a surrounding image generated based on the images captured by multiple cameras), the mark displaying part 303B may continuously display the trajectory line over image portions corresponding to the imaging areas of the cameras. That is, even when a monitoring target (namely, a person) is no longer included in an image portion corresponding to the imaging area of a camera among multiple cameras, the mark displaying part 303B may continue displaying a trajectory line until the monitoring target disappears from the monitoring image.

The mark displaying part 303B may display a trajectory line serving as a marker on a monitoring image only when a monitoring target is actually detected by the monitoring target detecting part 301B. That is, for example, when a monitoring target that has been included in a monitoring image is no longer included in the monitoring image, the mark displaying part 303B may erase a marker serving as a trajectory line from the monitoring image. Furthermore, even when a monitoring target that has been detected by the monitoring target detecting part 301B is no longer detected, the mark displaying part 303B may leave the trajectory line of the monitoring target for a predetermined time. In this case, before the passage of the predetermined time, the mark displaying part 303B may cause the trajectory line to gradually become less easily visible, for example, gradually fade the trajectory line or change the line style to a less easily visible line style such as a dotted line.

[Details of Mark Displaying Process by Surroundings Monitoring System]

Next, a process of superimposing and displaying a marker (mark) over the monitoring image of the display device 50 by the mark displaying part 303B (a mark displaying process) is described in detail with further reference to FIGS. 20 through 28 while continuing to refer to FIGS. 18A and 18B and FIGS. 19A and 19B.

First, FIG. 20 is a diagram illustrating a first example of the mark displaying process by the mark displaying part 303B, and is specifically a diagram illustrating a first example of the correspondence relationship between a condition pertaining to a monitoring target and which attribute of a marker to change in the case of changing the form of display of a mark (namely, an attribute of the marker).

According to this example, the mark displaying part 303B causes the form of display of a marker to differ between when a monitoring target (namely, a person) detected by the monitoring target detecting part 301B is moving and when the monitoring target is stationary.

Specifically, as illustrated in FIG. 20, when the monitoring target detected by the monitoring target detecting part 301B is not moving, namely, stationary, a marker superimposed and displayed over the monitoring image of the display device 50 is the above-described box frame in type, is red in color, and blinks. For example, when the workers W1B and W2B are stationary, the mark displaying part 303B superimposes and displays box frames serving as the markers MK1 and MK3 over the monitoring images MP1 and MP2 as illustrated in FIGS. 18A and 19A. In this case, the mark displaying part 303B displays the box frames serving as the markers MK1 and MK3 in red with blinking.

When the monitoring target detected by the monitoring target detecting part 301B is moving, a marker superimposed and displayed over the monitoring image of the display device 50 is the above-described in type, is red in color, and does not blink. For example, when the workers W1B and W2B are moving, the mark displaying part 303B superimposes and displays box frames serving as the markers MK1 and MK3 over the monitoring images MP1 and MP2 as illustrated in FIGS. 18A and 19A. In this case, the mark displaying part 303B displays the box frames serving as the markers MK1 and MK3 in red without blinking (namely, with constant lighting).

Thus, according to this example, the mark displaying part 303B displays a box frame on the monitoring image of the display device 50 as a marker representing the detected position of a monitoring target detected by the monitoring target detecting part 301B. Therefore, as described above, by displaying a box frame as a marker that occupies a large area on the monitoring image and highlights the entirety of a monitoring target included in the monitoring image, the operator can be easily aware of the presence of the monitoring target. Furthermore, according to this example, the mark displaying part 303B causes the form of display of a marker on the monitoring image of the display device 50 to differ between when the monitoring target detected by the monitoring target detecting part 301B is moving and when the monitoring target is stationary. That is, the mark displaying part 303B causes one or more attributes of the marker (the presence or absence of blinking according to this example) to differ between when the monitoring target is moving and when the monitoring target is stationary. This enables the operator to easily determine whether the monitoring target is moving or stationary. Furthermore, a stationary monitoring target, which is likely to merge into the background to be less easily visible than a moving monitoring target, has its marker displayed in a form of display different than in the case of a moving monitoring target. Therefore, it is possible to highlight, namely, highlight by blinking a marker, a stationary monitoring target more than a moving monitoring target. Therefore, the operator is likely to be aware of a stationary monitoring target in the monitoring image of the display device 50.

The attributes of a marker may include any items such as pattern, size, and luminance in addition to type (such as a difference in shape), color, the presence or absence of blinking, etc., which are predetermined.

Next, FIG. 21 is a diagram illustrating a second example of the mark displaying process by the mark displaying part 303B, and is specifically a diagram illustrating a second example of the correspondence relationship between a condition pertaining to a monitoring target and which attribute of a marker to change in the case of changing the form of display of a mark (namely, an attribute of the marker).

According to this example, the same as in the above-described first example, the mark displaying part 303B causes the form of display of a marker to differ between when a monitoring target (namely, a person) detected by the monitoring target detecting part 301B is moving and when the monitoring target is stationary.

Specifically, as illustrated in FIG. 21, when the monitoring target detected by the monitoring target detecting part 301B is not moving, namely, stationary, a marker superimposed and displayed over the monitoring image of the display device 50 is the above-described trajectory line in type, is red in color, and blinks. For example, when the workers W1B and W2B are stationary, the mark displaying part 303B superimposes and displays trajectory lines serving as the markers MK2 and MK4 over the monitoring images MP1 and MP2 as illustrated in FIGS. 18B and 19B. In this case, the mark displaying part 303B displays the trajectory lines serving as the markers MK2 and MK4 in red with blinking.

When the monitoring target detected by the monitoring target detecting part 301B is moving, a marker superimposed and displayed over the monitoring image of the display device 50 is the above-described trajectory line in type, is red in color, and does not blink. For example, when the workers W1B and W2B are moving, the mark displaying part 303B superimposes and displays trajectory lines serving as the markers MK2 and MK4 over the monitoring images MP1 and MP2 as illustrated in FIGS. 18B and 19B. In this case, the mark displaying part 303B displays the trajectory lines serving as the markers MK2 and MK4 in red without blinking (namely, with constant lighting).

Thus, according to this example, the mark displaying part 303B displays a trajectory line on the monitoring image of the display device 50 as a marker representing the detected position of a monitoring target detected by the monitoring target detecting part 301B. As described above, this makes it possible to be aware of not only the presence of a monitoring target in the monitoring image but also the movement of the monitoring target in the surrounding area of the shovel. Furthermore, the same as in the above-described first example, the mark displaying part 303B causes the form of display of a marker on the monitoring image of the display device 50 to differ between when the monitoring target is moving and when the monitoring target is stationary. This enables the operator to be easily aware of a stationary monitoring target in the monitoring image of the monitoring device 50 the same as in the first example.

Next, FIG. 22 is a diagram illustrating a third example of the mark displaying process by the mark displaying part 303B, and is specifically a diagram illustrating a third example of the correspondence relationship between a condition pertaining to a monitoring target and which attribute of a marker to change in the case of changing the form of display of a mark (namely, an attribute of the marker).

According to this example, the same as in the above-described first example, etc., the mark displaying part 303B causes the form of display of a marker to differ between when a monitoring target (namely, a person) detected by the monitoring target detecting part 301B is moving and when the monitoring target is stationary.

Specifically, as illustrated in FIG. 22, when the monitoring target detected by the monitoring target detecting part 301B is not moving, namely, stationary, a marker superimposed and displayed over the monitoring image of the display device 50 is the above-described box frame in type, is red in color, and blinks. For example, when the workers W1B and W2B are stationary, the mark displaying part 303B superimposes and displays box frames serving as the markers MK1 and MK3 over the monitoring images MP1 and MP2 as illustrated in FIGS. 18A and 19A. In this case, the mark displaying part 303B displays the markers MK1 and MK3 as box frames in red with blinking.

When the monitoring target detected by the monitoring target detecting part 301B is moving, a marker superimposed and displayed over the monitoring image of the display device 50 is the above-described trajectory line in type, is red in color, and does not blink. For example, when the workers W1B and W2B are moving, the mark displaying part 303B superimposes and displays trajectory lines serving as the markers MK2 and MK4 over the monitoring images MP1 and MP2 as illustrated in FIGS. 18B and 19B. In this case, the mark displaying part 303B displays the markers MK2 and MK4 as trajectory lines in red without blinking (namely, with constant lighting).

Thus, according to this example, the mark displaying part 303B causes the form of display of a marker on the monitoring image of the display device 50 to differ between when the monitoring target detected by the monitoring target detecting part 301B is moving and when the monitoring target is stationary. That is, the mark displaying part 303B causes some attributes of the marker, namely, the type of the marker (a box frame or a trajectory line) and the presence or absence of blinking, to differ between when the monitoring target is moving and when the monitoring target is stationary. This enables the operator to easily determine whether the monitoring target is moving or stationary and to be easily aware of a stationary monitoring target in the monitoring image of the display device 50 the same as in the first example, etc. In particular, according to this example, two attributes out of the multiple (three) attributes of the marker are changed. Therefore, in this respect, it is easier to be aware of a stationary monitoring target in the monitoring image of the display device 50. Furthermore, when the monitoring target detected by the monitoring target detecting part 301B is moving, the mark displaying part 303B displays a trajectory line on the monitoring image of the display device 50 as a marker. Therefore, the operator can intuitively understand whether the monitoring target is moving or stationary by the difference between a trajectory line and a box frame. Accordingly, it is easier to determine whether the monitoring target is moving or stationary.

According to the above-described first (FIG. 20) through third (FIG. 22) examples, the mark displaying part 303B may cause all of the predetermined attributes (the three of type, color, and the presence or absence of blinking that are predetermined in the case of this example) to differ between when the monitoring target detected by the monitoring target detecting part 301B is moving and when the monitoring target is stationary.

Next, FIG. 23 is a diagram illustrating a fourth example of the mark displaying process by the mark displaying part 303B, and is specifically a diagram illustrating a fourth example of the correspondence relationship between a condition pertaining to a monitoring target and which attribute of a marker to change in the case of changing the form of display of a mark (namely, an attribute of the marker).

According to this example, the same as in the above-described first example, etc., the mark displaying part 303B causes the form of display of a marker to differ between when a monitoring target (namely, a person) detected by the monitoring target detecting part 301B is moving and when the monitoring target is stationary.

Specifically, as illustrated in FIG. 23, a marker displayed on the monitoring image of the display device 50 is a non-blinking (namely, constantly lit) trajectory line when the monitoring target detected by the monitoring target detecting part 301B is moving and is a blinking box frame when the monitoring target is stationary the same as in the above-described third example. That is, the mark displaying part 303B causes two attributes (marker type and the presence or absence of blinking) out of the multiple attributes of the marker to differ between when the monitoring target is moving and when the monitoring target is not moving.

Furthermore, according to this example, the mark displaying part 303B changes the form of display of a marker, namely, one attribute (color) out of the multiple attributes of the marker, in accordance with the potential risk of a collision between a monitoring target (namely, a person) detected by the monitoring target detecting part 301B and the shovel. According to this example, the positional relationship between the shovel and the monitoring target, specifically, the distance between the monitoring target and the shovel, is adopted as an indicator of potential risk.

Specifically, as illustrated in FIG. 23, when the potential risk of a monitoring target detected by the monitoring target detecting part 301B is relatively low, that is, the distance from the shovel is relatively large, the color of a marker displayed on the monitoring image of the display device 50 is blue. When the potential risk of a monitoring target detected by the monitoring target detecting part 301B is relatively high, that is, the distance from the shovel is relatively small, the color of a marker displayed on the monitoring image of the display device 50 is red. That is, the monitoring target detecting part 301B displays a red marker on the monitoring image of the display device 50 when the distance between a monitoring target detected by the monitoring target detecting part 301B and the shovel is relatively small (for example, less than or equal to a predetermined threshold), and displays a blue marker on the monitoring image of the display device 50 when the distance between the monitoring target and the shovel is relatively large (for example, more than a predetermined threshold).

Figure 24A:
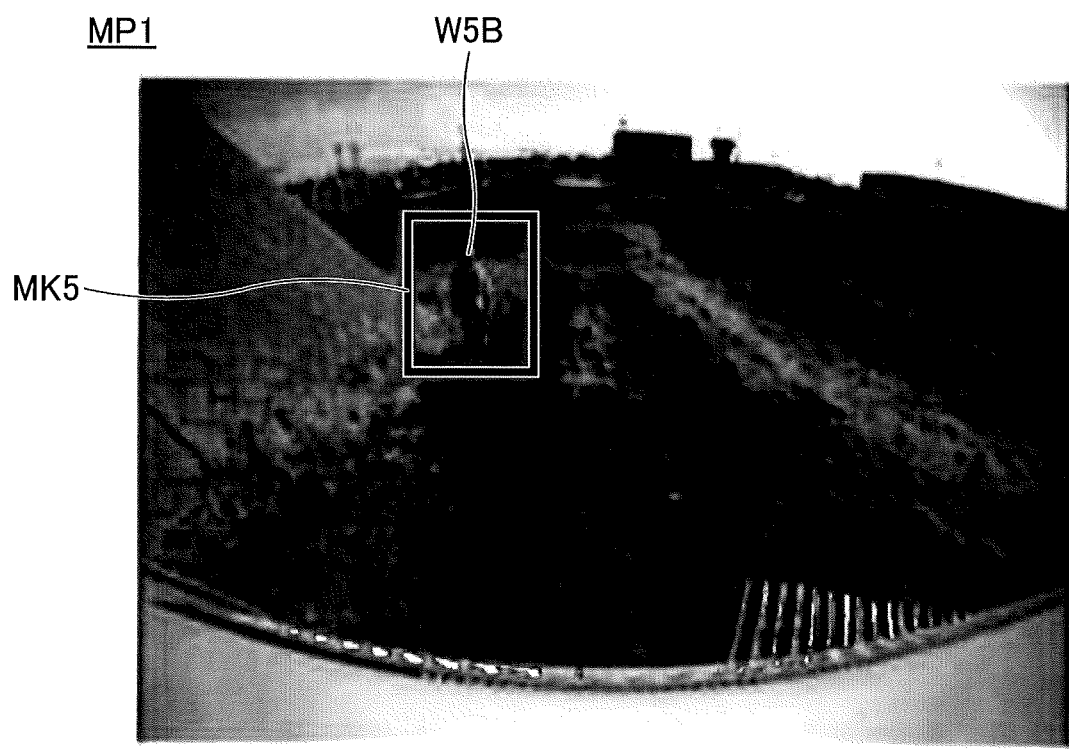
FIG. 24A illustrates an example of the form of display of the marker superimposed and displayed over a through-the-lens image of the display device by fourth through sixth examples of the mark displaying process by the mark displaying part.
Figure 24B:
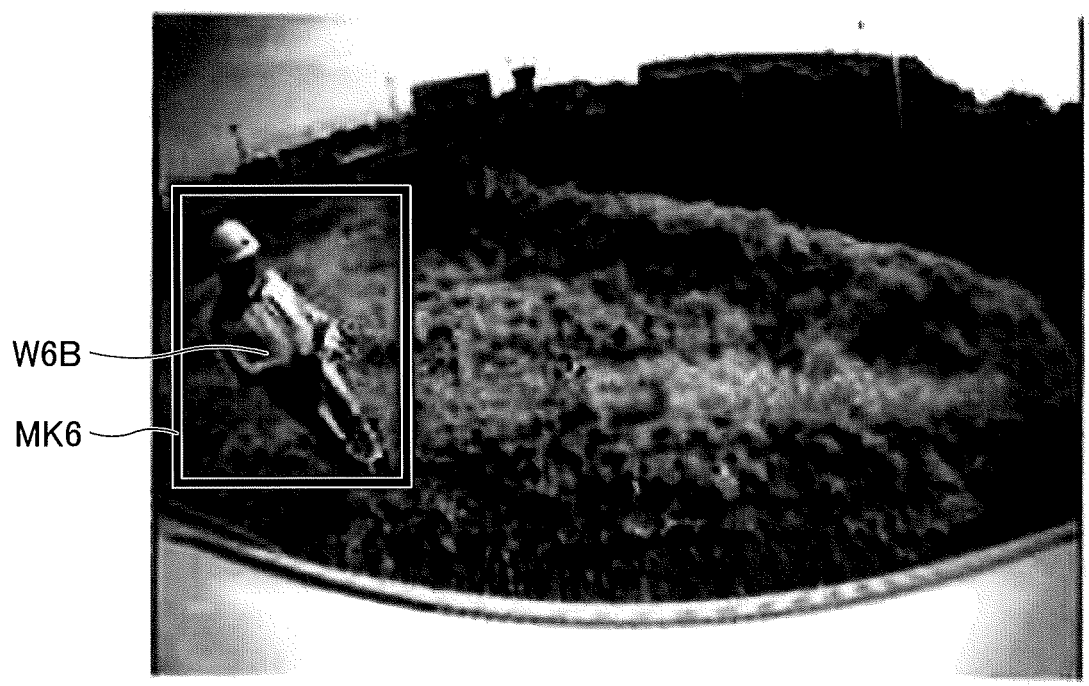
FIG. 24B illustrates an example of the form of display of the marker superimposed and displayed over the through-the-lens image of the display device by the fourth through sixth examples of the mark displaying process by the mark displaying part.
Figure 25A:
FIG. 25A illustrates an example of the form of display of the marker superimposed and displayed over the through-the-lens image of the display device by the fourth through sixth examples of the mark displaying process by the mark displaying part.
Figure 25B:
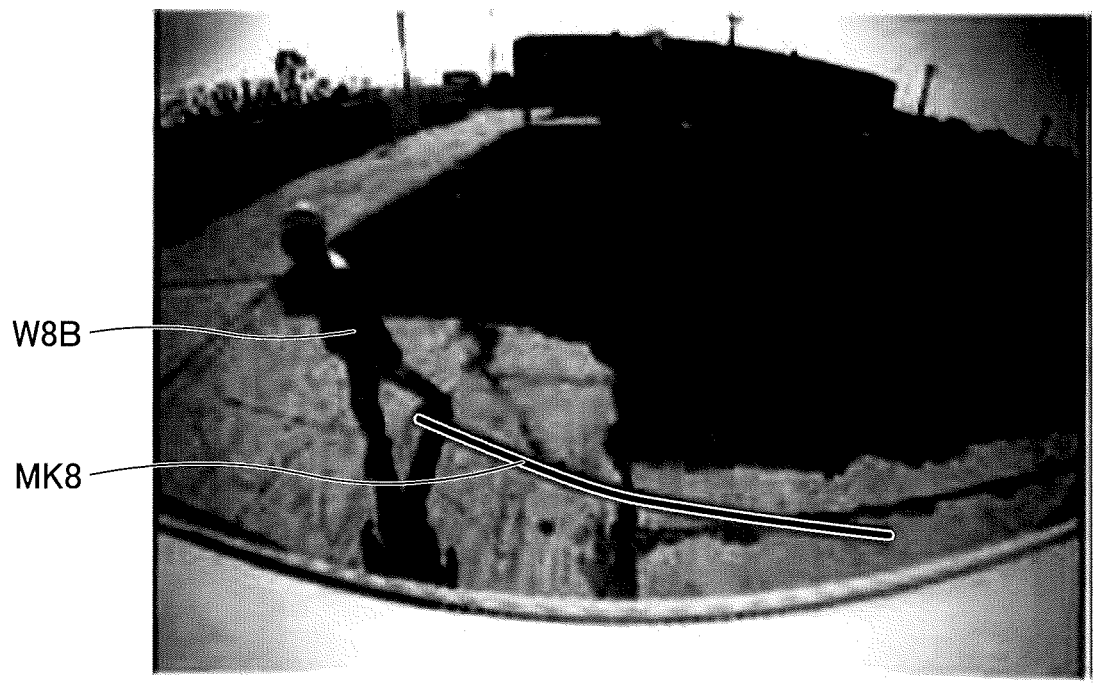
FIG. 25B illustrates an example of the form of display of the marker superimposed and displayed over the through-the-lens image of the display device by the fourth through sixth examples of the mark displaying process by the mark displaying part.

For example, FIGS. 24A and 24B and FIGS. 25A and 25B illustrate examples of the form of display of a marker superimposed and displayed over the through-the-lens image of the display device 50 by the mark displaying process by the mark displaying part 303B. Specifically, FIGS. 24A and 24B illustrate an example of the form of display of a marker superimposed and displayed over the through-the-lens image of the display device 50 by the mark displaying process by the mark displaying part 303B when a monitoring target detected by the monitoring target detecting part 301B is stationary. FIGS. 25A and 25B illustrate an example of the form of display of a marker superimposed and displayed over the through-the-lens image of the display device 50 by the mark displaying process by the mark displaying part 303B when a monitoring target detected by the monitoring target detecting part 301B is moving.

According to this example, as illustrated in FIG. 24A, when a stationary worker W5B is at a position relatively distant from the shovel, the mark displaying part 303B superimposes and displays a blinking blue box frame over the through-the-lens image of the display device 50 as a marker MK5. As illustrated in FIG. 24B, when a stationary worker W6B is at a position relatively close to the shovel, the mark displaying part 303B displays a blinking red box frame over the through-the-lens image of the display device 50 as a marker MK6.

Furthermore, according to this example, as illustrated in FIG. 25A, when a moving worker W7B is at a position relatively distant from the shovel, the mark displaying part 303B superimposes and displays a blue trajectory line (without blinking) over the through-the-lens image of the display device 50 as a marker MK7. As illustrated in FIG. 25B, when a moving worker W8B is at a position relatively close to the shovel, the mark displaying part 303B superimposes and displays a red trajectory line (without blinking) over the through-the-lens image of the display device 50 as a marker MK8.

Figure 26A:
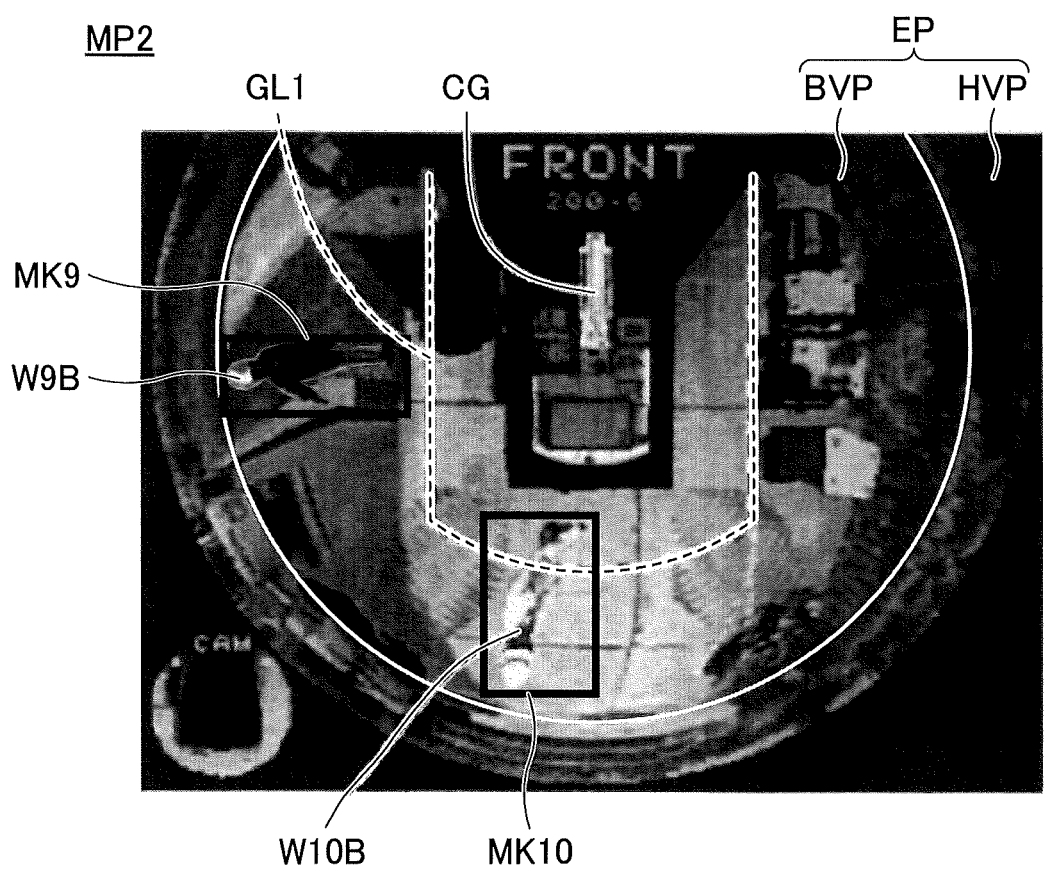
FIG. 26A illustrates an example of the form of display of the marker superimposed and displayed over a surrounding image (viewpoint change image) of the display device by the fourth through sixth examples of the mark displaying process by the mark displaying part.
Figure 26B:
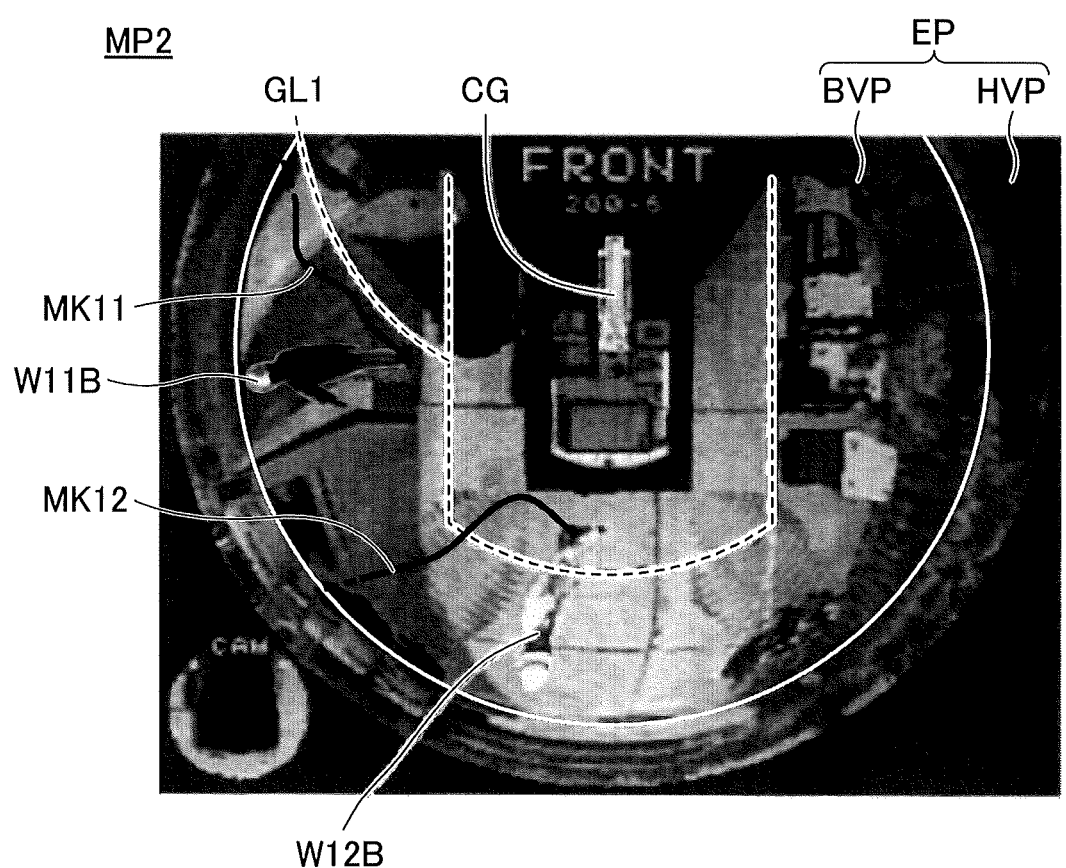
FIG. 26B illustrates an example of the form of display of the marker superimposed and displayed over the surrounding image (viewpoint change image) of the display device by the fourth through sixth examples of the mark displaying process by the mark displaying part.

Furthermore, for example, FIGS. 26A and 26B illustrate an example of the form of display of a marker superimposed and displayed over the surrounding image of the display device 50 by the mark displaying process by the mark displaying part 303B. Specifically, FIG. 26A illustrates an example of the form of display of a marker superimposed and displayed over the surrounding image of the display device 50 by the mark displaying process by the mark displaying part 303B when a monitoring target detected by the monitoring target detecting part 301B is stationary. FIG. 26B illustrates an example of the form of display of a marker superimposed and displayed over the surrounding image of the display device 50 by the mark displaying process by the mark displaying part 303B when a monitoring target detected by the monitoring target detecting part 301B is moving.

According to this example, as illustrated in FIG. 26A, when a stationary worker W9B is at a position relatively distant from the shovel, for example, outside the guideline GL1, the mark displaying part 303B displays a blinking blue box frame over the surrounding image EP of the display device 50 as a marker MK9. When a stationary worker W10B is at a position relatively close to the shovel, for example, inside the guideline GL1, the mark displaying part 303B displays a blinking red box frame over the surrounding image EP of the display device 50 as a marker MK10.

Furthermore according to this example, as illustrated in FIG. 26B, when a moving worker W11B is at a position relatively distant from the shovel, the mark displaying part 303B displays a blue trajectory line (without blinking) over the surrounding image EP of the display device 50 as a marker MK11. When a moving worker W12B is at a position relatively close to the shovel, the mark displaying part 303B displays a red trajectory line (without blinking) over the surrounding image EP of the display device 50 as a marker MK12.

Thus, according to this example, the same as in the above-described first example (FIG. 20), etc., the mark displaying part 303B causes the form of display of a marker to differ between when the monitoring target (namely, a person) detected by the monitoring target detecting part 301B is moving and when the monitoring target is stationary. As a result, the same effects as in the above-described first example, etc., can be obtained. Furthermore, according to this example, the mark displaying part 303B also causes the form of display of a marker, namely, the color of the marker, to differ between when the distance between the monitoring target and the shovel is relatively small and when the distance is relatively large according to the positional relationship between the shovel and the monitoring target, namely, the distance between the monitoring target and the shovel. Therefore, the operator can determine whether the potential risk of a collision between the monitoring target and the shovel is high or low, namely, whether the monitoring target is relatively distant from or close to the shovel, based on a change in the form of display of the marker. In particular, according to this example, when the distance between the shovel and the monitoring target is relatively small, namely, the potential risk is high, a marker in "red" that evokes risk is displayed. Therefore, in this respect, it is easier to determine the risk potential.

The mark displaying part 303B may display a trajectory line as a marker only when the monitoring target detected by the monitoring target detecting part 301B is moving and the distance between the monitoring target and the shovel is relatively small, and otherwise, namely, when the monitoring target is not moving or the distance between the monitoring target and the shovel is relatively large, display a box frame as a marker. This is because the necessity of the movement trajectory of a relatively distant monitoring target may be relatively low.

Next, FIG. 27 is a diagram illustrating a fifth example of the mark displaying process by the mark displaying part 303B, and is specifically a diagram illustrating a fifth example of the correspondence relationship between a condition pertaining to a monitoring target and which attribute of a marker to change in the case of changing the form of display of a mark (namely, an attribute of the marker).

According to this example, the same as in the above-described first example, etc., the mark displaying part 303B causes the form of display of a marker to differ between when a monitoring target (namely, a person) detected by the monitoring target detecting part 301B is moving and when the monitoring target is stationary.

Specifically, as illustrated in FIG. 27, a marker displayed on the monitoring image of the display device 50 is a non-blinking (namely, constantly lit) trajectory line when a monitoring target detected by the monitoring target detecting part 301B is moving and is a blinking box frame when the monitoring target is stationary the same as in the above-described third example, etc. That is, the mark displaying part 303B causes two attributes (marker type and the presence or absence of blinking) out of the multiple attributes of the marker to differ between when the monitoring target is moving and when the monitoring target is not moving.

Furthermore, according to this example, the same as in the above-described fourth example, the mark displaying part 303B changes the form of display of a marker, namely, one attribute (color) out of the multiple attributes of the marker, in accordance with the potential risk of a collision between a monitoring target (namely, a person) detected by the monitoring target detecting part 301B and the shovel. According to this example, the positional relationship between the shovel and the monitoring target, specifically, the state of chronological changes, namely, the state of changes over time, in the distance between the monitoring target and the shovel, is adopted as an indicator of potential risk.

Specifically, as illustrated in FIG. 27, the color of a marker displayed on the monitoring image of the display device 50 is blue when the potential risk of the monitoring target detected by the monitoring target detecting part 301B is relatively low, namely, the monitoring target is not chronologically approaching the shovel (that is, there is no change in the distance between the shovel and the monitoring target or the monitoring target is moving away from the shovel). On the other hand, the color of a marker displayed on the monitoring image of the display device 50 is red when the potential risk of the monitoring target detected by the monitoring target detecting part 301B is relatively high, namely, the monitoring target is chronologically approaching the shovel. That is, the mark displaying part 303B displays a red marker on the monitoring image of the display device 50 when a change over time in the distance between the monitoring target detected by the monitoring target detecting part 301B and the shovel indicates the approach of the monitoring target to the shovel, and displays a blue marker on the monitoring image of the display device 50 when a change over time in the distance between the monitoring target detected by the monitoring target detecting part 301B and the shovel does not indicate the approach to the shovel.

The mark displaying part 303B may determine whether the monitoring target is approaching the shovel by monitoring a change in the distance between the shovel and the monitoring target over a certain period of time in the past.

For example, according to this example, even when the stationary worker W5B is at a position relatively distant from the shovel as illustrated in FIG. 24A described above, the mark displaying part 303B displays a blinking red box frame over the through-the-lens image of the display device 50 as the marker MK5 if the worker W5B is chronologically approaching the shovel. On the other hand, even when the stationary worker W6B is at a position relatively close to the shovel as illustrated in FIG. 24B described above, the mark displaying part 303B displays a blinking blue box frame on the through-the-lens image of the display device 50 as the marker MK6 if the worker W6B is chronologically moving away from the shovel.

Furthermore, according to this example, for example, as illustrated in FIG. 25A described above, the moving worker W7B is at a position relatively distant from the shovel but is approaching the shovel, and therefore, the mark displaying part 303B displays a red trajectory line (without blinking) on the through-the-lens image of the display device 50 as the marker MK7. On the other hand, as illustrated in FIG. 25B described above, the moving worker W8B is at a position relatively close to the shovel but is moving away from the shovel, and therefore, the mark displaying part 303B displays a blue trajectory line (without blinking) on the through-the-lens image of the display device 50 as the marker MK8.

Furthermore, according to this example, for example, even when the stationary worker W9B is at a position relatively distant from the shovel, for example, outside the guideline GL1 as illustrated in FIG. 26A described above, the mark displaying part 303B displays a blinking red box frame on the surrounding image EP of the display device 50 as the marker MK9 if the worker W9B is chronologically approaching the shovel. On the other hand, even when the stationary worker W10B is at a position relatively close to the shovel, for example, inside the guideline GL1, the mark displaying part 303B displays a blinking blue box frame on the surrounding image EP of the display device 50 as the marker MK10 if the worker W10B is chronologically moving away from the shovel.

Furthermore, according to this example, as illustrated in FIG. 26B, the moving worker W11B is at a position relatively distant from the shovel but is approaching the shovel, and therefore, the mark displaying part 303B displays a red trajectory line (without blinking) on the surrounding image EP of the display device 50 as the marker MK11. Furthermore, the moving worker W12B is at a position relatively close to the shovel but is moving away from the shovel after approaching the shovel, and therefore, the mark displaying part 303B displays a blue trajectory line (without blinking) on the surrounding image EP of the display device 50 as the marker MK12.

As illustrated in FIG. 26B, the worker W12B included in the surrounding image EP is moving away from the shovel after approaching the shovel. Therefore, the mark displaying part 303B may cause a trajectory portion approaching the shovel to be red and cause a trajectory portion moving away from the shovel to be blue in the marker MK12 (trajectory line) of the worker W12B. The same applies to a sixth example (FIG. 28) described below.

Thus, according to this example, the same as in the above-described first example (FIG. 20), etc., the mark displaying part 303B causes the form of display of a marker to differ between when the monitoring target (namely, a person) detected by the monitoring target detecting part 301B is moving and when the monitoring target is stationary. As a result, the same effects as in the above-described first example, etc., can be obtained. Furthermore, according to this example, the mark displaying part 303B also causes the form of display of a marker, namely, the color of the marker, to differ between the case where the monitoring target is approaching the shovel and another case (where the monitoring target is moving away from the shovel or there is no change in the distance from the shovel) in accordance with the positional relationship between the shovel and the monitoring target, namely, the state of changes over time in the distance between the monitoring target and the shovel. Therefore, the same as in the above-described fourth example, the operator can determine whether the potential risk of a collision between the monitoring target and the shovel is high or low, namely, whether the monitoring target is approaching the shovel, based on a change in the form of display of the marker. In particular, according to this example, the same as in the fourth example, when the monitoring target is approaching the shovel, namely, the potential risk is high, a marker in "red" that evokes risk is displayed. Therefore, in this respect, it is easier to determine the risk potential.

Next, FIG. 28 is a diagram illustrating a sixth example of the mark displaying process by the mark displaying part 303B, and is specifically a diagram illustrating a sixth example of the correspondence relationship between a condition pertaining to a monitoring target and which attribute of a marker to change in the case of changing the form of display of a mark (namely, an attribute of the marker).

According to this example, the same as in the above-described first example, etc., the mark displaying part 303B causes the form of display of a marker to differ between when a monitoring target (namely, a person) detected by the monitoring target detecting part 301B is moving and when the monitoring target is stationary.

Specifically, as illustrated in FIG. 28, a marker displayed on the monitoring image of the display device 50 is a trajectory line when a monitoring target detected by the monitoring target detecting part 301B is moving, and is a box frame when the monitoring target is stationary. That is, the mark displaying part 303B causes one attribute (marker type) out of the attributes of the marker to differ between when the monitoring target is moving and when the monitoring target is not moving.

Furthermore, according to this example, the same as in the above-described fourth example, etc., the mark displaying part 303B changes the form of display of a marker, namely, an attribute of the marker, in accordance with the potential risk of a collision between a monitoring target (namely, a person) detected by the monitoring target detecting part 301B and the shovel. According to this example, the above-described positional relationship between the shovel and the monitoring target, specifically, the distance between the monitoring target and the shovel according to the above-described fourth example and the state of chronological changes, namely, the state of changes over time, in the distance between the monitoring target and the shovel according to the above-described fifth example are both adopted as indicators of potential risk.

Specifically, as illustrated in FIG. 28, when the distance between the monitoring target detected by the monitoring target detecting part 301B and the shovel is relatively large, a marker displayed on the monitoring image of the display device 50 is without blinking, namely, constantly lit. On the other hand, when the potential risk of the monitoring target detected by the monitoring target detecting part 301B is relatively high, namely, the distance from the shovel is relatively small, a marker displayed on the monitoring image of the display device 50 is blinking. That is, the mark displaying part 303B causes one attribute (the presence or absence of blinking) out of the multiple attributes of a marker to be displayed on the monitoring image of the display device 50 to differ between when the distance between the monitoring target detected by the monitoring target detecting part 301B and the shovel is relatively small and when the distance is relatively large.

Furthermore, the color of a marker displayed on the monitoring image of the display device 50 is blue when the monitoring target detected by the monitoring target detecting part 301B is not chronologically approaching the shovel. On the other hand, the color of a marker displayed on the monitoring image of the display device 50 is red when the monitoring target detected by the monitoring target detecting part 301B is chronologically approaching the shovel. That is, the mark displaying part 303B causes one attribute (color) out of the multiple attributes of a marker to be displayed on the monitoring image of the display device 50 to differ between when a change over time in the distance between the monitoring target detected by the monitoring target detecting part 301B and the shovel indicates the approach of the monitoring target to the shovel and when a change over time in the distance between the monitoring target detected by the monitoring target detecting part 301B and the shovel does not indicate the approach to the shovel.

For example, because the stationary worker W5B is at a position relatively distant from the shovel as illustrated in FIG. 24A described above, the mark displaying part 303B displays a non-blinking, namely, constantly lit, red box frame on the through-the-lens image of the display device 50 as the marker MK5 if the worker W5B is approaching the shovel, and displays a non-blinking, namely, constantly lit, blue box frame on the through-the-lens image of the display device 50 as the marker MK5 if the worker W5B is not approaching the shovel. On the other hand, because the stationary worker W6B is at a position relatively close to the shovel as illustrated in FIG. 24B described above, the mark displaying part 303B displays a blinking red box frame on the through-the-lens image of the display device 50 as the marker MK6 if the worker W5B is approaching the shovel, and displays a blinking blue box frame on the through-the-lens image of the display device 50 as the marker MK6 if the worker W5B is not approaching the shovel.

Furthermore, for example, because the moving worker W7B is at a position relatively distant from the shovel and approaching the shovel as illustrated in FIG. 25A described above, the mark displaying part 303B displays a non-blinking, namely, constantly lit, red trajectory line on the through-the-lens image of the display device 50 as the marker MK7. On the other hand, because the moving worker W8B is at a position relatively close to the shovel and moving away from the shovel as illustrated in FIG. 25B described above, the mark displaying part 303B displays a blinking blue trajectory line on the through-the-lens image of the display device 50 as the marker MK8.

Furthermore, the stationary worker W9B is at a position relatively distant from the shovel as illustrated in FIG. 26A described above, the mark displaying part 303B displays a non-blinking, namely, constantly lit, red box frame on the surrounding image EP of the display device 50 as the marker MK9 if the worker W9B is approaching the shovel, and displays a non-blinking, namely, constantly lit, blue box frame on the surrounding image EP of the display device 50 as the marker MK9 if the worker W9B is not approaching the shovel. On the other hand, the stationary worker W10B is at a position relatively close to the shovel. Therefore, the mark displaying part 303B displays a blinking red box frame on the surrounding image EP of the display device 50 as the marker MK10 if the worker W10B is approaching the shovel, and displays a blinking blue box frame on the surrounding image EP of the display device 50 as the marker MK10 if the worker W10B is not approaching the shovel.

Furthermore, for example, as illustrated in FIG. 26B described above, the moving worker W11B is at a position relatively distant from the shovel and approaching the shovel. Therefore, the mark displaying part 303B displays a non-blinking, namely, constantly lit, red trajectory line on the surrounding image EP of the display device 50 as the marker MK11. On the other hand, the moving worker W12B is at a position relatively close to the shovel and moving away from the shovel. Therefore, the mark displaying part 303B displays a blinking blue trajectory line on the surrounding image EP of the display device 50 as the marker MK12.

Thus, according to this example, the same as in the above-described first example (FIG. 20), etc., the mark displaying part 303B causes the form of display of a marker to differ between when the monitoring target (namely, a person) detected by the monitoring target detecting part 301B is moving and when the monitoring target is stationary. As a result, the same effects as in the above-described first example, etc., can be obtained. Furthermore, according to this example, the mark displaying part 303B also changes the form of display of a marker, namely, an attribute of the marker, in accordance with the positional relationship between the shovel and the monitoring target. Therefore, the same as in the above-described fourth example (FIG. 23), etc., the operator can determine whether the potential risk of a collision between the monitoring target and the shovel is high or low based on a change in the form of display of the marker. Furthermore, according to this example, the distance between the monitoring target and the shovel (a first indicator) and the state of changes over time in the distance (a second indicator) are both adopted as indicators of potential risk, and the potential risk based on each of the first indicator and the second indicator is expressed as changes in different attributes (the presence or absence of blinking and color) of the marker. Therefore, the operator can determine whether the potential risk is high or low based on the two indicators.

While the attributes of a marker are predetermined with respect to each condition pertaining to a monitoring target according to the examples illustrated in FIGS. 20 through 28, the attributes of a marker may be settable with respect to each condition pertaining to a monitoring target by the operator or the like. (See FIG. 29.)

[Settings of Marker Attributes]

Next, the display settings of a marker (the settings of marker attributes) set by the operator or the like is described with reference to FIG. 29.

Figure 29:
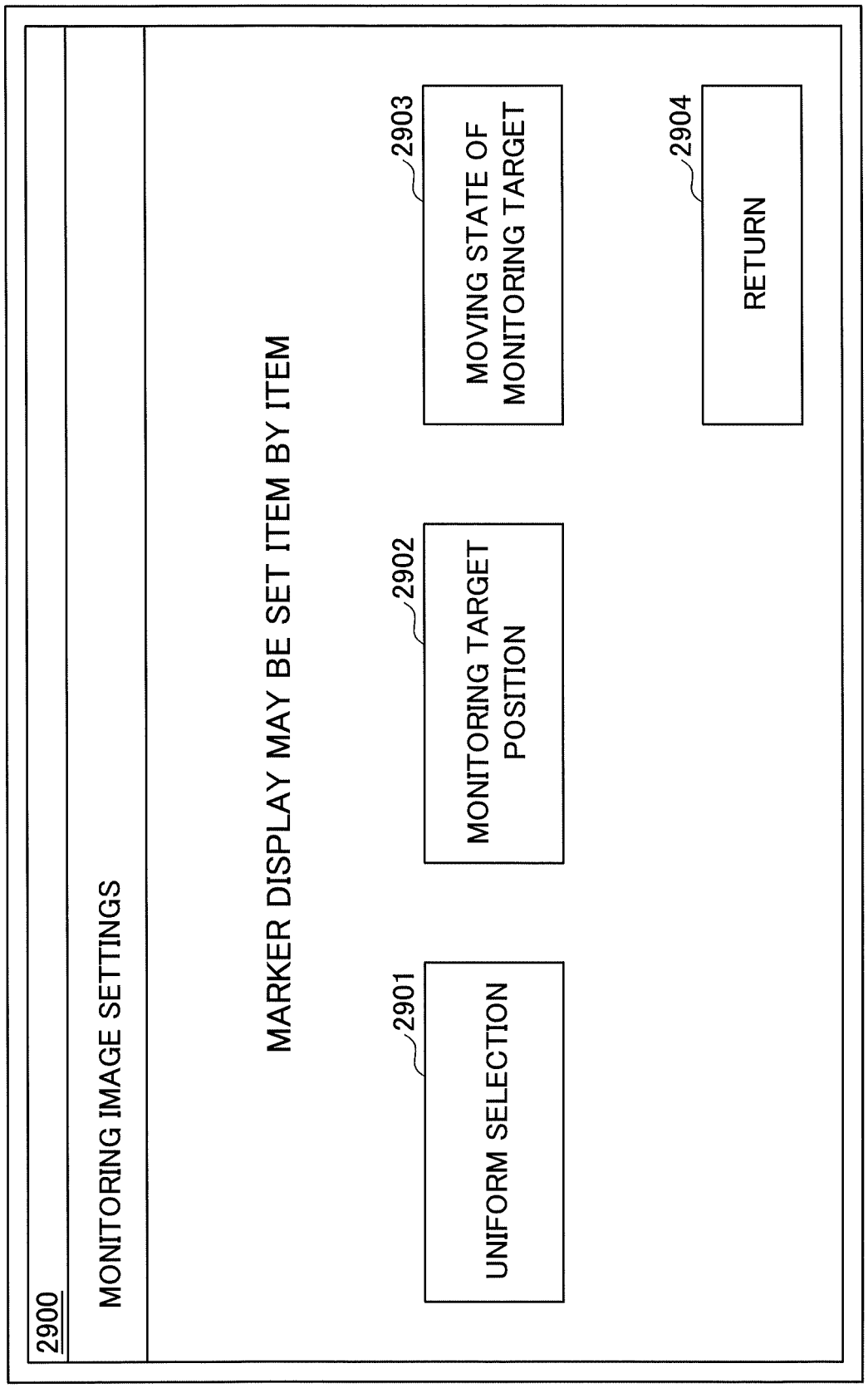
FIG. 29 is a diagram illustrating an example of a marker settings screen.

FIG. 29 is a diagram illustrating an example of an operating screen for setting the display settings of a marker by the operator or the like (hereinafter referred to as "marker settings screen") displayed on the display device 50 (a marker settings screen 2900).

The marker settings screen 2900 allows the operator or the like to specifically set the attributes of a marker.

The marker settings screen 2900 includes hardware operating parts such as a button, a toggle, and a joystick provided in the cabin 10 and button icons 2901 through 2904 operable with a touchscreen or the like installed in the display device 50.

The button icon 2901 is labeled with text information "UNIFORM SELECTION." The operator or the like can switch to a setting screen for fixing the attributes of a marker to be displayed on a monitoring image by performing an operation to select and determine on the button icon 2901. Therefore, the operator or the like can set a mark image to her/his liking by individually setting the attributes of the marker on the setting screen after switching.

The button icon 2902 is labeled with text information "MONITORING TARGET POSITION." The operator or the like can specifically set the attributes of a marker with respect to each condition pertaining to the position of a monitoring target among the conditions pertaining to the monitoring target by performing an operation to select and determine on the button icon 2902. Therefore, the operator or the like can set markers of different attributes to her/his liking, for example, for the case where the monitoring target is at a position relatively close to the shovel and for the case where the monitoring target is at a position relatively distant from the shovel on the setting screen after switching.

The button icon 2903 is labeled with text information "MOVING STATE OF MONITORING TARGET." The operator or the like can specifically set the attributes of a marker with respect to each condition pertaining to the moving state of a monitoring target (for example, the presence or absence of movement and the presence or absence of approach to the shovel) among the conditions pertaining to the monitoring target by performing an operation to select and determine on the button icon 2903. Therefore, the operator or the like can set a different marker to her/his liking, for example, for each of conditions, such as whether the monitoring target is approaching the shovel and whether the monitoring target is moving, and their combinations on the setting screen after switching.

It is obvious that a setting screen that allows marker attributes to be set with respect to each combination of a condition pertaining to the position of a monitoring target and a condition pertaining to the moving state of a monitoring target may be prepared.

The button icon 2904 is labeled with text information "RETURN." The operator or the like can display a hierarchically upper-level information screen before switching to the marker settings screen 2900 on the display device 50 by performing an operation to select and determine on the button icon 2904.

Thus, according to this example, the operator or the like can manually set the attributes of a marker with respect to each condition pertaining to a monitoring target. This enables the surroundings monitoring system 100 to display a marker on the monitoring screen according to the preference of the operator or the like.

The second characteristic function of the surroundings monitoring system according to an embodiment of the present invention is described in detail above. The present invention, however, is not limited to this specific embodiment, and variations and modifications may be made without departing from the scope of the present invention.

For example, while the distance between the monitoring target and the shovel (a first indicator) and the state of changes over time in the distance (a second indicator) are used as indicators of potential risk according to the above-described embodiment, indicators other than these indicators may be adopted as desired.

The following is further disclosed with respect to the second characteristic function of the surroundings monitoring system according to the above-described embodiment.

(1) A surroundings monitoring system for a work machine, the surroundings monitoring system including:
an image capturing unit configured to capture an image of surroundings of the work machine; and
a display device configured to display the image of the surroundings of the work machine captured by the image capturing unit and a mark representing a position of a monitoring target,
wherein the display device is configured to cause display of the mark to differ between when the monitoring target is stationary and when the monitoring target is in motion.

(2) The surroundings monitoring system for the work machine according to (1), wherein the mark includes a trajectory line representing a trajectory of the monitoring target.

(3) The surroundings monitoring system for the work machine according to (2), wherein
the image capturing unit includes a plurality of cameras having imaging ranges different from each other, and
the display device is configured to display the trajectory line that is continuous between an image area corresponding to an imaging area of a camera among the plurality of cameras and another image area corresponding to an imaging area of another camera among the plurality of cameras in the image even when the monitoring target moves over the imaging area of the camera and the another imaging area of the another camera.

(4) The surroundings monitoring system for the work machine according to (2), wherein
the image capturing unit includes a plurality of cameras having imaging ranges different from each other, and
wherein, in a case where the image includes an image area and another image area corresponding to an imaging area of a camera and an imaging area of another camera among the plurality of cameras, respectively, the display device is configured to, even after the monitoring target is no longer included in the imaging area of the camera, continue displaying the trajectory line while the monitoring target is included in the imaging area of the another camera.

(5) The surroundings monitoring system for the work machine according to any of (2) through (4), wherein the trajectory line is displayed such that a portion thereof with more elapsed time is less easily visible than a portion thereof with less elapsed time.

(6) The surroundings monitoring system for the work machine according to any of (1) through (5), wherein the display device is configured to change the display of the mark in accordance with a positional relationship between the monitoring target and the work machine.

(7) The surroundings monitoring system for the work machine according to (6), wherein the display device is configured to change the display of the mark in accordance with a distance between the work machine and the monitoring target.

(8) The surroundings monitoring system for the work machine according to (6) or (7), wherein the display device is configured to change the display of the mark in accordance with a state of a change over time in the distance between the work machine and the monitoring target.

(9) The surroundings monitoring system for the work machine according to any of (1) through (5), wherein the display device is configured to change the display of the mark in accordance with a potential risk of a collision between the work machine and the monitoring target.

(10) The surroundings monitoring system for the work machine according to any of (1) through (9), wherein the display device is configured to change the display of the mark by changing at least one of attributes of the mark, the attributes including shape, color, pattern, size, luminance, and presence or absence of blinking.

[Third Characteristic Function of Surroundings Monitoring System]

Next, the third characteristic function pertaining to the surroundings monitoring system 100 according to this embodiment, specifically, a function of notifying the operator or the like of the presence of a vehicle (such as a truck) approaching the shovel from an area relatively distant from the shovel (which may hereinafter also be referred to as "distant approaching vehicle notifying function"), is described.

[Overview of Effects According to Third Characteristic Function]

First, an overview of effects according to the third characteristic function (distant approaching vehicle notifying function) is given.

A surroundings monitoring system for a work machine including an object detecting part that detects an object (e.g., a person) that is a target in a predetermined nearby area close to a work machine and a notifying part that notifies an operator or the like in response to detection of the object by the object detecting part is known.

According to such a configuration, the operator or the like can readily recognize the presence of an object that is a monitoring target in a nearby area close to a work machine.

In light of work efficiency, however, there is a demand from the operator or the like for earlier recognition of a vehicle (a truck in particular) approaching the work machine from a distance. This is because, for example, it is possible to make improvements in work efficiency, such as advancing preparations for dumping earth onto a truck in time for the arrival of an approaching truck. Therefore, it is desirable that the operator or the like can readily recognize an object such as a vehicle in a distant area more distant than the nearby area.

Therefore, according to this embodiment, a surroundings monitoring system for a work machine that enables an operator or the like to readily recognize a vehicle in an area distant from a work machine with the third characteristic function is provided.

[Configuration of Surroundings Monitoring System]

Next, a specific configuration of the surroundings monitoring system 100 related to the third characteristic function is described with reference to FIG. 30.

Figure 30:
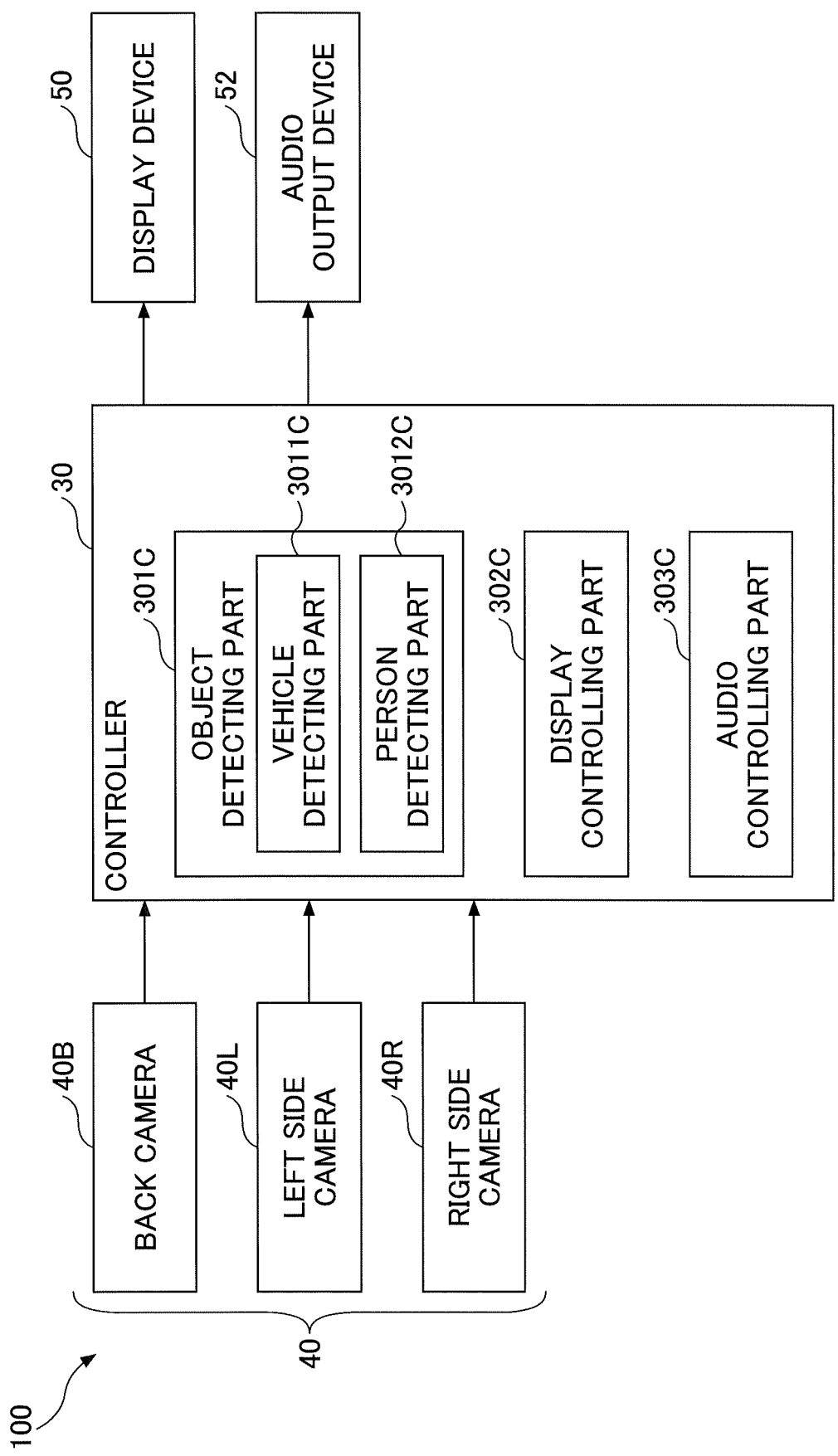
FIG. 30 is a block diagram illustrating an example configuration of the surroundings monitoring system related to a third characteristic function (distant approaching vehicle notifying function)

FIG. 30 is a block diagram illustrating an example configuration of the surroundings monitoring system 100 according to this embodiment.

The illustration of FIG. 30 focuses on a configuration related to the third characteristic function, and other configurations illustrated in FIGS. 1 and 2 are omitted.

The surroundings monitoring system 100 monitors the entry of a predetermined object (a vehicle and a person according to this embodiment) into a predetermined area around the shovel, and in response to detecting the predetermined object, makes a notification to the operator or the like. The surroundings monitoring system 100 includes the controller 30, the image capturing unit 40, the display device 50, and the audio output device 52.

As described above, the controller 30 executes various control processes in the surroundings monitoring system 100. The controller 30 includes, for example, the object detecting part 301C, the display controlling part 302C, and the audio controlling part 303C as functional parts implemented by executing various programs stored in the ROM or the secondary storage on the CPU.

As described above, the image capturing unit 40 includes the back camera 40B, the left side camera 40L, and the right side camera 40R. The back camera 40B, the left side camera 40L, and the right side camera 40R are attached to the top of the upper turning body 3 such that their optical axes point obliquely downward, and have respective vertical imaging ranges (angles of view) covering the ground near the shovel to an area far from the shovel. During the operation of the shovel, the back camera 40B, the left side camera 40L, and the right side camera 40R output captured images and transmit them to the controller 30 at predetermined intervals (for example, every 1/30 seconds).

The display device 50 displays an image (through-the-lens image) captured by the image capturing unit 40, a surrounding image (for example, a viewpoint change image as described below) that the controller 30 (the display controlling part 302C) generates based on the images captured by the image capturing unit 40, etc.

The audio output device 52 outputs a predetermined sound under the control of the controller 30 (the audio controlling part 303C).

The object detecting part 301C detects an object that is a predetermined target in a predetermined area around the shovel based on a captured image captured by the image capturing unit 40. The object detecting part 301C includes a vehicle detecting part 3011C that detects a vehicle including a truck as a detection target and a person detecting part 3012C that detects a person as a detection target.

The vehicle detecting part 3011C detects a vehicle, targeting a predetermined detection area around the shovel (hereinafter referred to as vehicle detection area). Specifically, the vehicle detecting part 3011C detects a vehicle, determining a distant area (for example, an area where the distance D from the shovel exceeds the predetermined distance D1) outside and next to a nearby area close to the shovel (for example, an area where the distance D from the shovel is less than or equal to the predetermined distance D1) as the vehicle detection area. For example, the vehicle detecting part 3011C can recognize a vehicle in a captured image and identify the actual position of the recognized vehicle (e.g., a distance from the shovel to the recognized vehicle) by applying known various image processing techniques and machine learning-based identifiers as desired.

The person detecting part 3012C detects a person, targeting a predetermined detection area around the shovel (hereinafter referred to as person detection area). Specifically, the person detecting part 3012C detects a person, determining a nearby area close to the shovel (for example, an area where the distance D from the shovel is less than or equal to the predetermined distance D1 as described above) as the vehicle detection area. For example, the person detecting part 30121C can recognize a person in a captured image and identify the actual position of the recognized person (e.g., a distance from the shovel to the recognized person) by applying known various image processing techniques and machine learning-based identifiers as desired.

The display controlling part 302C displays various kinds of information images on the display device 50 in accordance with the operator's various operations or the like. For example, the display controlling part 302C displays the captured image (through-the-lens image) of the image capturing unit 40 (the back camera 40B, the left side camera 40L, and the right side camera 40R) on the display device 50 in accordance with the operator's predetermined operation. Furthermore, for example, the display controlling part 302C generates a surrounding image based on the captured image of the image capturing unit 40 and displays it on the display device 50 in accordance with the operator's predetermined operation. Specifically, the display controlling part 302C generates, as a surrounding image, a viewpoint change image (an image viewed from a virtual viewpoint) by performing a known viewpoint changing process based on the captured images of the back camera 40B, the left side camera 40L, and the right side camera 40R, and displays it on the display device 50. Furthermore, when displaying a surrounding image on the display device 50, the display controlling part 302C also displays a shovel image schematically representing the shovel on the display device 50 in order to clearly indicate the relative positional relationship of the imaging range of the image capturing unit 40 shown in the surrounding image to the shovel. That is, the display controlling part 302C generates a monitoring image including a shovel image and a surrounding image placed along the periphery of the shovel image in accordance with the relative positional relationship between the shovel and the imaging range of the image capturing unit 40, and displays it on the display device 50. The monitoring image displayed on the display device 50 is described below with reference to FIG. 31.

Figure 31:
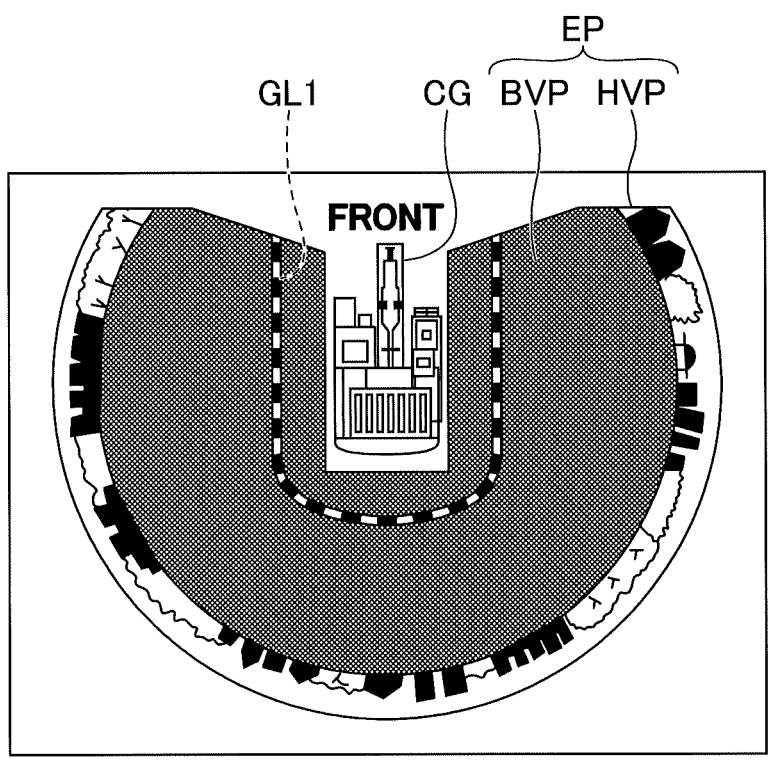
FIG. 31 a diagram illustrating an example of the monitoring image displayed on the display device.

FIG. 31 is a diagram illustrating an example of the monitoring image MP2 displayed on the display device 50. As illustrated in FIG. 31, the monitoring image MP2 including the shovel image CG and the surrounding image EP placed along the periphery of the shovel image CG as described above is displayed on a laterally elongated rectangular screen (for example, a screen of an aspect ratio of 4:3) on the display device 50. This enables the operator to appropriately understand the positional relationship between an object (namely, a person, a vehicle or the like) shown in the surrounding image EP and the shovel.

The surrounding image EP according to this example is a viewpoint change image that is a combination of the overhead view image BVP viewing a surrounding area adjacent to the shovel from directly above and the horizontal image HVP viewing the surroundings of the surrounding area horizontally from the shovel and placed along the periphery of the overhead view image BVP. The surrounding image EP, which is a viewpoint change image, can be obtained by projecting the respective captured images of the back camera 40B, the left side camera 40L, and the right side camera 40R onto a spatial model and re-projecting the projected images projected onto the spatial model onto a different two-dimensional plane. The spatial model is an object onto which a captured image is projected in a virtual space, and is composed of one or more plane surfaces or curved surfaces that include a plane surface or a curved surface different from a plane surface in which the captured image is positioned. In the following, the description continues based on the assumption that a surrounding image according to this embodiment is a viewpoint change image that is a combination of an overhead view image viewing a surrounding area adjacent to the shovel from directly above and a horizontal image viewing the surroundings of the surrounding area horizontally from the shovel.

Furthermore, the guideline GL1 is superimposed and displayed on the monitoring image MP2 (the surrounding image EP). The guideline GL1 represents positions where the distance D from the shovel is the predetermined distance D2 (<D1). As a result, when an object such as a vehicle or a person is shown in the surrounding image, the operator can understand how distant the position is from the shovel.

Referring back to FIG. 30, when a vehicle is detected in the vehicle detection area by the vehicle detecting part 3011C, the display controlling part 302C performs display that indicates the detection of a vehicle, such as display that highlights part of the through-the-lens image or the surrounding image displayed on the display device 50. Furthermore, as described below (see FIG. 39), when a person is detected in the person detection area by the person detecting part 3012C, the display controlling part 302C may perform display that indicates the detection of a person, such as display that highlights an area including the detected person (a person area) of the through-the-lens image or the surrounding image displayed on the display device 50. The process by the person detecting part 3012C is described in detail below.

The function of the display controlling part 302C may be provided outside the controller 30, and for example, may be built into the display device 50. In this case, the captured image of the image capturing unit 40 (the back camera 40B, the left side camera 40L, and the right side camera 40R) and information such as the results of detection by the vehicle detecting part 3011C and the person detecting part 3012C are input to the display device 50 from the image capturing unit 40 and the controller 30, respectively.

The audio controlling part 303C, in response to detection of a vehicle in the vehicle detection area by the vehicle detecting part 3011C, controls the audio output device 52 to output a predetermined sound that notifies the operator or the like of the detection of a vehicle (hereinafter, a vehicle detection sound). Furthermore, as described below (see FIG. 39), when a person is detected by the person detecting part 3012C, the audio controlling part 303C may output a predetermined sound that notifies the detection of a person (hereinafter, a person detection sound).

The function of the audio controlling part 303C may be provided outside the controller 30, and for example, may be built into the audio output device 52.

[Details of Operation of Surroundings Monitoring System]

Next, a characteristic operation of the surroundings monitoring system 100 according to this embodiment is described with reference to FIGS. 32 through 41.

Figure 32:
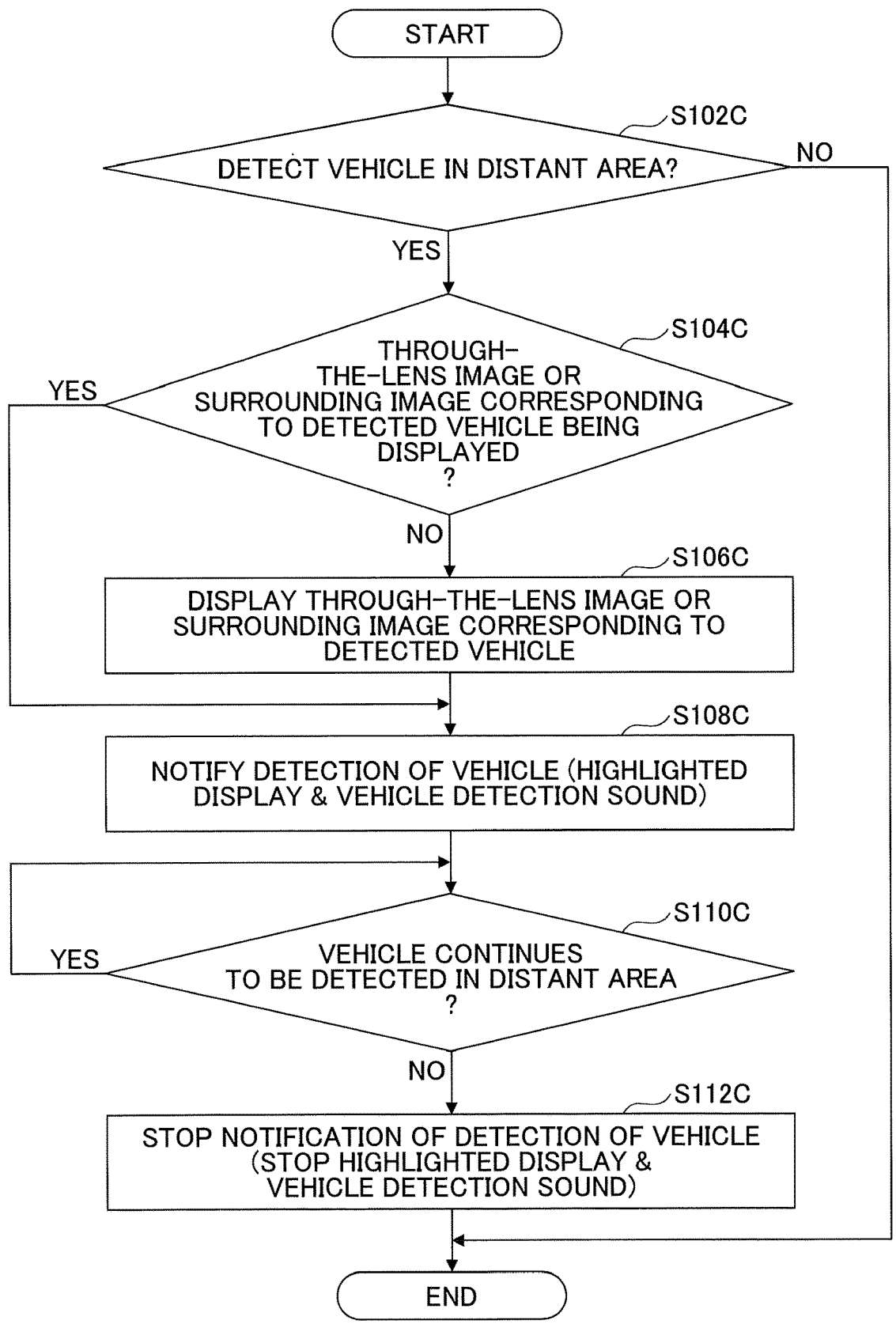
FIG. 32 is a flowchart schematically illustrating a first example of a process by the surroundings monitoring system.

FIG. 32 is a flowchart schematically illustrating a first example of a process by the surroundings monitoring system 100 according to this embodiment. The process according to this flowchart is, for example, repeatedly executed at predetermined time intervals during the operation of the shovel.

At step S102C, the vehicle detecting part 3011C determines whether a vehicle is detected in the vehicle detection area, namely, the distant area (an area where the distance D from the shovel exceeds the predetermined distance D1) around the shovel. The vehicle detecting part 3011C proceeds to step S104C in response to detection of a vehicle in the distant area, and otherwise, ends the process of this time.

At step S104C, the display controlling part 302C determines whether or not a through-the-lens image (the below-described monitoring image MP1) or surrounding image (the monitoring image MP2) in which the vehicle detected by the vehicle detecting part 3011C (detected vehicle) is shown is displayed on the display device 50. The display controlling part 302C proceeds to step S106C if neither a through-the-lens image nor a surrounding image in which the detected vehicle is shown is displayed on the display device 50, and proceeds to step S108C if either one is displayed.

At step S106C, the display controlling part 302C displays a through-the-lens image or surrounding image in which the detected vehicle is shown. Which image to display is predetermined.

At step S108C, the display controlling part 302C notifies the detection of a vehicle in the distant area by highlighting part of the screen of the display device 50, namely, part of the displayed through-the-lens image (monitoring image MP1) or surrounding image (monitoring image MP2) as described above. At the same time, the audio controlling part 303C notifies the operator or the like of the detection of a vehicle in the distant area by outputting a vehicle detection sound from the audio output device 52 as described above.

At step S110C, the vehicle detecting part 3011C determines whether the vehicle continues to be detected in the distant area. The vehicle detecting part 3011C repeats the determination of this step if the vehicle continues to be detected in the distant area, and proceeds to step S112C if the vehicle does not continue to be detected in the distant area, namely, if the vehicle is no longer detected in the distant area.

At step S112C, the display controlling part 302C stops displaying part of the through-the-lens image (monitoring image MP1) or surrounding image (monitoring image MP2) in a highlighted manner, and at the same time, the audio controlling part 303C stops the vehicle detection sound, thereby ending the process of this time.

Thus, according to this example, when a vehicle is detected in the distant area by the object detecting part 301C (the vehicle detecting part 3011C), the display device 50 and the audio output device 52 (both examples of the notifying part) notify the operator or the like of the detection of a vehicle. Specifically, the display device 50 performs display that highlights part of the through-the-lens image (monitoring image MP1) or surrounding image (monitoring image MP2) under the control of the display controlling part 302C, and the audio output device 52 outputs a vehicle detection sound under the control of the audio controlling part 303C. This enables the operator or the like to readily recognize a vehicle that may approach the shovel from a distance. Therefore, for example, it is possible to make improvements in work efficiency, such as advancing preparations for dumping earth onto a truck in time for the arrival of a truck approaching from a distance.

Furthermore, in response to detection of a vehicle in the distant area by the object detecting part 301C (the vehicle detecting part 3011C), the display device 50 and the audio output device 52 make a notification to that effect. In this state, when the vehicle is no longer detected in the distant area, the display device 50 and the audio output device 52 stops the notification. For example, when the vehicle is no longer detected in the distant area because of its further movement from the distant area to the nearby area (namely, further movement toward the shovel), the display device 50 and the audio output device 52 stops the notification. This can prevent the operator from feeling irritation or discomfort that would be caused by the notification being continued despite the operator already being able to recognize a vehicle approaching the shovel from a distance.

Figure 33A:
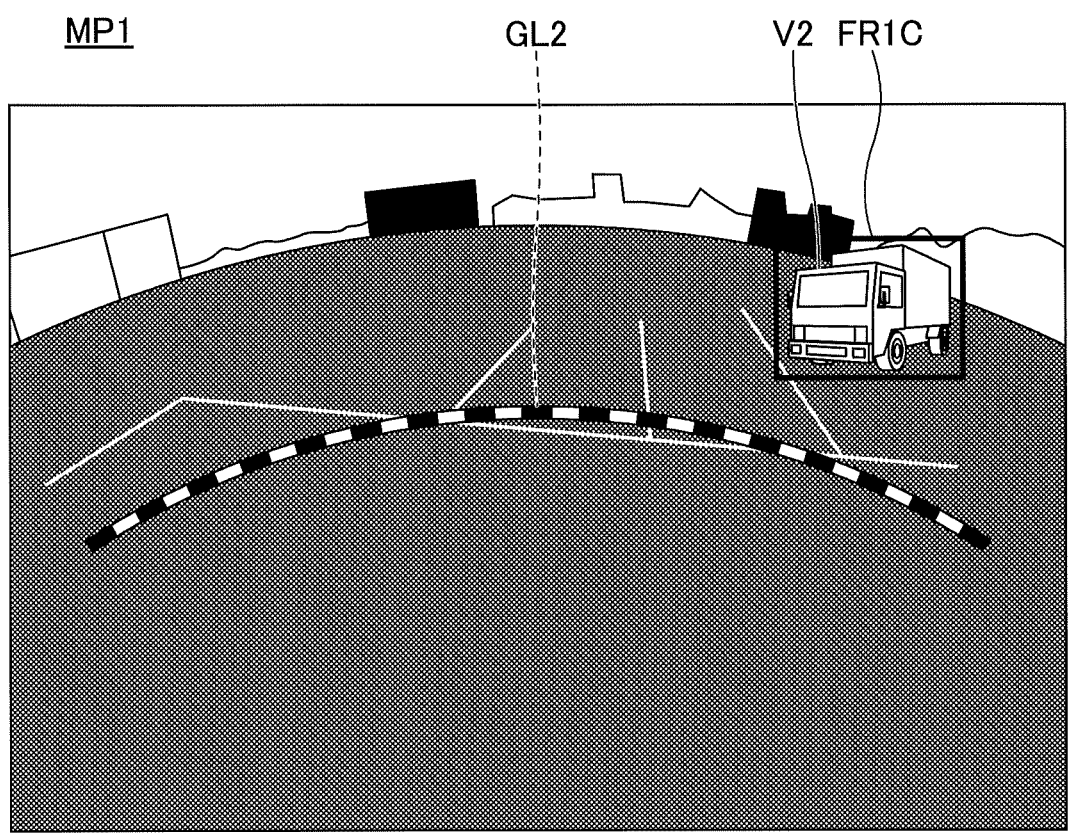
FIG. 33A is a diagram illustrating an example of the through-the-lens image displayed on the display device.
Figure 33B:
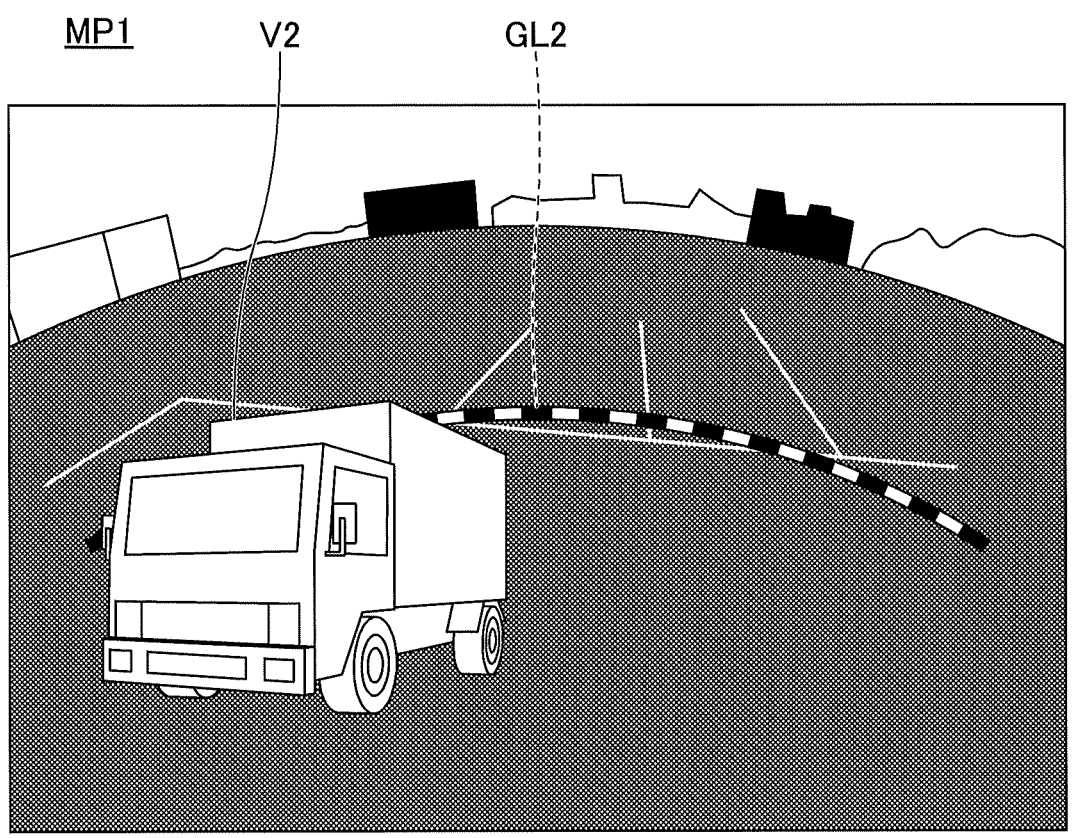
FIG. 33B is a diagram illustrating an example of the through-the-lens image displayed on the display device.

For example, FIGS. 33A and 33B illustrate examples of the through-the-lens image as the monitoring image MP1 displayed on the display device 50. Specifically, FIG. 33A is a diagram illustrating a through-the-lens image in the case where a vehicle is detected in the distant area by the vehicle detecting part 3011C, and FIG. 33B is a diagram illustrating a through-the-lens image in the case where the vehicle is no longer detected in the distant area by the vehicle detecting part 3011C.

As illustrated in FIG. 33A, a guideline GL2 indicating the boundary between the nearby area and the distant area (namely, positions at which the distance D from the shovel is the predetermined distance D1) is superimposed and displayed on a through-the-lens image displayed on the display device 50. A truck V1 detected by the vehicle detecting part 3011C is shown in the area above the guideline GL2 corresponding to the distant area in the through-the-lens image. An area including the truck V1 (vehicle area) is highlighted and displayed by being enclosed by a thick frame FR1C. As a result, the area including the truck V1 (vehicle area), which is part of the screen (through-the-lens image) of the display device 50, is highlighted. Therefore, the display device 50 can notify the operator or the like of the detection of the truck V1.

In contrast, as illustrated in FIG. 33B, the truck V1 detected by the vehicle detecting part 3011C further approaches the shovel to change the state to be included in the area below the guideline GL2 corresponding to the nearby area in the through-the-lens image. Therefore, the truck V1 is no longer detected in the distant area by the vehicle detecting part 3011C, so that the display that highlights the area including the truck V1 (the display of the thick frame FR1C) is stopped. This can prevent the operator from feeling irritation or discomfort that would be caused by the continuation of the notification as described above.

Figure 34A:
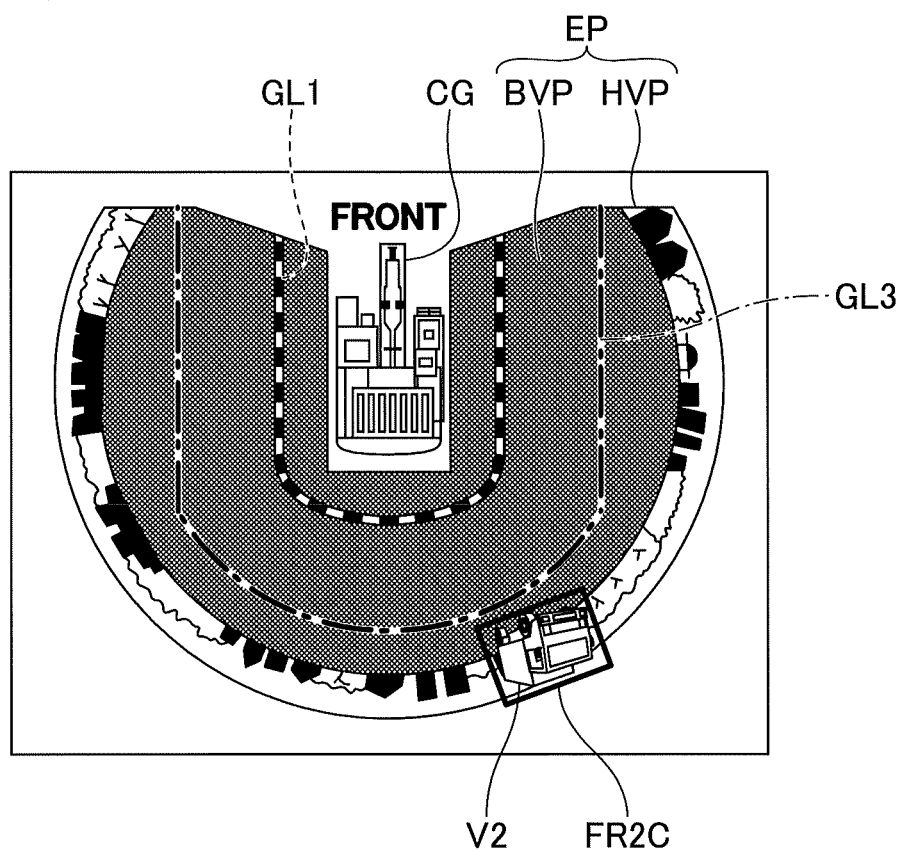
FIG. 34A is a diagram illustrating an example of the surrounding image displayed on the display device (an example of highlighted display of a detected vehicle in the surrounding image)
Figure 34B:
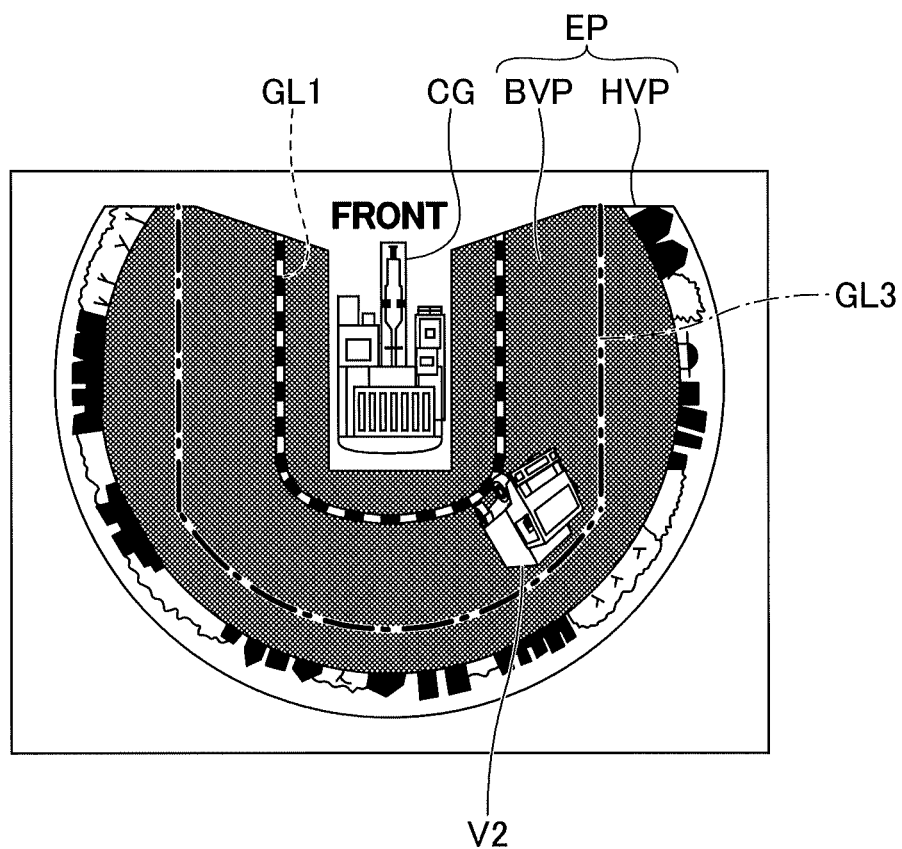
FIG. 34B is a diagram illustrating an example of the surrounding image displayed on the display device (an example of the highlighted display of the detected vehicle in the surrounding image)

Furthermore, for example, FIGS. 34A and 34B illustrate examples of the surrounding image EP (monitoring image MP2) displayed on the display device 50. Specifically, FIG. 34A is a diagram illustrating an example of the highlighted display of a detected vehicle in the surrounding image EP (monitoring image MP2) in the case where a vehicle is detected in the distant area by the vehicle detecting part 3011C, and FIG. 34B is a diagram illustrating the surrounding image EP (monitoring image MP2) in the case where the vehicle is no longer detected in the distant area by the vehicle detecting part 3011C because of the movement of the detected vehicle into the nearby area.

As illustrated in FIG. 34A, a guideline GL3 indicating the boundary between the nearby area and the distant area (namely, positions at which the distance D from the shovel is the predetermined distance D1) is superimposed and displayed on the surrounding image EP displayed on the display device 50. A truck V2 detected by the vehicle detecting part 3011C is shown in the area outside the guideline GL3 corresponding to the distant area in the surrounding image EP. The same as in the example of the through-the-lens image illustrated in FIG. 33A, an area including the truck V2 (vehicle area) is highlighted by being enclosed by a thick frame FR2C and displayed. As a result, the area including the truck V2 (vehicle area), which is part of the screen (monitoring image MP2) of the display device 50, is highlighted. Therefore, the display device 50 can notify the operator or the like of the detection of the truck V2.

Furthermore, as illustrated in FIG. 34B, the truck V2 detected by the vehicle detecting part 3011C further approaches the shovel to change the state to be included in the area inside the guideline GL3 corresponding to the nearby area in the surrounding image EP. Therefore, the truck V2 is no longer detected in the distant area by the vehicle detecting part 3011C, so that the display that highlights the area including the truck V2 (the display of the thick frame FR2C) is stopped. This can prevent the operator from feeling irritation or discomfort that would be caused by the continuation of the notification as described above.

Figure 35:
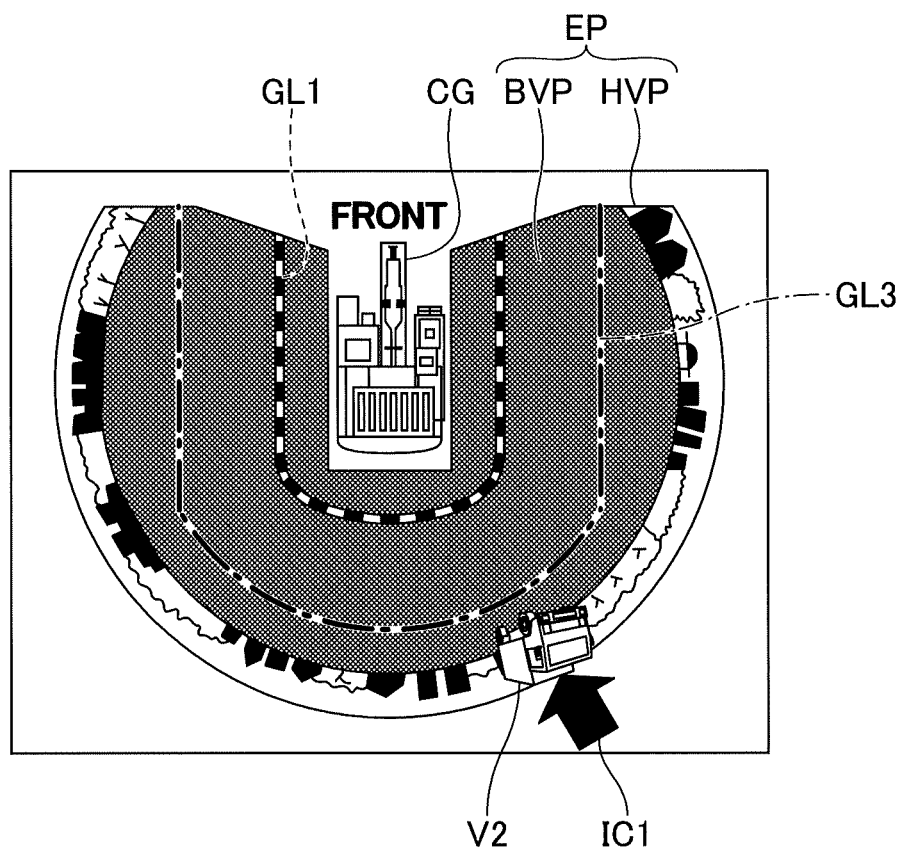
FIG. 35 is a diagram illustrating another example of the highlighted display of the detected vehicle in the surrounding image.

Furthermore, for example, FIG. 35 is a diagram illustrating another example of the highlighted display of a detected vehicle in the surrounding image EP (monitoring image MP2) in the case where a vehicle is detected in the distant area by the vehicle detecting part 3011C.

As illustrated in FIG. 35, according to this example, when the truck V2 is detected by the vehicle detecting part 3011C, the display device 50 highlights part of the surrounding image EP by superimposing and displaying an icon IC1 over the surrounding image EP under the control of the display controlling part 302C. Specifically, the truck V2 detected by the vehicle detecting part 3011C is shown in the area outside the guideline GL3 corresponding to the distant area in the surrounding image EP, and the arrow icon IC1 indicating a direction in which the truck V2 approaches is superimposed and displayed next to the area including the truck V2 on the surrounding image EP. As a result, the area including the truck V2 (vehicle area), which is part of the screen (monitoring image MP2) of the display device 50, is highlighted by the icon IC1. Therefore, the display device 50 can notify the operator or the like of the detection of the truck V2.

The shape of the icon IC1 is not limited to the shape of an arrow, and may be any shape. Furthermore, as a form of display for highlighting an area including a detected vehicle (vehicle area) in a through-the-lens image or surrounding image, a method other than enclosing the vehicle area with a thick frame and displaying an icon in a superimposed manner may be used. For example, the display device 50 may cause the vehicle area to be higher in luminance than other areas, cause the vehicle area to periodically change in luminance to blink, or cause the vehicle area to be different in color from other areas.

Figure 36:
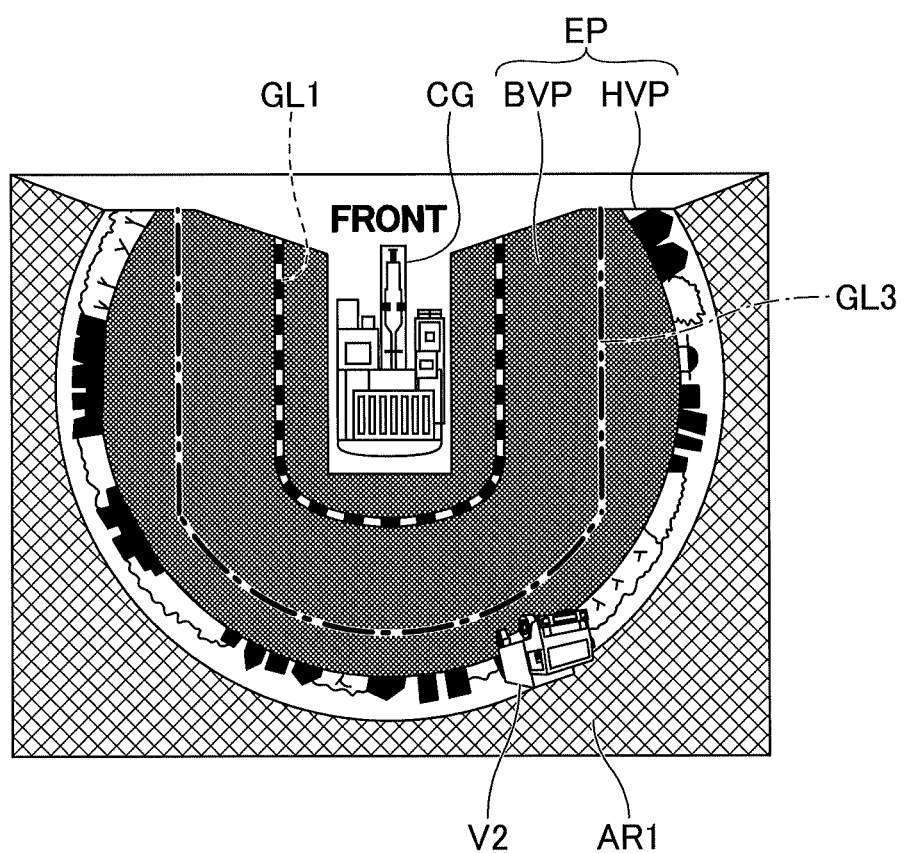
FIG. 36 is a diagram illustrating yet another example of the highlighted display of the detected vehicle in the surrounding image.

Furthermore, for example, FIG. 36 is a diagram illustrating yet another example of the highlighting of a detected vehicle in the surrounding image EP (monitoring image MP2) in the case where a vehicle is detected in the distant area by the vehicle detecting part 3011C.

As illustrated in FIG. 36, according to this example, when the truck V2 is detected by the vehicle detecting part 3011C, the display device 50 highlights and displays an area AR1 outside the outer edge of the surrounding image EP, namely, the area AR1 further outside and next to the area outside the guideline GL3 corresponding to the distant area in the surrounding image EP, in the screen (namely, the monitoring image MP2) under the control of the display controlling part 302C. For example, the display device 50 may highlight the area AR1 by changing the area AR1 to a color or pattern different than normally is, causing the area AR1 to be higher in luminance than other areas, or causing the area AR1 to periodically change in luminance to blink. As a result, the area AR1, which is next to the area outside the guideline GL3 corresponding to the distant area of the surrounding image EP and part of the screen (monitoring image MP2) of the display device 50, is displayed in a highlighted manner. Therefore, the display device 50 can notify the operator or the like of the detection of the truck V2.

Figure 37:
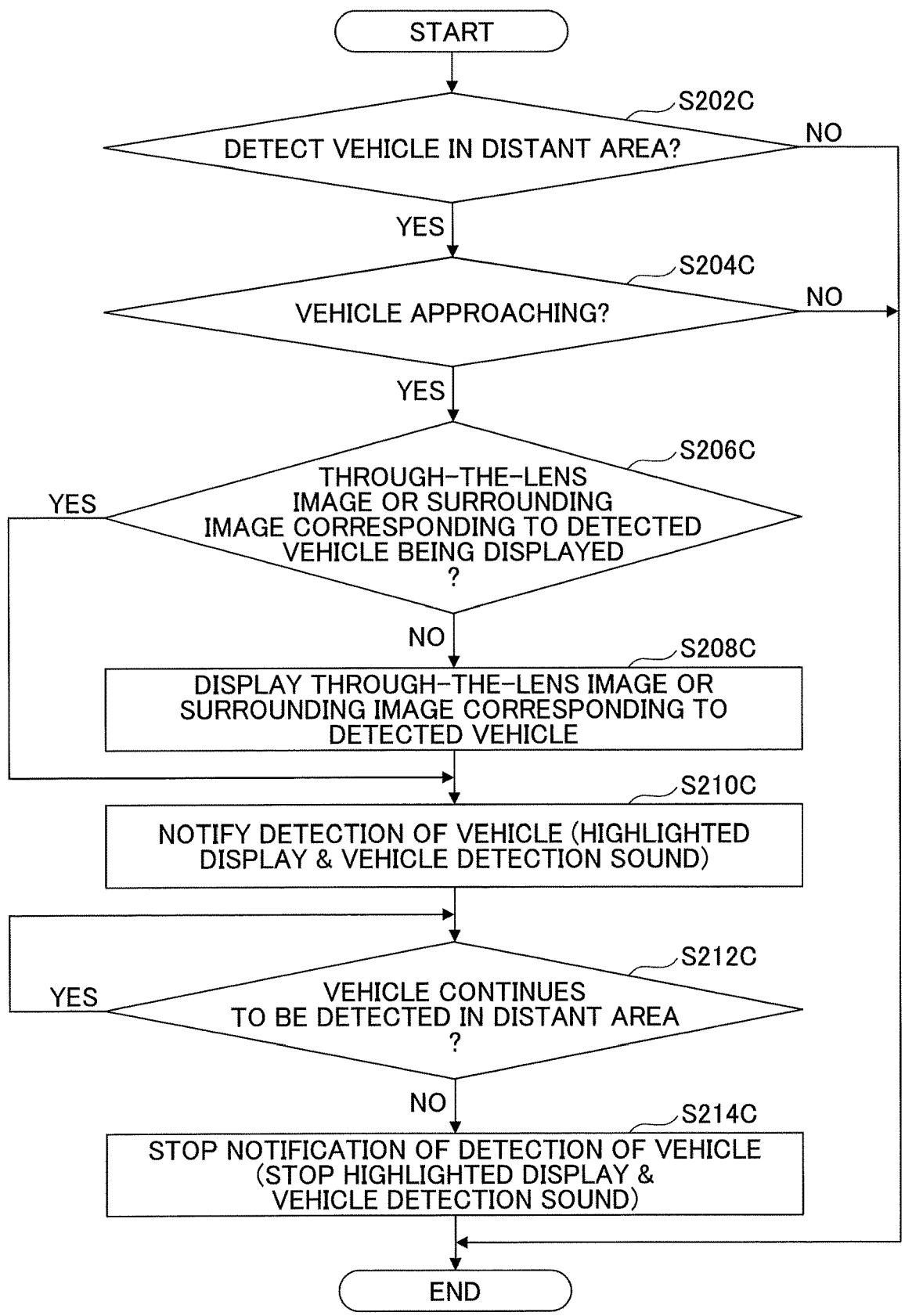
FIG. 37 is a flowchart schematically illustrating a second example of the process by the surroundings monitoring system.

Next, FIG. 37 is a flowchart schematically illustrating a second example of the process by the surroundings monitoring system 100 according to this embodiment. The same as in the above-described first example, the process according to this flowchart is, for example, repeatedly executed at predetermined time intervals during the operation of the shovel.

At step S2020, the same as at step S102C of FIG. 32, the vehicle detecting part 3011C determines whether a vehicle is detected in the vehicle detection area, namely, the distant area (an area where the distance D from the shovel exceeds the predetermined distance D1) around the shovel. The vehicle detecting part 3011C proceeds to step S2040 in response to detection of a vehicle in the distant area, and otherwise, ends the process of this time.

At step S2040, the vehicle detecting part 3011C determines whether the detected vehicle is approaching the shovel. The vehicle detecting part 3011C may determine whether the detected vehicle is approaching the shovel based on, for example, the history of positions (a movement history) in the process of detecting the detected vehicle. The vehicle detecting part 3011C proceeds to step S2060 if the detected vehicle is approaching the shovel, and ends the process of this time if the detected vehicle is not approaching the shovel.

The process of steps S2060 through S214C is the same as the process of steps S104C through S112C in the above-described first example (FIG. 32), and a description thereof is therefore omitted.

Thus, according to this example, when a vehicle approaching, namely, moving toward, the shovel is detected in the distant area by the object detecting part 301C (the vehicle detecting part 3011C), the display device 50 and the audio output device 52 notify the detection of a vehicle. As a result, only when a vehicle approaching the shovel is detected among vehicles in the distant area, a notification to that effect is made. Therefore, it is possible to prevent unnecessary notification.

Figure 38:
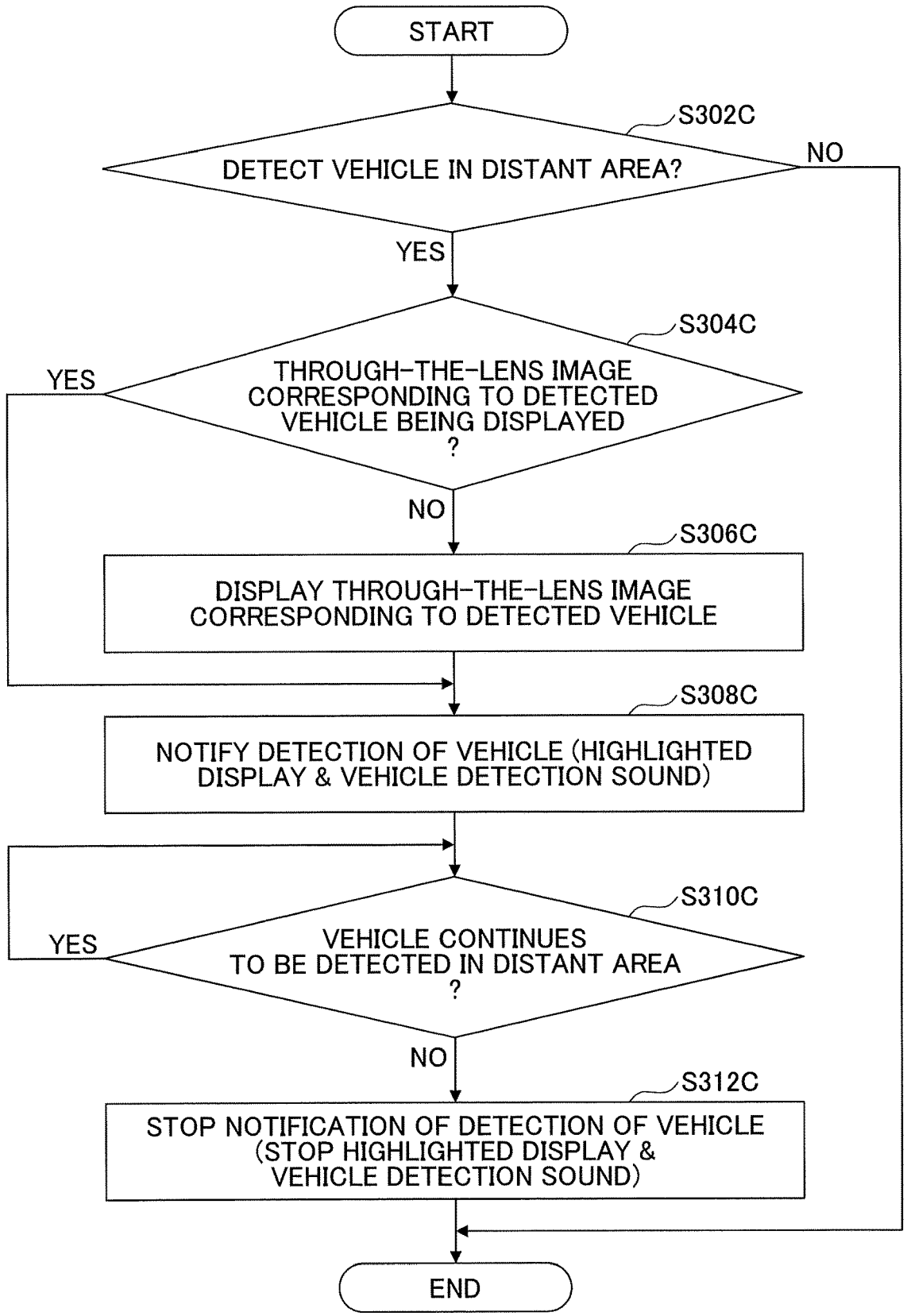
FIG. 38 is a flowchart schematically illustrating a third example of the process by the surroundings monitoring system.

Next, FIG. 38 is a flowchart schematically illustrating a third example of the process by the surroundings monitoring system 100 according to this embodiment. The same as in the above-described first example, etc., the process according to this flowchart is, for example, repeatedly executed at predetermined time intervals during the operation of the shovel.

At step S3020, the same as at step S102C of FIG. 32, etc., the vehicle detecting part 3011C determines whether a vehicle is detected in the vehicle detection area, namely, the distant area (an area where the distance D from the shovel exceeds the predetermined distance D1) around the shovel. The vehicle detecting part 3011C proceeds to step S3040 in response to detection of a vehicle in the distant area, and otherwise, ends the process of this time.

At step S3040, the display controlling part 302C determines whether a through-the-lens image in which the detected vehicle is shown is displayed on the display device 50. The display controlling part 302C proceeds to step S3060 if a through-the-lens image in which the detected vehicle is shown is not displayed on the display device 50, and proceeds to step S3080 if a through-the-lens image in which the detected vehicle is shown is displayed.

At step S3060, the display controlling part 302C displays a through-the-lens image in which the detected vehicle is shown on the display device 50.

Steps S3080 through S312C are the same as steps S108C through S112C of the above-described first example (FIG. 32) except that the object of display of the display device 50 is limited to a through-the-lens image including the detected vehicle, and a description thereof is therefore omitted.

The flowchart of this example, which is based on the above-described first example and composed by replacing the process of steps S104C and S106C with the process of steps S3040 and 306C, may be based on the above-described second example and composed by replacing the process of steps S2060 and S208C with the process of steps S3040 and 306C (a variation of the third example).

Thus, according to this example, when a vehicle is detected in the distant area by the vehicle detecting part 3011C, the display device 50 automatically displays a through-the-lens image including the detected vehicle under the control of the display controlling part 302C. As a result, the vehicle in the distant area included in the through-the-lens image is displayed larger than in the case of a surrounding image. This makes it easy for the operator or the like to check not only the presence of a vehicle in the distant area but also the details of the vehicle.

Figure 39:
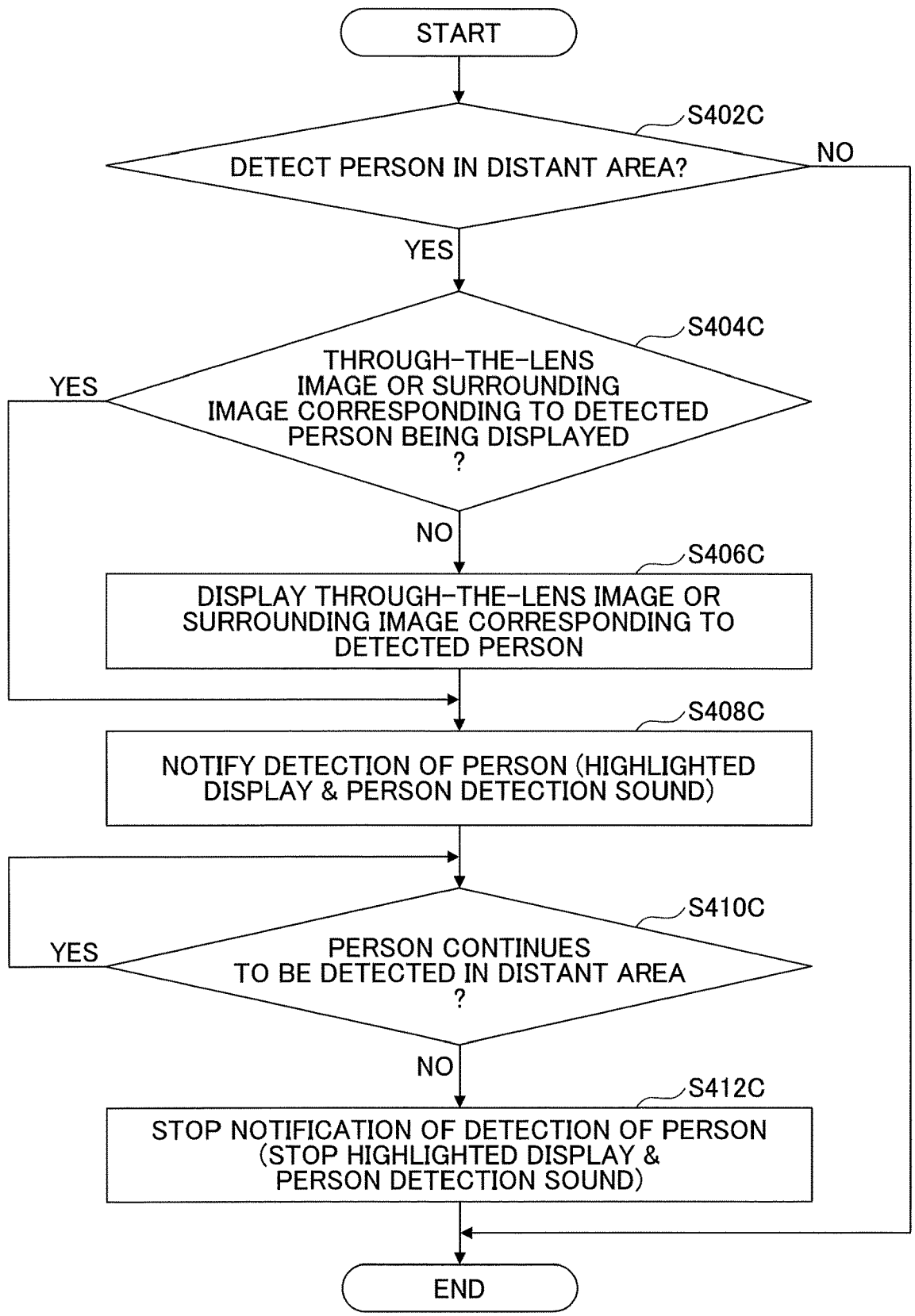
FIG. 39 is a flowchart schematically illustrating a fourth example of the process by the surroundings monitoring system.

Next, FIG. 39 is a flowchart schematically illustrating a fourth example of the process by the surroundings monitoring system 100 according to this embodiment. The process according to this flowchart is executed in parallel with one of the processes according to the first through third examples and the variation of the third example as described above.

At step S4020, the person detecting part 3012C determines whether a person is detected in the person detection area, namely, the nearby area (an area where the distance D from the shovel is less than or equal to the predetermined distance D1) around the shovel. The person detecting part 3012C proceeds to step S4040 in response to detection of a person in the nearby area, and otherwise, ends the process of this time.

At step S4040, the display controlling part 3020 determines whether or not a through-the-lens image or a surrounding image (the monitoring image MP2) in which the person detected by the person detecting part 3012C is shown, serving as a monitoring image, is displayed on the display device 50. The display controlling part 302C proceeds to step S4060 if neither a through-the-lens image nor a surrounding image (the monitoring image MP2) in which the detected person is shown is displayed on the display device 50, and proceeds to step S4080 if either one is displayed.

At step S4060, the display controlling part 302C displays a through-the-lens image or surrounding image (monitoring image MP2) in which the detected person is shown. Which image to display is predetermined.

When the through-the-lens images selected by the processes of the first through third example and the variation of the third example as described above (the through-the-lens images in which the detected vehicle is shown) and the through-the-lens image selected by the process of this example (the through-the-lens image in which the detected person is shown) are different, the display controlling part 302C displays a surrounding image or displays the two through-the-lens images laterally side by side on the display device 50.

At step S4080, the display controlling part 302C notifies the operator or the like of the detection of a person in the nearby area by highlighting the included person on the display device 50 as described above. At the same time, the audio controlling part 303C notifies the operator or the like of the detection of a person in the nearby area by outputting a person detection sound from the audio output device 52 as described above.

At step S410C, the person detecting part 3012C determines whether the person continues to be detected in the nearby area. The person detecting part 3012C repeats the determination of this step if the person continues to be detected in the nearby area, and proceeds to step S412C if the person does not continue to be detected in the nearby area, namely, if the person is no longer detected in the nearby area.

At step S412C, the display controlling part 302C stops displaying the person included in the through-the-lens image (monitoring image MP1) or surrounding image (monitoring image MP2) in a highlighted manner, and at the same time, the audio controlling part 303C stops the person detection sound, thereby ending the process of this time.

Thus, according to this example, the display device 50 and the audio output device 52, in response to detection of a vehicle in the distant area by the object detecting part 301C (the vehicle detecting part 3011C), notifies the operator or the like of the detection of a vehicle, and in response to detection of a person in the nearby area by the object detecting part 301C (the person detecting part 3012C), notifies the operator or the like of the detection of a person. This enables the operator to recognize a vehicle in the distant area early to improve work efficiency, and to recognize a person in the nearby area early to ensure safety.

Furthermore, in response to detection of a person in the nearby area by the object detecting part 301C (the person detecting part 3012C), the display device 50 and the audio output device 52 make a notification to that effect. In this state, when the person is no longer detected in the nearby area, the display device 50 and the audio output device 52 stops the notification. For example, when the person is no longer detected in the nearby area because of its movement from the nearby area to the distant area (namely, movement away from the shovel), the display device 50 and the audio output device 52 stops the notification. This can prevent the operator from feeling irritation or discomfort because the notification is stopped (not performed) when the safety is relatively ensured.

Figure 40A:
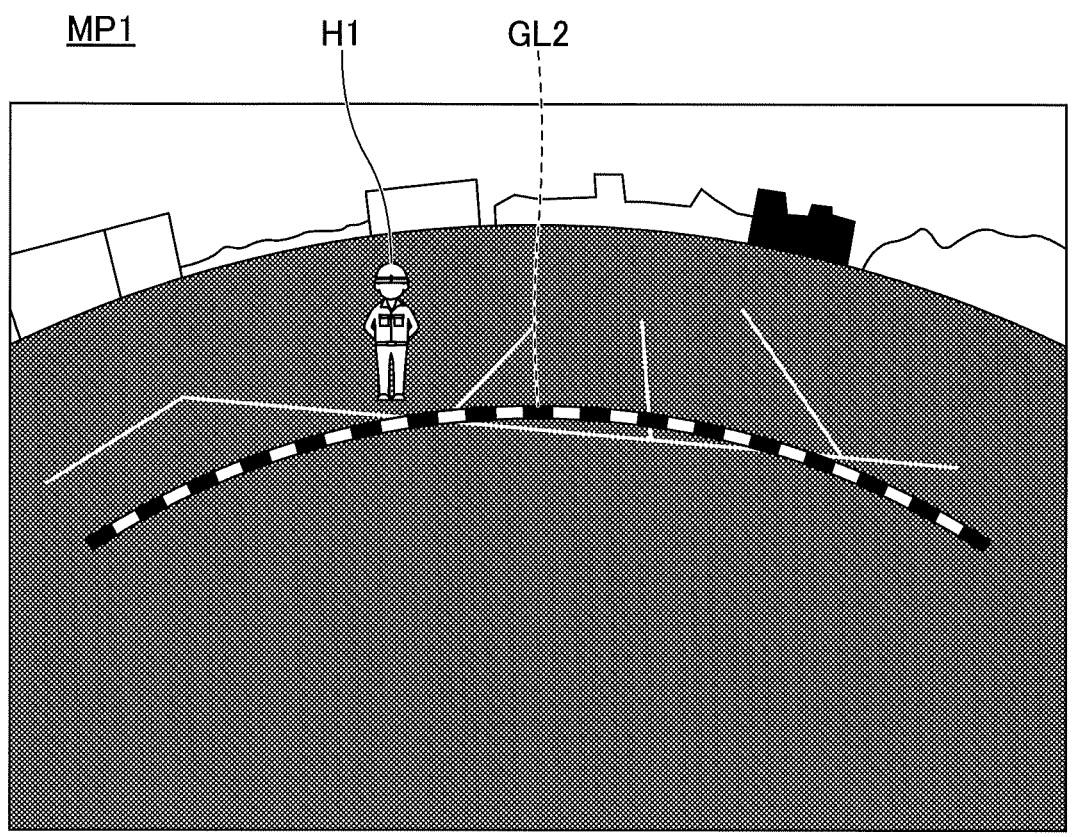
FIG. 40A is a diagram illustrating another example of the through-the-lens image displayed on the display device.
Figure 40B:
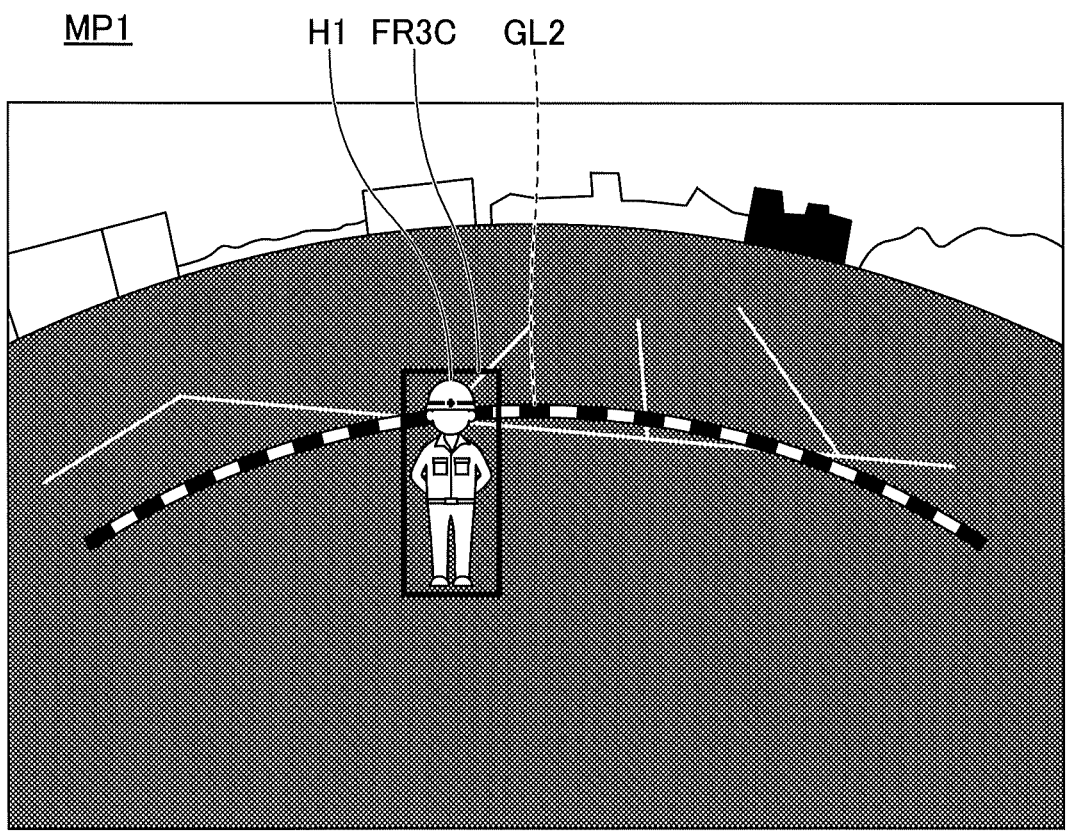
FIG. 40B is a diagram illustrating another example of the through-the-lens image displayed on the display device.

For example, FIGS. 40A and 40B illustrate other examples of the through-the-lens image as the monitoring image MP1 displayed on the display device 50. Specifically, FIG. 40A is a diagram illustrating a through-the-lens image in the case where a person (worker H1) is in the distant area, and FIG. 40B is a diagram illustrating a through-the-lens image in the case where the person (worker H1) has moved into the nearby area to be detected by the person detecting part 3012C.

As illustrated in FIG. 40A, the worker H1 is shown in the area above the guideline GL2 corresponding to the distant area in the through-the-lens image displayed on the display device 50. In this case, the worker H1 in the distant area is not detected by the person detecting part 3012C. Therefore, the notification of the detection of a person (the below-described highlighted display of an area including a person) is not performed.

In contrast, as illustrated in FIG. 40B, the worker H1 approaches the shovel to change the state to be included in the area below the guideline GL2 corresponding to the nearby area in the through-the-lens image. Therefore, the worker H1 is detected in the nearby area by the person detecting part 3012C, so that an area including the worker H1 (person area) is displayed in a highlighted manner, being enclosed by a thick frame FR3C. As a result, as described above, the operator can recognize a person in the nearby area early to ensure safety.

Figure 41A:
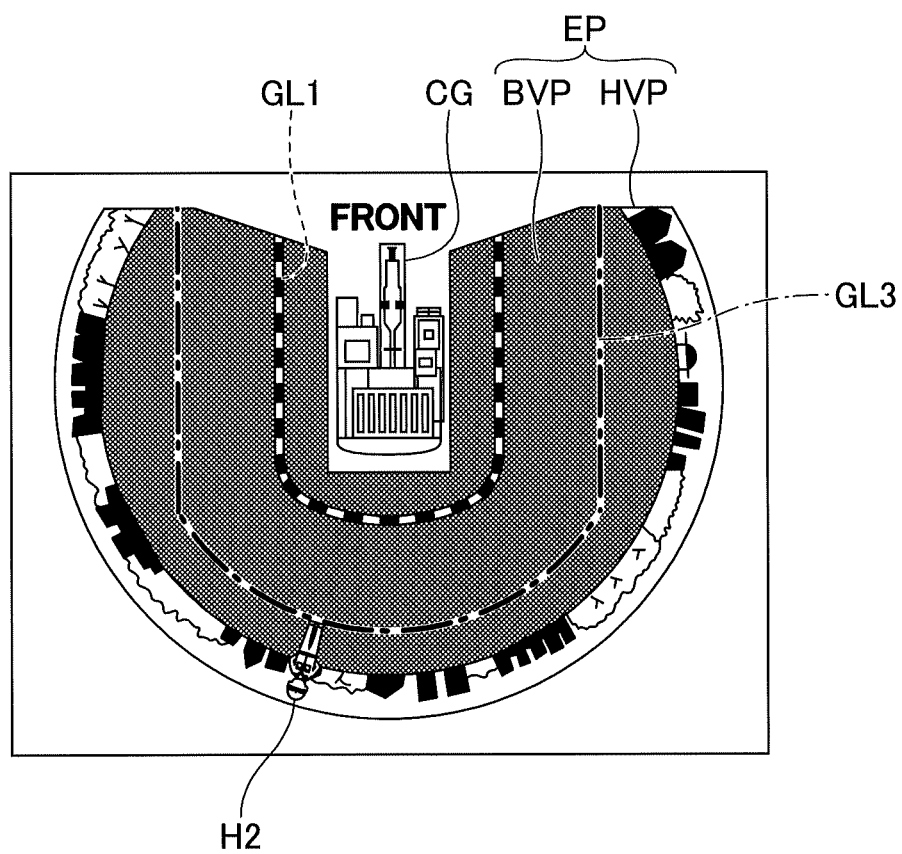
FIG. 41A is a diagram illustrating another example of the surrounding image displayed on the display device.
Figure 41B:
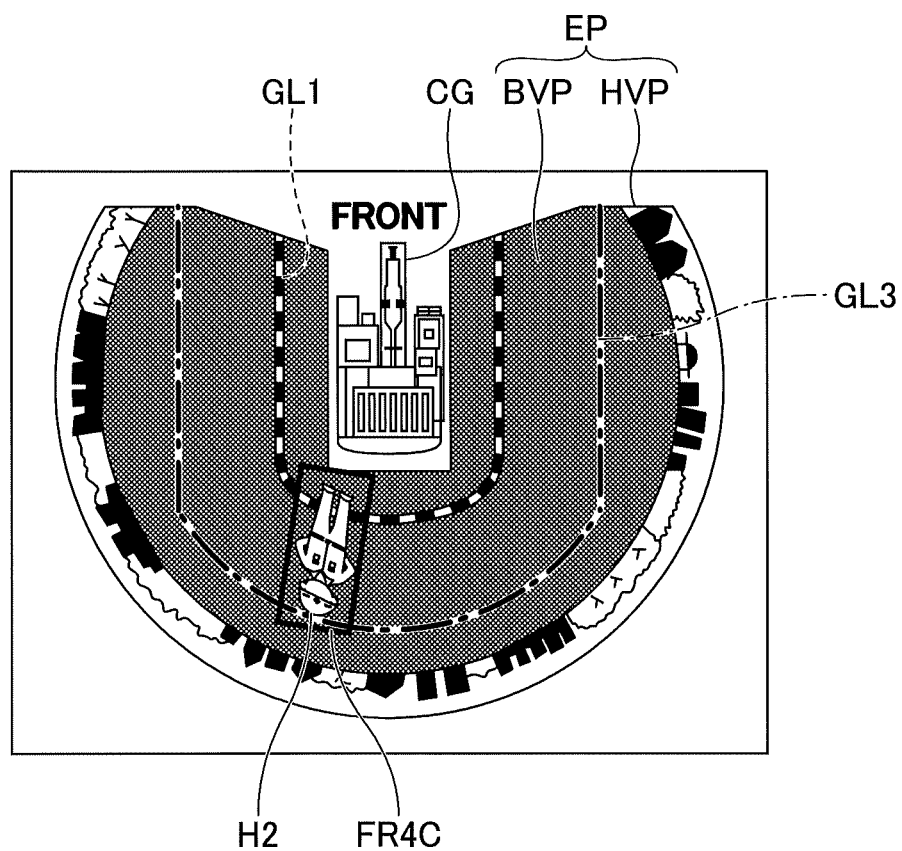
FIG. 41B is a diagram illustrating another example of the surrounding image displayed on the display device.

Furthermore, for example, FIGS. 41A and 41B illustrate other examples of the surrounding image EP (monitoring image MP2) displayed on the display device 50. Specifically, FIG. 41A is a diagram illustrating the surrounding image EP (monitoring image MP2) in the case where a person (worker H2) is in the distant area, and FIG. 41B is a diagram illustrating the surrounding image EP (monitoring image MP2) in the case where the person (worker H2) has moved into the nearby area to be detected by the person detecting part 3012C.

As illustrated in FIG. 41A, the worker H2 is shown in the area outside the guideline GL3 corresponding to the distant area in the surrounding image EP displayed on the display device 50. In this case, the worker H2 in the distant area is not detected by the person detecting part 3012C. Therefore, the notification of the detection of a person (the below-described highlighted display of an area including a person) is not performed.

In contrast, as illustrated in FIG. 41B, the worker H2 approaches the shovel to change the state to be included in the area inside the guideline GL3 corresponding to the nearby area in the surrounding image EP. Therefore, the worker H2 is detected in the nearby area by the person detecting part 3012C, so that an area including the worker H2 (person area) is displayed in a highlighted manner, being enclosed by a thick frame FR4C. As a result, as described above, the operator can recognize a person in the nearby area early to ensure safety.

As a form of display for highlighting an area including a detected person (person area) in a through-the-lens image and a surrounding image, a method other than enclosing the person area with a thick frame may be used. For example, the display device 50 may superimpose and display an icon over the person area or next to the person area, cause the person area to be higher in luminance than other areas, cause the person area to periodically change in luminance to blink, or cause the person area to be different in color from other areas.

The third characteristic function of the surroundings monitoring system according to an embodiment of the present invention is described in detail above. The present invention, however, is not limited to this specific embodiment, and variations and modifications may be made without departing from the scope of the present invention.

For example, while both the display device 50 and the audio output device 52 notify the operator or the like of the detection of a vehicle and a person under the control of the display controlling part 302C and the audio controlling part 303C according to the above-described embodiment, the notification may be performed by only one of them.

Furthermore, the object detecting part 301C, namely, the vehicle detecting part 3011C and the person detecting part 3012C, which detect a vehicle and a person, respectively, based on the captured image of the image capturing unit 40 (the back camera 40B, the left side camera 40L, and the right side camera 40R) according to the above-described embodiment and variation, may detect a vehicle and a person based on the detection result (distance image or the like) of another sensor such as a millimeter wave radar, a LIDAR, a stereo camera or the like, instead of or in addition to the captured image of the image capturing unit 40.

Furthermore, the object detecting part 301C, which detects a vehicle with a sensor installed in the shovel according to the above-described embodiment and variation, is not limited to this configuration. For example, the object detecting part 301C directly or indirectly obtains the position information of a vehicle that is working in the same work site or may move to the work site (hereinafter referred to as "target vehicle") and the position information of the shovel, and detects the target vehicle approaching the shovel relatively from a distance based on the relative positional relationship between the shovel and the target vehicle. Specifically, the position information of the target vehicle and the shovel may be obtained by GNSS (Global Navigation Satellite System) devices installed one in each of the target vehicle and the shovel. The target vehicle and the shovel are connected to a predetermined management server in such a manner as to be able to communicate therewith through a predetermined communications network, using respective predetermined installed communications devices, for example. The shovel may detect the target vehicle approaching the shovel by obtaining, through the communications network, the position information of the vehicle uploaded from the target vehicle to the management server and comparing it with the position information of the shovel. As a result, the shovel (the object detecting part 301C) can detect a vehicle approaching the shovel earlier. Furthermore, for example, by obtaining the adjunct information (work purposes and destination) of the vehicle in addition to the position information of the vehicle, the shovel can detect a vehicle approaching the shovel even earlier.

The following is further disclosed with respect to the third characteristic function of the surroundings monitoring system according to the above-described embodiment.

(1) A surroundings monitoring system for a work machine, the surroundings monitoring system including:

an object detecting part configured to detect a vehicle in a distant area more distant than a predetermined nearby area close to the work machine; and a notifying part configured to perform notification of detection of the vehicle in response to the detection of the vehicle in the distant area by the object detecting part.

(2) The surroundings monitoring system for the work machine according to (1), wherein the notifying part is configured to perform the notification of the detection of the vehicle in response to the detection of the vehicle moving toward the work machine in the distant area by the object detecting part.

(3) The surroundings monitoring system for the work machine according to (1) or (2), wherein the notifying part is configured to stop the notification in response to the object detecting part no longer detecting the vehicle in the distant area because of a movement of the vehicle into the nearby area while the notification is being performed in response to the detection of the vehicle in the distant area by the object detecting part.

(4) The surroundings monitoring system for the work machine according to (3), wherein the object detecting part is configured to detect a person in the nearby area; and the notifying part is configured to perform notification of detection of the person in response to the detection of the person in the nearby area by the object detecting part.

(5) The surroundings monitoring system for the work machine according to (4), wherein the object detecting part includes a vehicle detecting part for detecting the vehicle and a person detecting part for detecting the person, and is configured to use the vehicle detecting part for the distant area and use the person detecting part for the nearby area.

(6) The surroundings monitoring system for the work machine according to any of (1) through (5), further including:

an image capturing unit configured to capture an image of surroundings of the work machine, wherein the notifying part includes a display device to be provided around an operator seat of the work machine, the display device being configured to display an image captured by the image capturing unit or a viewpoint change image generated based on the captured image, and the display device is configured to, in response to the detection of the vehicle by the object detecting part, perform the notification of the detection of the vehicle by highlighting a part of a screen of the display device, the screen including the captured image or the viewpoint change image.

(7) The surroundings monitoring system for the work machine according to (6), wherein the display device is configured to highlight an area in the captured image or the viewpoint change image, the area including the vehicle detected by the object detecting part, in response to the detection of the vehicle by the object detecting part.

(8) The surroundings monitoring system for the work machine according to (6), wherein the display device is configured to perform display in such a manner as to highlight an area outside an outer edge of the viewpoint change image in the screen in response to the detection of the vehicle by the object detecting part.

(9) A surroundings monitoring system for a work machine, the surroundings monitoring system including:

a notifying part configured to, when there is a vehicle approaching the work machine relatively from a distance from the work machine, notify presence of the vehicle.

(10) The surroundings monitoring system for the work machine according to (9), further including:

an image capturing unit configured to capture an image of surroundings of the work machine, wherein the notifying part includes a display device to be provided around an operator seat of the work machine, the display device being configured to display an image captured by the image capturing unit or a viewpoint change image generated based on the captured image, and the display device is configured to, when the vehicle is included in the captured image or the viewpoint change image, notify the presence of the vehicle by highlighting a part of a screen of the display device, the screen including the captured image or the viewpoint change image.

(11) The surroundings monitoring system for the work machine according to (10), wherein the display device is configured to, when the vehicle is included in the captured image or the viewpoint change image, highlight an area including the vehicle in the captured image or the viewpoint change image.

(12) The surroundings monitoring system for the work machine according to (10), wherein the display device is configured to, in response to detection of the vehicle by an object detecting part, perform display in such a manner as to highlight an area outside an outer edge of the viewpoint change image in the screen.

[Fourth Characteristic Function of Surroundings Monitoring System]

Next, the fourth characteristic function pertaining to the surroundings monitoring system 100 according to this embodiment, specifically, an example of the function of notifying, over the surroundings of the shovel, a situation where the safety function of the surroundings monitoring system 100 (which may be hereinafter referred to as "safety function restriction notifying function") is restricted, is described.

[Overview of Effects According to Fourth Characteristic Function]

First, an overview of effects according to the fourth characteristic function (the safety function restriction notifying function) is given.

A surroundings monitoring system for a work machine including a monitoring target detecting part that detects a predetermined monitoring target (for example, a person) around a work machine and a safety ensuring part that attempts to maintain safety around the work machine by, for example, notifies an operator of detection of the monitoring target and restricting the motion of the work machine in response to detecting the monitoring target is known.

When at least one of the monitoring target detecting part and the safety ensuring part is not operating, or is operating but the operating condition is not normal, however, the safety around the work machine is only limitedly ensured by the monitoring target detecting part and the safety ensuring part. Therefore, in consideration of such a situation, it is desired to ensure further safety at a work site where the work machine is used.

Therefore, according to this embodiment, a surroundings monitoring system for a work machine that can further improve safety at a work site where a work machine is used with the fourth characteristic function is provided.

[Configuration of Surroundings Monitoring System]

Next, a specific configuration of the surroundings monitoring system 100 according to this embodiment is described with reference to FIG. 42.

Figure 42:
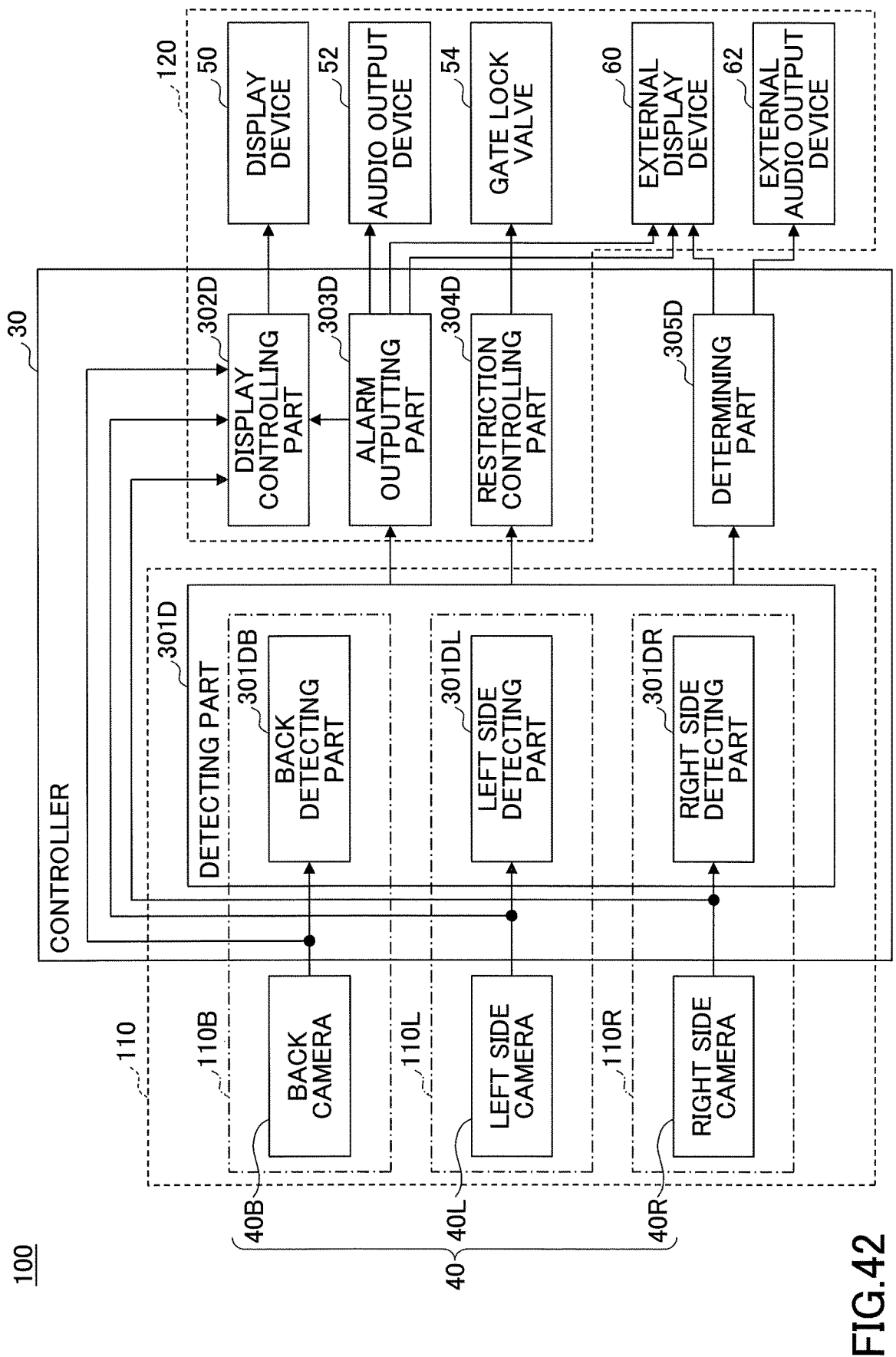
FIG. 42 is a diagram illustrating an example configuration of the surroundings monitoring system related to a fourth characteristic function (safety function restriction notifying function)

FIG. 42 is a block diagram illustrating an example configuration of the surroundings monitoring system 100 according to this embodiment.

The surroundings monitoring system 100 monitors the entry of a predetermined object that is a monitoring target (hereinafter simply referred to as "monitoring target") into a predetermined area around the shovel. In response to detecting the monitoring target, the surroundings monitoring system 100 outputs an alarm and restricts the motion of the shovel. The monitoring target may be a person or any object other than a person, such as an obstacle or a vehicle. The following description is given based on the assumption that the monitoring target is a person.

The surroundings monitoring system 100 includes the controller 30, the image capturing unit 40, the display device 50, the audio output device 52, the gate lock valve 54, the external display device 60, and the external audio output device 62.

As described above, the controller 30 executes various control processes in the surroundings monitoring system 100. The controller 30 includes, for example, the detecting part 301D, the display controlling part 302D, the alarm outputting part 303D, the restriction controlling part 304D, and the determining part 305D as functional parts implemented by executing various programs stored in the ROM or the secondary storage on the CPU.

As described above, the image capturing unit 40 includes the back camera 40B, the left side camera 40L, and the right side camera 40R. The back camera 40B, the left side camera 40L, and the right side camera 40R are attached to the top of the upper turning body 3 such that their optical axes point obliquely downward, and have respective vertical imaging ranges (angles of view) covering the ground near the shovel to an area far from the shovel. During the operation of the shovel, the back camera 40B, the left side camera 40L, and the right side camera 40R output respective captured images and transmit them to the controller 30 at predetermined intervals (for example, every 1/30 seconds).

The display device 50 displays an image (through-the-lens image) captured by the image capturing unit 40, a surrounding image (for example, a viewpoint change image as described below) that the controller 30 (the display controlling part 302D) generates based on the images captured by the image capturing unit 40, etc.

The audio output device 52 outputs an alarm sound under the control of the controller 30 (specifically, the alarm outputting part 303D).

The gate lock valve 54 closes the pilot line (not depicted) even with the above-described gate lock lever (not depicted) being pulled up, under the control of the controller 30 (specifically, the restriction controlling part 304D).

The external display device 60, under the control of the controller 30 (specifically, the alarm outputting part 303D), warns against the entry of a monitoring target into a warning area around the shovel by displaying predetermined text information or image information to the surroundings of the shovel. Furthermore, the external display device 60, under the control of the controller 30 (specifically, the determining part 305D), displays text information or image information indicating that the monitoring function of the shovel (the function of detecting a monitoring target around the shovel) or the below-described safety function that operates based on the monitoring function is restricted to the surroundings of the shovel.

The external audio output device 62, under the control of the controller 30 (specifically, the alarm outputting part 303D), warns against the entry of a monitoring target into a warning area around the shovel by outputting predetermined audio information to the surroundings of the shovel. Furthermore, the external audio output device 62, under the control of the controller 30 (specifically, the determining part 305D), outputs audio information indicating that the monitoring function of the shovel (the function of detecting a monitoring target around the shovel) or the below-described safety function is restricted to the surroundings of the shovel.

The detecting part 301D detects a person (monitoring target) within a predetermined area (monitoring area) around the shovel, e.g., where the distance D from the shovel is within the predetermined distance D1 (such as 5 meters), based on a captured image captured by the image capturing unit 40. For example, by applying known various image processing techniques and machine learning-based identifiers as desired, the detecting part 301D can recognize a person in the captured image and identify the actual position of the recognized person (the distance D from the shovel to the recognized person, etc.). The detecting part 301D includes a back detecting part 301DB, a left side detecting part 301DL, and a right side detecting part 301DR.

The back detecting part 301DB detects a monitoring target (namely, a person) within the monitoring area in the imaging area of the back camera 40B (namely, the back area) based on a captured image input from the back camera 40B.

The left side detecting part 301DL detects a monitoring target (namely, a person) within the monitoring area in the imaging area of the left side camera 40L (namely, the left side area) based on a captured image input from the left side camera 40L.

The right side detecting part 301DR detects a monitoring target (namely, a person) within the monitoring area in the imaging area of the right side camera 40R (namely, the right side area) based on a captured image input from the right side camera 40R.

The detecting part 301D (the back detecting part 301DB, the left side detecting part 301DL, and the right side detecting part 301DR) may detect a monitoring target around the shovel based on the detection result (distance image or the like) of another sensor such as a millimeter wave radar, a LIDAR, a stereo camera or the like, instead of or in addition to the captured image of the image capturing unit 40. In this case, these other sensors are provided on the shovel.

Thus, according to the surroundings monitoring system 100 of this embodiment, as is understood from the above description, a monitoring target detecting part 110 having the function of detecting a monitoring target (namely, a person) (hereinafter referred to as "monitoring function") includes the image capturing unit 40 that captures an image of the surroundings of the shovel including the monitoring area and the detecting part 301D that detects a monitoring target from the captured image of the image capturing unit 40, using image processing, etc.

Furthermore, the monitoring target detecting part 110 includes a back monitoring target detecting part 110B, a left side monitoring target detecting part 110L, and a right side monitoring target detecting part 110R (an example of multiple area-specific monitoring target detecting parts) that detect a monitoring target within the imaging areas of the back camera 40B, the left side camera 40L, and the right side camera 40R, respectively. Specifically, the back monitoring target detecting part 110B (an example of the area-specific monitoring target detecting part) includes the back camera 40B and the back detecting part 301DB, the left side monitoring target detecting part 110L (another example of the area-specific monitoring target detecting part) includes the left side camera 40L and the left side detecting part 301DL, and the right side monitoring target detecting part 110R (yet another example of the area-specific monitoring target detecting part) includes the right side camera 40R and the right side detecting part 301DR.

The display controlling part 302D displays various kinds of information images on the display device 50 in accordance with the operator's various operations. For example, the display controlling part 302D generates a surrounding image based on the captured image of the image capturing unit 40 and displays it on the display device 50 in accordance with the operator's predetermined operation. Specifically, the display controlling part 302D generates, as a surrounding image, a viewpoint change image (an image viewed from a virtual viewpoint) by performing a known viewpoint changing process based on the captured images of the back camera 40B, the left side camera 40L, and the right side camera 40R, and displays it on the display device 50. Furthermore, when displaying a surrounding image on the display device 50, the display controlling part 302D also displays a shovel image schematically representing the shovel on the display device 50 in order to clearly indicate the relative positional relationship of the imaging range of the image capturing unit 40 shown in the surrounding image to the shovel. That is, the display controlling part 302D generates a monitoring image including a shovel image and a surrounding image placed along the periphery of the shovel image in accordance with the relative positional relationship between the shovel and the imaging range of the image capturing unit 40, and displays it on the display device 50. The monitoring image displayed on the display device 50 is described below with reference to FIG. 43.

The function of the display controlling part 302D may be built into the display device 50. In this case, the captured image of the image capturing unit 40 (the back camera 40B, the left side camera 40L, and the right side camera 40R) and information such as the results of detection by the detecting part 301D are input to the display device 50 from the image capturing unit 40 and the controller 30, respectively.

Figure 43:
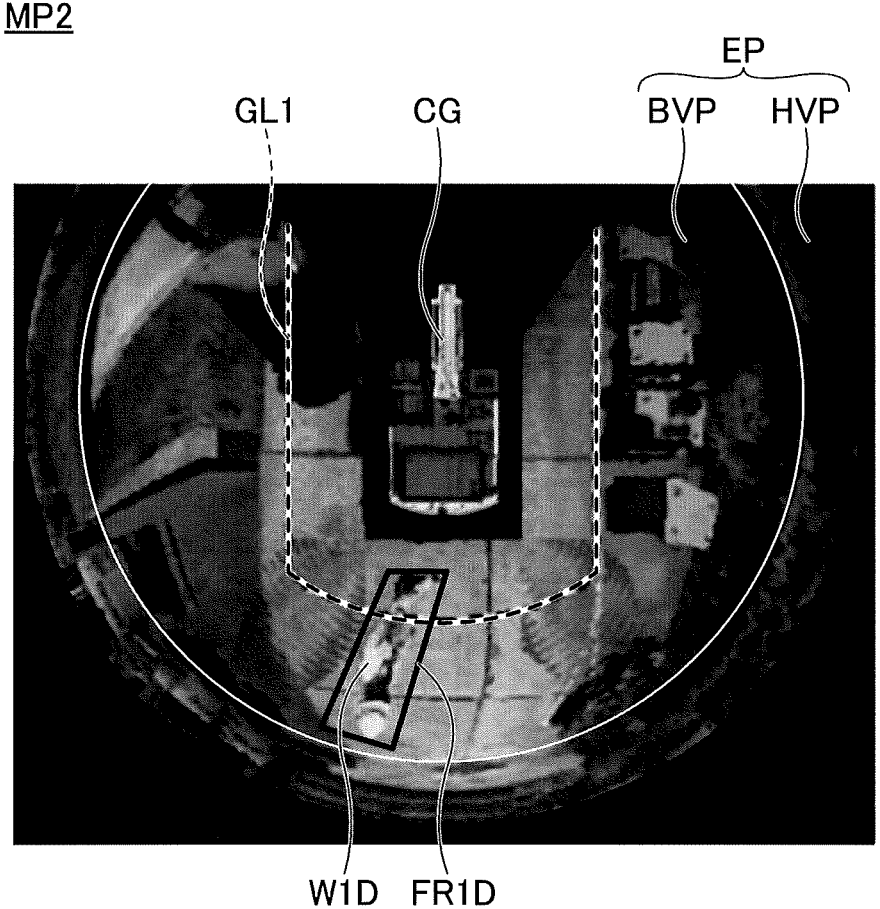
FIG. 43 illustrates an example of the monitoring image displayed on the display device.

FIG. 43 illustrates an example of the monitoring image MP2 displayed on the display device 50.

As illustrated in FIG. 43, the monitoring image MP2 including the shovel image CG and the surrounding image EP placed along the periphery of the shovel image CG as described above is displayed on a laterally elongated rectangular screen (for example, a screen of an aspect ratio of 4:3) on the display device 50. This enables the operator or the like to appropriately understand the positional relationship between a monitoring target (namely, a person) shown in the surrounding image EP and the shovel.

The surrounding image EP according to this example is a viewpoint change image that is a combination of the overhead view image BVP viewing a surrounding area adjacent to the shovel from directly above and the horizontal image HVP viewing the surroundings of the surrounding area horizontally from the shovel and placed along the periphery of the overhead view image BVP. The surrounding image EP, which is a viewpoint change image, can be obtained by projecting the respective captured images of the back camera 40B, the left side camera 40L, and the right side camera 40R onto a spatial model and re-projecting the projected images projected onto the spatial model onto a different two-dimensional plane. The spatial model is an object onto which a captured image is projected in a virtual space, and is composed of one or more plane surfaces or curved surfaces that include a plane surface or a curved surface different from a plane surface in which the captured image is positioned. In the following, the description continues based on the assumption that a surrounding image according to this embodiment is a viewpoint change image that is a combination of an overhead view image viewing a surrounding area adjacent to the shovel from directly above and a horizontal image viewing the surroundings of the surrounding area horizontally from the shovel.

Furthermore, the guideline GL1 is superimposed and displayed on the monitoring image MP2. The guideline GL1 represents positions where the distance D from the shovel is the predetermined distance D2 (<D1), namely, the position of the outer edge of the below-described warning area included in the monitoring area. As a result, when a monitoring target (namely, a person) is shown in the surrounding image, the operator or the like can understand how distant the position is from the shovel.

Furthermore, according to this example, the surrounding image EP of the monitoring image MP2 includes a person (worker W1D) that is a monitoring target within the warning area (an area where the distance D from the shovel is less than or equal to the predetermined distance D2). The worker W1D within the warning area included in the surrounding image EP is highlighted by being enclosed by a thick frame FR1D. This makes it possible to warn (notify) the operator of the entry of a monitoring target into the warning area.

Figure 44A:
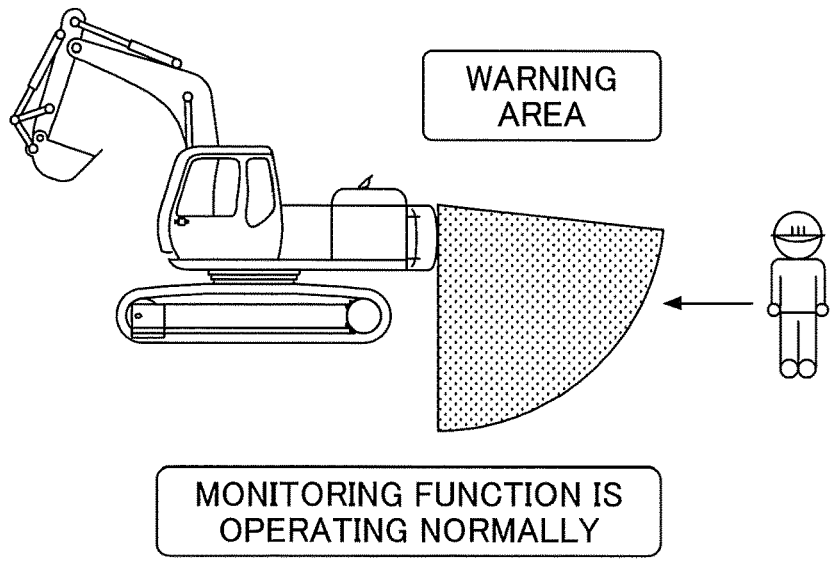
FIGS. 44A and 44B are diagrams schematically illustrating an example of an alarm output to surroundings of the shovel.
Figure 44B:
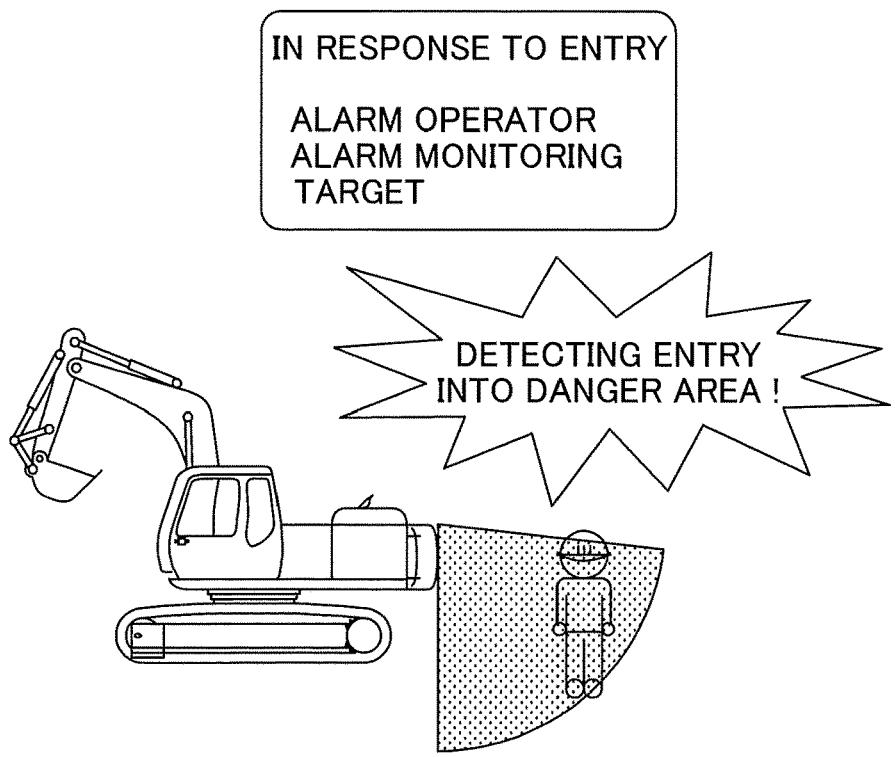

Referring back to FIG. 42, when a person is detected in the warning area, namely, where the distance D from the shovel is less than or equal to the predetermined distance D2, by the detecting part 301D, the alarm outputting part 303D issues an alarm inside the cabin 10, namely, to the operator, and to the surroundings of the shovel, namely, workers, a supervisor such as a site supervisor at a work site, etc. For example, the alarm outputting part 303D outputs an audio alarm. Specifically, the alarm outputting part 303D outputs an alarm sound through the audio output device 52 and the external audio output device 62. For example, FIGS. 44A and 44B schematically illustrate an example of an alarm output to the surroundings of the shovel. As illustrated in FIGS. 44A and 44B, when a worker outside the warning area around the shovel (FIG. 44A) enters the warning area, the audio output device 52 and the external audio output device 62 output an alarm sound (voice) such as "detecting entry into the danger area" to the operator inside the cabin 10 and the worker who has entered, other workers and a supervisor such as a site supervisor at a work site, etc., around the shovel (FIG. 44B).

Furthermore, for example, the alarm outputting part 303D outputs an alarm by visual display. Specifically, the alarm outputting part 303D transmits an alarm request to the display controlling part 302D. As a result, in response to the alarm request, the display controlling part 302D executes a highlighting process such as enclosing a person who is a monitoring target included in the surrounding image EP of the monitoring image MP2 displayed on the display device 50 with a thick frame (see FIG. 43), so that the display device 50 can alarm the operator. Furthermore, the alarm outputting part 303D transmits an alarm request to the external display device 60. As a result, the display device 50 can issue an alarm to the surroundings of the shovel by displaying text information to the same effect as the above-described alarm sound (voice) of FIG. 44, etc.

Thus, the alarm outputting part 303D can urge the operator to interrupt the operation of the shovel by alarming the operator using the audio output device 52, so that it is possible to maintain safety around the shovel. Furthermore, the alarm outputting part 303D can urge people to evacuate the waring area and urge people outside the waring area (other workers and a supervisor such as a site supervisor at a work site) to review the arrangement of workers by issuing an alarm to the surroundings of the shovel using the external audio output device 62, so that it is possible to maintain safety around the shovel.

When a monitoring target (namely, a person) is detected in the monitoring area outside the warning area (D2<D<=D1), the alarm outputting part 303D may issue an alarm that is lower in alarm level representing the degree of danger than in the case of detecting a monitoring target in the warning area, namely, a preliminary alarm. For example, when the distance D from the shovel to the detected person is less than or equal to the predetermined distance D1 and greater than the predetermined distance D2 (namely, the detected person is in the monitoring area outside the warning area), the alarm outputting part 303D issues a preliminary alarm (for example, causes a loudspeaker to output an alarm sound of a relatively low volume), determining that the degree of danger is relatively low in attention state (at alarm level 1). On the other hand, when the distance D from the shovel to the detected person is less than or equal to the predetermined distance D2 (namely, the detected person is in the warning area), the alarm outputting part 303D issues a formal alarm (for example, causes a loudspeaker to output an alarm sound of a relatively high volume), determining that the degree of danger is relatively high in warning state (at alarm level 2).

Referring back to FIG. 42, when the detecting part 301D detects a person in the warning area, the restriction controlling part 304D restricts the motion of the operating elements (the lower traveling body 1, the upper turning body 3, the boom 4, the arm 5, the bucket 6, etc.) of the shovel. For example, the restriction controlling part 304D transmits an ON signal as a command signal to the gate lock valve 54 to cause the gate lock valve 54 to close the pilot line. As a result, working fluid (pilot pressure) is prevented from being supplied from a pilot pump (not depicted) to an operating apparatus (not depicted) for operating the operating elements of the shovel. Therefore, it is possible to restrict the operating elements of the shovel from operating even when the operator inputs operations to the operating apparatus. Therefore, even when a person enters the warning area close to the shovel, the motion of the shovel is restricted, so that a collision between the shovel and the person can be prevented. As a result, it is possible to maintain safety around the shovel.

For example, a pressure reducing valve that reduces the secondary-side pilot pressure output from the operating apparatus may be provided, and the restriction controlling part 304D may control the pressure reducing valve instead of the gate lock valve 54. In this case, the pressure reducing valve can invalidate the operator's operation of the operating apparatus by reducing the secondary-side pilot pressure output from the operating apparatus to or below a pressure value commensurate with no operation, so that it is possible to restrict the motion of the operating elements of the shovel.

Thus, a safety ensuring part 120 having safety functions to ensure safety around the shovel when a monitoring target (namely, a person) is detected within the warning area by the monitoring target detecting part 110, such as the function of outputting an alarm to the operator (hereinafter referred to as internal alarming function), the function of outputting an alarm to the surroundings of the shovel (hereinafter referred to as external alarming function), and the function of restricting the motion of the operating elements of the shovel (hereinafter referred to as motion restricting function) as described above, includes the display controlling part 302D, the alarm outputting part 303D, the restriction controlling part 304D, the display device 50, the audio output device 52, the gate lock valve 54, the external display device 60, and the external audio output device 62.

The determining part 305D (an example of a determining part) determines whether the function of detecting a monitoring target in the surroundings monitoring system 100, namely, the monitoring target detecting part 110 is operating and whether the operating condition of the operating monitoring target detecting part 110 is normal (hereinafter, a determination as to whether it is operating is referred to as "first yes/no determination" and a determination as to whether the operating condition is normal is referred to as "second yes/no determination"). Examples of the "non-operating" state of the monitoring target detecting part 110 include states where the monitoring target detecting part 110 (namely, the monitoring function) is intentionally disabled, such as the state where at least part of the monitoring target detecting part 110 operates with the supply of electric power or the supply of hydraulic pressure, whereas the power is turned off or the hydraulic pressure is shut off, and the state where the monitoring function of the monitoring target detecting part 110, which can be turned on and off, is turned off.

In response to determining that the monitoring target detecting part 110 is not operating or is operating but its operating condition is not normal (namely, abnormal), the determining part 305D transmits a notification command to the external display device 60 and the external audio output device 62 to make a notification indicating that the operation of the monitoring target detecting part 110 (namely, the monitoring function) is restricted (restriction notification) to the surroundings of the shovel.

The determining part 305D may determine whether the monitoring target detecting part 110 is operating in a desired manner. For example, the determining part 305D may perform a yes/no determination with respect to each of the constituent elements included in the monitoring target detecting part 110, namely, the image capturing unit 40 (the back camera 40B, the left side camera 40L, and the right side camera 40R) and the detecting part 301D (the back detecting part 301DB, the left side detecting part 301DL, and the right side detecting part 301DR). In this case, the determining part 305D determines that the monitoring target detecting part 110 is not operating if at least one of the constituent elements is not operating. Furthermore, for example, the determining part 305D may determine whether the image capturing unit 40 is operating based on whether a captured image is periodically input from the image capturing unit 40 to the controller 30. Furthermore, the determining part 305D may determine whether the detecting part 301D is operating by checking information (a flag) regarding the turning on and off of the monitoring function retained in the memory of the controller 30 or the like.

Furthermore, the determining part 305D may determine whether the operating condition of the monitoring target detecting part 110 is normal in a desired manner. For example, the determining part 305D may perform a yes/no determination with respect to each of the constituent elements included in the monitoring target detecting part 110, namely, the image capturing unit 40 and the detecting part 301D. In this case, when the operating condition of at least one of the constituent elements is not normal, the determining part 305D determines that the operating condition of the monitoring target detecting part 110 is not normal. Furthermore, for example, the determining part 305D may check the health of the image capturing unit 40 and the detecting part 301D based on a health check program (a diagnostic program) prestored in the ROM of the controller 30 or the like, and determine whether the operating condition of the image capturing unit 40 and the detecting part 301D is normal based on the results of the health check.

Furthermore, the determining part 305D may determine whether the operating condition of the monitoring target detecting part 110 is normal by determining whether such a captured image as to make it possible to normally detect a monitoring target through image processing has been successfully obtained from the image capturing unit 40. This is because when a captured image output from the image capturing unit 40 is frozen, overexposed, or underexposed, or when a large part of a captured image output from the image capturing unit 40 is occupied by an object adhering to the lens of the image capturing unit 40, it is highly likely that a monitoring target cannot be normally detected based on image processing. Furthermore, when the shovel is moving or turning at a certain speed, the imaging range of the image capturing unit 40 changes every moment. Therefore, such captured images as to make it possible to normally detect a monitoring target, namely, a necessary number of captured images including the same monitoring target for tracking the same possible monitoring target and detecting it as a proper monitoring target, cannot be obtained, so that it is highly likely that a monitoring target cannot be normally detected based on image processing.

Specifically, the determining part 305D may determine whether the condition of the captured image of the image capturing unit 40 allows normal detection of a monitoring target, namely, whether the captured image is not overexposed, underexposed, frozen, or the like, based on the average amount of information, for example, the average amount of luminance information, of the captured image of the image capturing unit 40. For example, when the average amount of luminance information of the captured image of the image capturing unit 40 is relatively small, that is, smaller than a suitably predetermined threshold, this represents a small histogram variance of luminance values in the captured image. Therefore, it can be determined that the captured image is overexposed, underexposed or in a similar condition (the condition where the lens of the image capturing unit 40 is covered with an object adhering thereto). In this case, the determination may be performed using the average value of the average amounts of luminance information of chronologically successive captured images. Furthermore, when a change in the average amount of luminance information between two chronologically successive captured images (an average luminance information amount change) is substantially zero (namely, smaller than such a small threshold as to make it possible to determine that the change is substantially zero), this represents no change between the luminance histograms of the two captured images. Therefore, it can be determined that the captured image is frozen or in a similar condition. In this case, with respect to each of two or more chronologically successive average luminance information amount changes, it may be determined whether the change is substantially zero, and if a predetermined proportion or more satisfies the condition, it may be determined that the captured image is frozen or in a similar condition.

Furthermore, the determining part 305D may determine, based on a chronological change in a predetermined image feature, for example, an LBP (Local Binary Pattern) feature, of the captured image of the image capturing unit 40, whether the moving state or turning state of the shovel is such that a monitoring target can be normally detected from the captured image. This is because when a chronological change (difference) in the image feature of the captured image of the image capturing unit 40 is relatively large, it can be determined that the background is moving, namely, the shovel is moving or turning. For example, the determining part 305D divides each of two chronologically successive captured images of the image capturing unit 40 into predetermined blocks, for example, N (an integer greater than or equal to two) blocks, and calculates an LBP feature value with respect to each block. Next, the determining part 305D calculates a Hamming distance hdi (I=1, . . . , N) corresponding to a change in the LBP feature between the two captured images with respect to each block, and calculates the sum of the Hamming distances hdi of all the N divisional blocks as the Hamming distance HD (=hd1+ . . . +hdN) between the two captured images. When the calculated Hamming distance HD is greater than a suitably predetermined threshold, it can be determined that the background is moving at a certain speed, namely, the shovel is moving or turning at a certain speed. In this case, two or more Hamming distances HD may be calculated with respect to three or more chronologically successive captured images, and the determination may be performed using their average value.

Furthermore, the determining part 305D may determine, with respect to each of the back monitoring target detecting part 110B, the left side monitoring target detecting part 110L, and the right side monitoring target detecting part 110R included in the monitoring target detecting part 110, whether each part is operating and whether the operating condition of each part in operation is normal.

Figure 48:
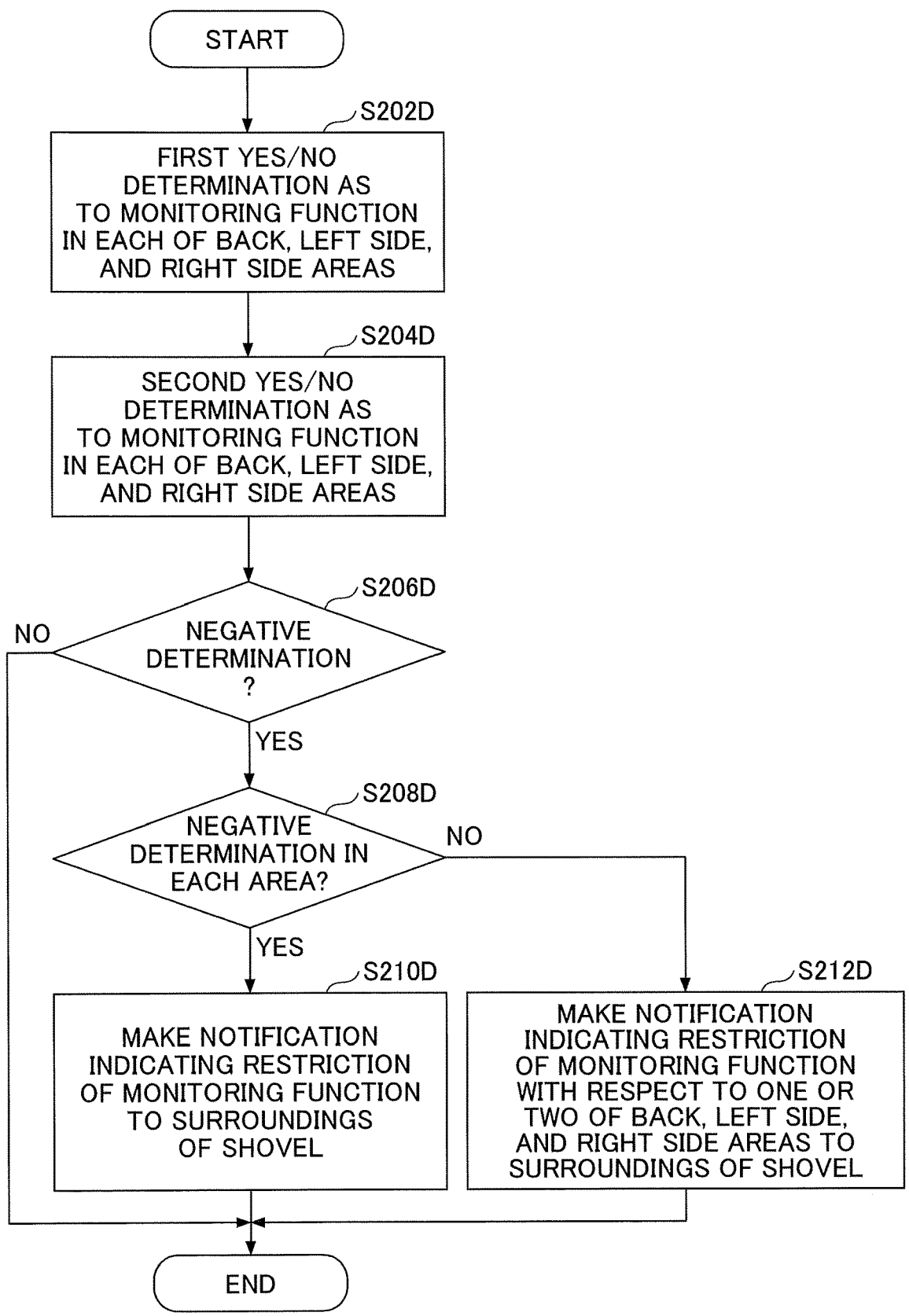
FIG. 48 is a flowchart schematically illustrating a second example of the notifying process by the surroundings monitoring system.

In response to determining that one or some of the back monitoring target detecting part 110B, the left side monitoring target detecting part 110L, and the right side monitoring target detecting part 110R are not operating or are operating but their operating condition is not normal (namely, abnormal), the determining part 305D may make a notification to the effect that the monitoring function is restricted in an imaging area (one or two areas among the back area, the left side area, and the right side area) of the image capturing unit 40 corresponding to the one or some of the back monitoring target detecting part 110B, the left side monitoring target detecting part 110L, and the right side monitoring target detecting part 110R (hereinafter referred to as "restriction notification") to the surroundings of the shovel, using the external display device 60 and the external audio output device 62 (see FIG. 48 described below).

Furthermore, when a monitoring target (namely, a person) is detected in the warning area by the monitoring target detecting part 110, the determining part 305D may determine whether the safety ensuring part 120 for ensuring safety around the shovel is operating and whether the operating condition of the operating safety ensuring part 120 is normal. The same as in the case of the monitoring target detecting part 110, examples of the "non-operating" state of the safety ensuring part 120 include states where the function of the safety ensuring part 120 is intentionally disabled, such as the state where at least part of the safety ensuring part 120 operates with the supply of electric power or the supply of hydraulic pressure, whereas the power is turned off or the hydraulic pressure is shut off, and the state where the safety ensuring part 120 (namely, the safety function), which can be turned on and off, is turned off.

In response to determining that the safety ensuring part 120 is not operating or is operating but its operating condition is not normal (namely, abnormal), the determining part 305D may transmit a notification command to the external display device 60 and the external audio output device 62 to make a notification indicating that the operation of the safety ensuring part 120 (namely, the safety function) is restricted (restriction notification) to the surroundings of the shovel. (See FIG. 49.)

The same as in the case of the monitoring target detecting part 110, the determining part 305D may determine whether the safety ensuring part 120 is operating in a desired manner. For example, the determining part 305D may perform a yes/no determination with respect to each of the constituent elements included in the safety ensuring part 120, namely, the display controlling part 302D, the alarm outputting part 303D, the restriction controlling part 304D, the display device 50, the audio output device 52, the gate lock valve 54, the external display device 60, and the external audio output device 62. In this case, the determining part 305D determines that the safety ensuring part 120 is not operating if at least one of the constituent elements is not operating. Furthermore, for example, the determining part 305D may determine whether the image capturing unit 40 is operating based on whether a captured image is periodically input from the image capturing unit 40 to the controller 30. Furthermore, the determining part 305D may determine whether the detecting part 301D is operating by checking information (a flag) regarding the turning on and off of the safety function retained in the memory of the controller 30 or the like.

Furthermore, the same as in the case of the monitoring target detecting part 110, the determining part 305D may determine whether the operating condition of the safety ensuring part 120 is normal in a desired manner. For example, the determining part 305D may perform a yes/no determination with respect to each of the constituent elements included in the safety ensuring part 120, namely, the display controlling part 302D, the alarm outputting part 303D, the restriction controlling part 304D, the display device 50, the audio output device 52, the gate lock valve 54, the external display device 60, and the external audio output device 62. In this case, when the operating condition of at least one of the constituent elements is not normal, the determining part 305D determines that the operating condition of the safety ensuring part 120 is not normal. Furthermore, for example, the determining part 305D may check the health of the display controlling part 302D, the alarm outputting part 303D, the restriction controlling part 304D, the display device 50, the audio output device 52, the gate lock valve 54, the external display device 60, and the external audio output device 62 based on a health check program (a diagnostic program) prestored in the ROM of the controller 30 or the like, and determine whether the operating condition of the display controlling part 302D, the alarm outputting part 303D, the restriction controlling part 304D, the display device 50, the audio output device 52, the gate lock valve 54, the external display device 60, and the external audio output device 62 is normal based on the results of the health check.

[Specific Examples of Restriction Notification]

Next, specific examples of the notification (restriction notification) indicating the restriction of the operation (monitoring function) of the monitoring target detecting part 110, made by the external display device 60 and the external audio output device 62, are described with reference to FIG. 45 and FIGS. 46A and 46B.

The notification indicating the restriction of the operation (safety function) of the safety ensuring part 120 is performed in the same manner, and accordingly, a description thereof is omitted.

Figure 45:
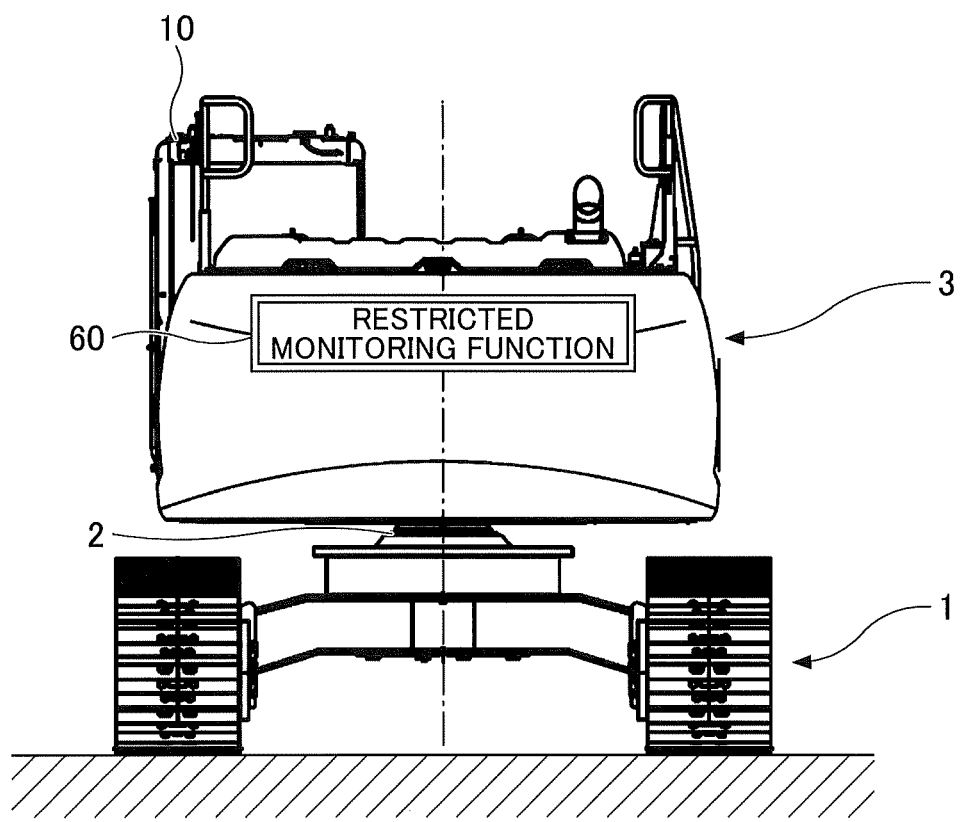
FIG. 45 is a diagram schematically illustrating an example of a restriction notification made to the surroundings of the shovel.
Figure 46A:
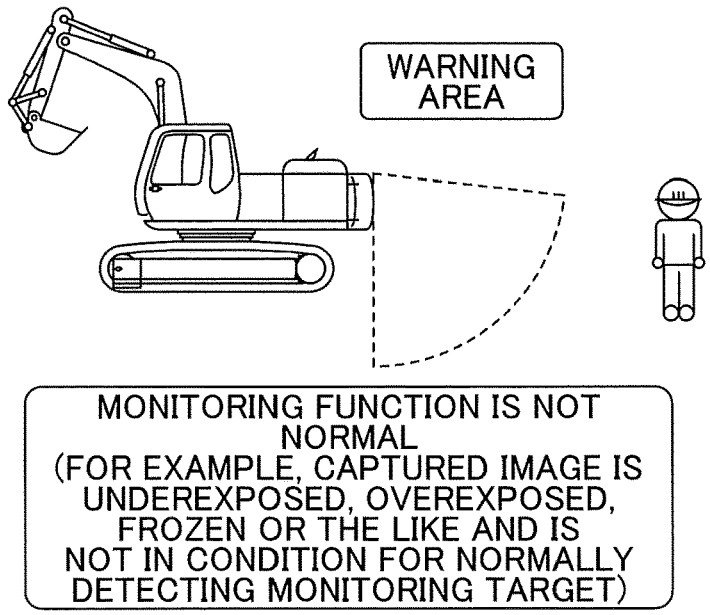
FIGS. 46A and 46B are diagrams schematically illustrating another example of the restriction notification made to the surroundings of the shovel.
Figure 46B:
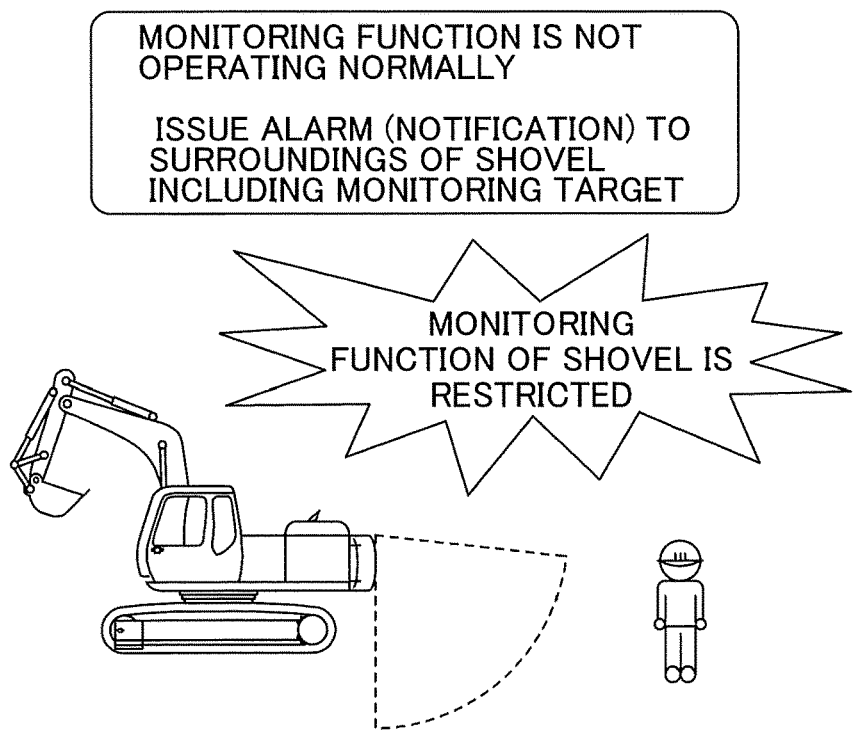

FIG. 45 and FIGS. 46A and 46B are diagrams schematically illustrating an example and another example of the restriction notification made to the surroundings of the shovel.

As illustrated in FIG. 45, according to this example, "RESTRICTED MONITORING FUNCTION" is displayed on the external display device 60, which is placed in a landscape position on an upper part of the rear-end side surface of the upper turning body 3. This enables workers working around the shovel, a supervisor at a work site, etc., to be aware that the monitoring function of the shovel is restricted.

Furthermore, as illustrated in FIGS. 46A and 46B, in a situation where the operation of the monitoring target detecting part 110 is not normal (FIG. 46A), the external audio output device 62 outputs, for example, a voice such as "the monitoring function of the shovel is restricted" (FIG. 46B).

This enables workers working around the shovel, a supervisor such as a site supervisor at a work site, etc., to be aware from outside the shovel that the monitoring function of the shovel and its safety function based on the monitoring function are restricted. Therefore, while ensuring safety around the shovel normally depends largely on the monitoring function and the safety function on the shovel side, it is possible to urge workers working around the shovel, a supervisor such as a site supervisor at a work site, etc., to act in view of ensuring safety around the shovel (for example, to be more distant from the shovel in working than normally is) even when these functions are restricted. Therefore, it is possible to further improve safety around the shovel.

[Details of Operation of Surroundings Monitoring System]

Next, a flow of a characteristic process by the surroundings monitoring system 100 according to this embodiment, namely, a process for making a restriction notification (a notifying process) by the determining part 305D, is described with reference to FIGS. 47 through 49.

Figure 47:
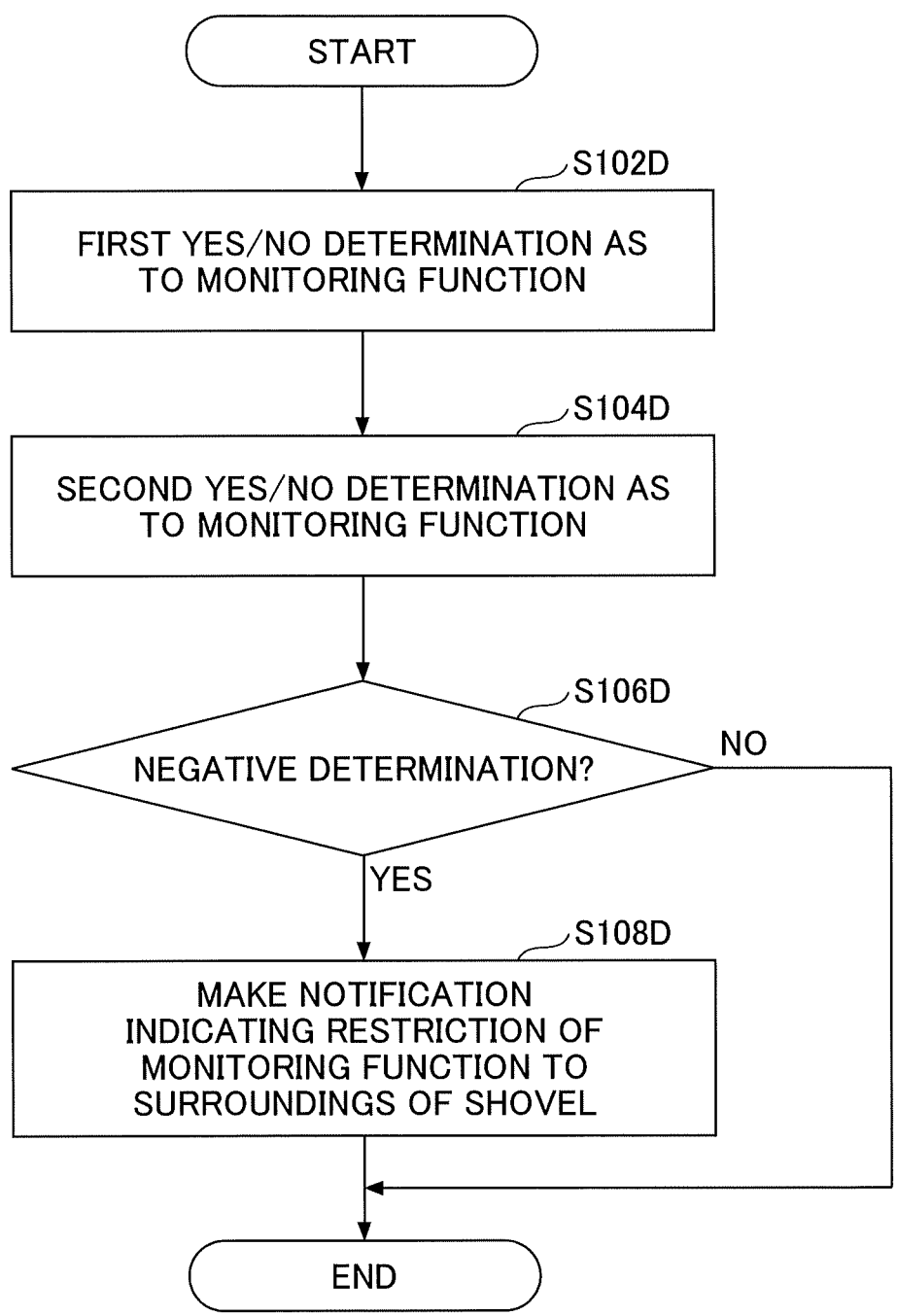
FIG. 47 is a flowchart schematically illustrating a first example of a notifying process by the surroundings monitoring system.

FIG. 47 is a flowchart schematically illustrating a first example of the notifying process by the determining part 305D of the surroundings monitoring system 100. The process according to this flowchart may be, for example, repeatedly executed periodically while no restriction notification is being made during the operation of the shovel.

At step S102D, the determining part 305D performs the first yes/no determination as to the monitoring function, namely, determines whether the monitoring target detecting part 110 is operating.

At step S104D, the determining part 305D performs the second yes/no determination as to the monitoring function, namely, determines whether the operating condition of the operating monitoring target detecting part 110 is normal.

The processes of steps S102D and S104D may be in reverse order.

At step S106D, the determining part 305D determines whether the result of at least one of the first yes/no determination at step S102D and the second yes/no determination at step S104D is a negative determination. The determining part 305D proceeds to step S108D if there is a negative determination, and ends the process of this time if there is no negative determination.

At step S108D, the determining part 305D transmits a notification command to the external display device 60 and the external audio output device 62 to cause them to make a notification indicating that the monitoring function (namely, the operation of the monitoring target detecting part 110) is restricted to the surroundings of the shovel, and ends the process of this time.

Thus, according to this example, when the monitoring function of the shovel is not operating or is operating but its operating condition is not normal (for example, failed), the external display device 60 and the external audio output device 62 make a notification to that effect to the surroundings of the shovel. As a result, while workers around the shovel, a supervisor such as a site supervisor at a work site, etc., often work around the shovel or cause workers to work around the shovel based on the assumption that the monitoring function of the shovel is operating normally, the workers, the supervisor, etc., can be aware from outside the shovel that the monitoring function of the shovel is restricted as described above. Therefore, while ensuring safety around the shovel normally depends largely on the monitoring function on the shovel side, it is possible to urge the workers, the supervisor, etc., to act in view of ensuring safety around the shovel even when this function is restricted. Therefore, it is possible to further improve safety around the shovel.

When the monitoring function of the shovel is not operating or is operating but its operating condition is not normal (Yes at step S106D), a notification to the effect that the monitoring function of the shovel is restricted may be transmitted to a management terminal at a work site, the terminal (smartphone or tablet terminal) of a supervisor such as a site supervisor at a work site, or the like, using an undepicted communications device installed in the shovel or the like. For example, the communications device may transmit the notification to a predetermined management server, through which the notification may be transferred in real time to a pre-registered management terminal at a work site or the pre-registered terminal of a manager such as a site supervisor. As a result, for example, in the case of a large work site, a supervisor such as a site supervisor at a work site, who may be unaware of a notification directly output from the shovel, can be aware of the restriction of the monitoring function of the shovel because the notification is transmitted to a management terminal provided in the work site office or the terminal that the supervisor carries. The same may be performed in the case of Yes at step S206D of FIG. 48 and in the case of Yes at step S310D of FIG. 49 described below.

Furthermore, for example, when the monitoring function of the shovel is not operating or is operating but its operating condition is not normal (Yes at step S106D), the controller 30 may record various statuses of the shovel (such as the detection signals of sensors installed in the shovel, a signal indicating the operating state of the operating apparatus, signals indicating the control states of various control devices including the controller 30, etc.) in an internal memory or the like. The recorded data may be transmitted to a management server by an undepicted communications device and stored. By thus recording various statuses when the monitoring target is restricted as recordings of the evidence of a defect and by analyzing the stored various statuses, it is possible to identify the cause of the defect and make future improvements. The same may be performed in the case of Yes at step S206D of FIG. 48 and in the case of Yes at step S310D of FIG. 49 described below.

Furthermore, for example, when the monitoring function of the shovel is not operating or is operating but its operating condition is not normal (Yes at step S106D) and captured images are input from the image capturing unit 40, the controller 30 may record the captured images of the image capturing unit 40 for a predetermined period in an internal memory or the like. Furthermore, data on the recorded captured images may be transmitted to a management server by an undepicted communications device and stored. As a result, the same as in the case of data on the various statuses of the shovel, it is possible to understand a specific situation where the operating condition of the image capturing unit 40 is not normal to identify the cause of a defect and make future improvements, and it is also possible to store a surrounding situation, etc., when the monitoring function is restricted as recordings of the evidence of a defect when there is no problem with the image capturing unit 40. The same may be performed in the case of Yes at step S206D of FIG. 48 and in the case of Yes at step S310D of FIG. 49 described below.

Next, FIG. 48 is a flowchart schematically illustrating a second example of the notifying process by the determining part 305D of the surroundings monitoring system 100. The same as in the case of the above-described first example (FIG. 47), the process according to this flowchart may be, for example, repeatedly executed periodically while no restriction notification is being made during the operation of the shovel.

At step S202D, the determining part 305D performs the first yes/no determination as to the monitoring function in each of the back area, the left side area, and the right side area, namely, determines whether each of the back monitoring target detecting part 110B, the left side monitoring target detecting part 110L, and the right side monitoring target detecting part 110R is operating.

At step S204D, the determining part 305D performs the second yes/no determination as to the monitoring function in each of the back area, the left side area, and the right side area, namely, determines whether the operating condition of each of the operating back monitoring target detecting part 110B, the operating left side monitoring target detecting part 110L, and the operating right side monitoring target detecting part 110R is normal.

At step S206D, the determining part 305D determines whether the result of at least one of the first yes/no determination at step S202D and the second yes/no determination at step S204D is a negative determination. The determining part 305D proceeds to step S208D if there is a negative determination, and ends the process of this time if there is no negative determination.

At step S208D, the determining part 305D determines whether there is a negative determination as to the monitoring function in each of the back area, the left side area, and the right side area through the first yes/no determination at step S202D and the second yes/no determination at step S204D. The determining part 305D proceeds to step S210D if there is a negative determination as to the monitoring function in each of the back area, the left side area, and the right side area, and proceeds to step S210D if there is a negative determination as to the monitoring function in one or some of the back area, the left side area, and the right side area.

At step S210D, the determining part 305D transmits a notification command to the external display device 60 and the external audio output device 62 to cause them to make a notification indicating that the monitoring function is restricted in all the areas (the back area, the left side area, and the right side area) to the surroundings of the shovel, and ends the process of this time.

At step S212D, the determining part 305D transmits a notification command to the external display device 60 and the external audio output device 62 to cause them to make a notification indicating that the monitoring function is restricted in an area or areas (one or two of the back area, the left side area, and the right side area) corresponding to one or some area-specific monitoring target detecting parts (one or two of the back monitoring target detecting part 110B, the left side monitoring target detecting part 110L, and the right side monitoring target detecting part 110R) for which there is a negative determination among all the areas to the surroundings of the shovel, and ends the process of this time.

Thus, according to this example, when one or some of the back monitoring target detecting part 110B, the left side monitoring target detecting part 110L, and the right side monitoring target detecting part 110R are not operating or their operating condition is not normal, the external display device 60 and the external audio output device 62 make a notification indicating that the monitoring function is restricted in an area or areas corresponding to the one or some. This enables workers around the shovel, a supervisor such as a site supervisor at a work site, etc., to be aware from outside the shovel of an area with respect to which the monitoring function is restricted among the areas around the shovel that are monitored by the monitoring function.

Figure 49:
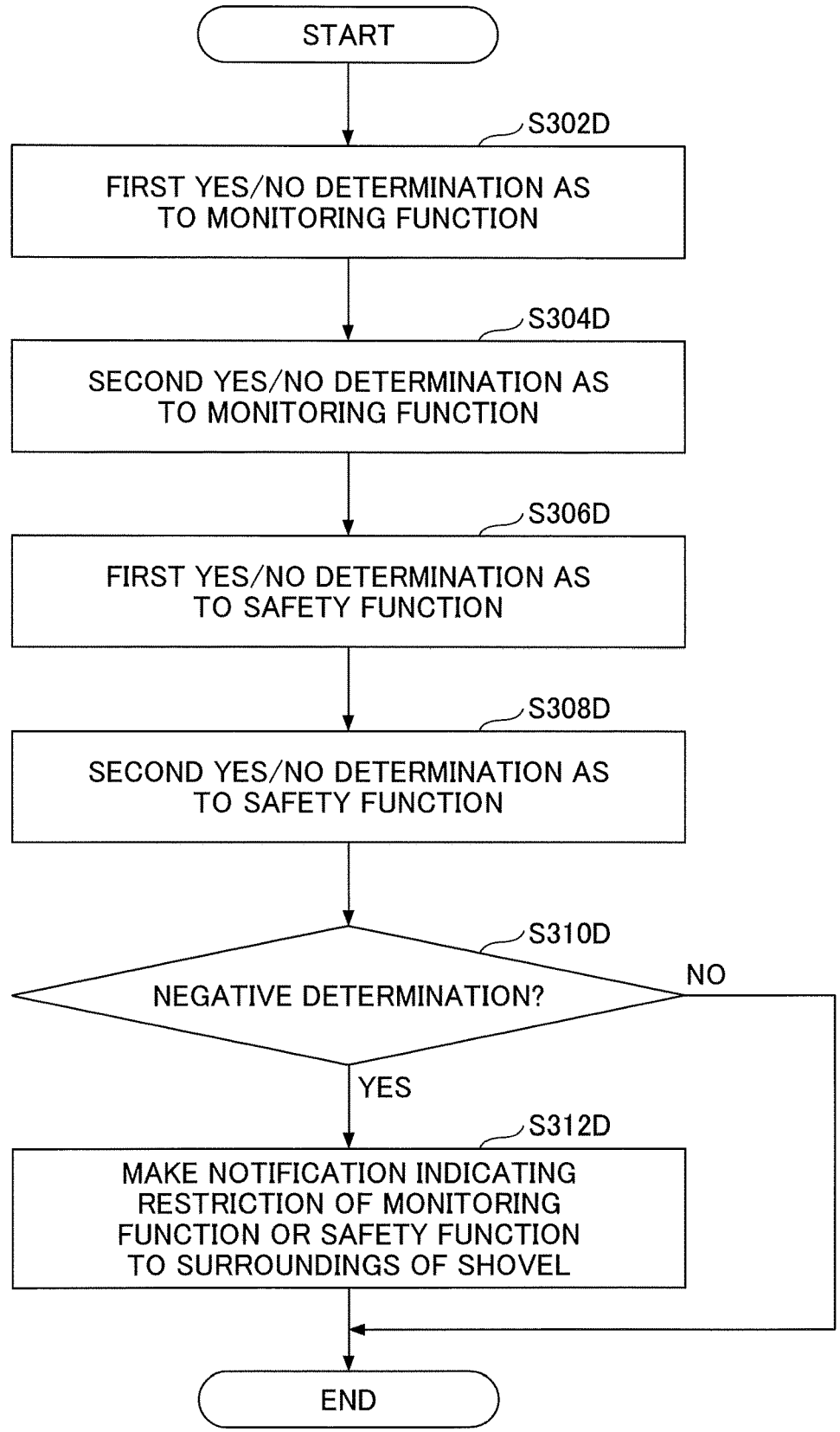
FIG. 49 is a flowchart schematically illustrating a third example of the notifying process by the surroundings monitoring system.

Next, FIG. 49 is a flowchart schematically illustrating a third example of the notifying process by the determining part 305D of the surroundings monitoring system 100. The same as in the case of the above-described first example (FIG. 47), the process according to this flowchart may be, for example, repeatedly executed periodically while no restriction notification is being made during the operation of the shovel.

Steps S302D and S304D of this flowchart are the same as steps S102D and S104D of the above-described first example (FIG. 47). Therefore, a description is given focusing on differences.

At step S306D, the determining part 305D performs the first yes/no determination as to the safety function, namely, determines whether the safety ensuring part 120 is operating.

At step S308D, the determining part 305D performs the second yes/no determination as to the safety function, namely, determines whether the operating condition of the operating safety ensuring part 120 is normal.

The determining processes of steps S302D through S308D may be in any order.

At step S310D, the determining part 305D determines whether there is a negative determination through the first yes/no determinations and the second yes/no determinations at steps S302D through S308D. The determining part 305D proceeds to step S312D if there is a negative determination, and ends the process of this time if there is no negative determination.

At step S312D, the determining part 305D transmits a notification command to the external display device 60 and the external audio output device 62 to cause them to make a notification indicating that the monitoring function (namely, the operation of the monitoring target detecting part 110) or the safety function (namely, the operation of the safety ensuring part 120) is restricted to the outside of the shovel, and ends the process of this time.

At step S312D, the determining part 305D may make a notification as to whether only the monitoring function is restricted, only the safety function is restricted, or both of the monitoring function and the safety function are restricted to the surroundings of the shovel through the external display device 60 and the external audio output device 62. Furthermore, the determining part 305D may omit the first yes/no determination and the second yes/no determination as to the monitoring function (steps S302D and S304D) and perform the first yes/no determination and the second yes/no determination as to only the safety function based on the monitoring function (steps S306D and S308D). In this case, at step S312D, the determining part 305D makes a notification indicating the restriction of the safety function to the surroundings of the shovel through the external display device 60 and the external audio output device 62. Furthermore, the determining part 305D may perform the first yes/no determination and the second yes/no determination with respect to each of multiple safety functions, namely, the above-described internal alarming function, external alarming function, and motion restricting function. In this case, at step S312D, the determining part 305D may notify whether all of the safety functions are restricted or one or some of the safety functions are restricted through the external display device 60 and the external audio output device 62.

Thus, according to this example, when at least one of the monitoring function of the shovel and its safety function that operates based on the monitoring function is not operating or its operating condition is not normal, the external display device 60 and the external audio output device 62 makes a notification indicating that the monitoring function or the safety function is restricted to the surroundings of the shovel. This enables workers around the shovel, a supervisor such as a site supervisor at a work site, etc., to be aware from outside the shovel that not only the monitoring function is restricted but also the safety function that operates based on the monitoring function is restricted. Therefore, while the safety function that operates based on the monitoring function may not operate normally because of its restriction although the monitoring function is not restricted, it is possible to urge workers, a supervisor such as a site supervisor at a work site, etc., to act in view of ensuring safety around the shovel. Therefore, it is possible to further improve safety around the shovel.

The fourth characteristic function of the surroundings monitoring system according to an embodiment of the present invention is described in detail above. The present invention, however, is not limited to this specific embodiment, and variations and modifications may be made without departing from the scope of the present invention.

For example, while both the first yes/no determination and the second yes/no determination are performed with respect to at least one of the monitoring target detecting part 110 and the safety ensuring part 120 according to the above-described embodiment, the restriction notification may be made based on one of the yes/no determinations.

Furthermore, notification, which is performed by both the external display device 60 and the external audio output device 62 according to the above-described embodiment and variation, may be performed by one of them.

Furthermore, while a notification indicating the restriction of the monitoring function or the safety function is made to the surroundings of the shovel according to the above-described embodiment and variation, the same notification may also be made to the inside of the cabin 10, namely, the operator, through the display device 50 and the audio output device 52 (both of which are examples of the notifying part). As a result, for example, even when the operator cannot notice an indicator of the abnormality of the monitoring function or the safety function or even when the monitoring function or the like is inadvertently turned off, it can be ensured that the operator, who often operates the shovel based on the assumption that the monitoring function and the safety function of the shovel operate normally, is aware of the restriction of the monitoring function or the safety function of the shovel by performing the same notification together with the notification to the surroundings of the shovel. Therefore, while ensuring safety around the shovel normally depends largely on the monitoring function and the safety function, it is possible to urge the operator or the like to operate the shovel in view of ensuring safety around the shovel even when these functions are restricted. Therefore, it is possible to further improve safety around the shovel.

The following is further disclosed with respect to the fourth characteristic function (safety function restriction notifying function) of the surroundings monitoring system according to the above-described embodiment.

(1) A surroundings monitoring system for a work machine, the surroundings monitoring system including:

a monitoring target detecting part configured to detect a predetermined monitoring target in surroundings of the work machine;

a safety ensuring part configured to ensure safety in the surroundings of the work machine in response to detection of the monitoring target by the monitoring target detecting part;

a control device configured to determine, with respect to at least one of the monitoring target detecting part and the safety ensuring part, at least one of whether the at least one of the monitoring target detecting part and the safety ensuring part is operating and whether an operating condition thereof is normal; and a notifying device configured to make a notification indicating that an operation of the monitoring target detecting part or the safety ensuring part is restricted in response to the control device determining that the monitoring target detecting part or the safety ensuring part is not operating or that the operating condition thereof is not normal.

(2) The surroundings monitoring system for the work machine according to (1), wherein the notifying device is configured to make the notification to the surroundings of the work machine.

(3) The surroundings monitoring system for the work machine according to (2), wherein the notifying device is configured to make the notification to an inside of a cabin of the work machine in which an operator seat is provided.

(4) The surroundings monitoring system for the work machine according to any of (1) through (3), wherein the monitoring target detecting part includes a plurality of area-specific monitoring target detecting parts for detecting the monitoring target in respective corresponding areas in the surroundings of the work machine, the control device is configured to determine at least one of whether each of the plurality of area-specific monitoring target detecting parts is operating and whether the operating condition thereof is normal, and the notifying device is configured to, in response to the control device determining that one or some of the plurality of area-specific monitoring target detecting parts are not operating or that the operating condition thereof is not normal, make the notification to an effect that an operation of the safety ensuring part is restricted in an area or areas corresponding to the one or some of the plurality of area-specific monitoring target detecting parts among the areas.

(5) A surroundings monitoring system for a work machine, the surroundings monitoring system including:

a monitoring target detecting part including an image capturing unit configured to capture an image of surroundings of the work machine and a detecting part configured to detect a predetermined monitoring target in the surroundings of the work machine based on image processing on the image captured by the image capturing unit;

a control device configured to determine whether a function of detecting the monitoring target by the monitoring target detecting part is normal based on at least one of an average amount of information and an image feature of the captured image; and a notifying device configured to make a notification indicating that an operation of the monitoring target detecting part is restricted when a result of a determination by the control device is negative.

(6) The surroundings monitoring system for the work machine according to (5), wherein the control device is configured to determine whether a condition of the captured image allows a normal detection of the monitoring target based on the average amount of information.

(7) The surroundings monitoring system for the work machine according to (5) or (6), wherein the control device is configured to determine whether a moving state or a turning state of the work machine is such that the monitoring target is normally detectable from the captured image based on a chronological change in the image feature.

An embodiment of the present invention is described in detail above. The present invention, however, is not limited to the specific embodiment, and variations and modifications may be made without departing from the scope of the present invention described in the claims.

What is claimed is:

1. A surroundings monitoring system for a work machine, the surroundings monitoring system comprising:
    a plurality of sensors configured to capture respective images of surroundings of the work machine; and
    processing circuitry configured to:
    selectively display one of a captured image or an overhead view image at a time on a display, the captured image being an image among the captured respective images of the surroundings of the work machine captured by the plurality of sensors, the overhead view image being an image into which the captured respective images of the surroundings of the work machine captured by the plurality of sensors are combined, the overhead view image viewing the surroundings from above the work machine,
    repeatedly detect one or more predetermined monitoring targets in the surroundings of the work machine at predetermined time intervals based on the captured respective images of the surroundings of the work machine captured by the plurality of sensors, determine whether the captured image or the overhead view image is selectively displayed on the display, and superimpose a first mark over a first image of the one or more predetermined monitoring targets displayed in the overhead view image in response to detecting the one or more predetermined monitoring targets in a case of determining that the overhead view image is selectively displayed on the display, and superimpose a second mark over a second image of the one or more predetermined monitoring targets displayed in the captured image in response to detecting the one or more predetermined monitoring targets in a case of determining that the captured mage is selectively displayed on the display, wherein the first mark and the second mark are different in size, and a size of the first mark is smaller than a size of the second mark, wherein the processing circuitry determines a number of the detected one or more predetermined monitoring targets based on the captured respective images of the surroundings of the work machine, wherein the processing circuitry selects configuration points representing position information of the first mark or the second mark of the detected one or more predetermined monitoring targets and transmits the position information of the configuration points to the display, and wherein when the number of the detected one or more predetermined monitoring targets increases, the processing circuitry decreases a number of configuration points of the first mark or the second mark to reduce an amount of data of the position information of the configuration points included in transmission data within a predetermined transmission period with respect to each of the detected one or more predetermined monitoring targets.

2. The surroundings monitoring system as claimed in claim 1, wherein
the first mark and the second mark are further different in figure type, and
an amount of information of the first mark is smaller than an amount of information of the second mark.

3. The surroundings monitoring system as claimed in claim 2, wherein the processing circuitry superimposes the first mark over the first image of the detected one or more predetermined monitoring targets such that the first image of the detected one or more predetermined monitoring targets is surrounded by the first mark to be visible inside the first mark, and to superimpose the second mark over the second image of the detected one or more predetermined monitoring targets such that the second image is surrounded by the second mark to be visible inside the second mark.

4. The surroundings monitoring system as claimed in claim 3, wherein the first mark has a first frame shape having a first opening through which the first image is visible, and the second mark has a second frame shape having a second opening through which the second image is visible.

5. The surroundings monitoring system as claimed in claim 4, wherein
the first mark and the second mark are different in size with an area of the first opening and an area of the second opening being different, and
the first mark and the second mark are different in figure type with the first frame shape and the second frame shape being different.

6. The surroundings monitoring system as claimed in claim 5, wherein the first mark and the second mark are different in size and figure type so that the area of the first opening is smaller than the area of the second opening.

7. The surroundings monitoring system as claimed in claim 1, wherein the figure type of each of the first mark and the second mark is selected from an oval, a line segment, a triangle, a quadrangle, and polygons other than the triangle and the quadrangle, the quadrangle including a diamond shape and a rectangle.

8. The surroundings monitoring system as claimed in claim 1, wherein the processing circuitry is further configured to cause at least one of the size or a figure type of the first mark to differ according to a number of the images of the surroundings of the work machine captured by the plurality of sensors that are combined into the overhead view image.

\* \* \* \* \*